(12) United States Patent
Al-Sallami et al.

(10) Patent No.: US 10,402,064 B1
(45) Date of Patent: Sep. 3, 2019

(54) USING COMBINED ECOMMERCE AND BRICK-AND-MORTAR DATA TO PRODUCE INTELLIGENT RECOMMENDATIONS FOR WEB PAGE EDITING

(71) Applicant: Square, Inc., San Francisco, CA (US)

(72) Inventors: Wael Al-Sallami, San Francisco, CA (US); Christine Loh, Los Altos, CA (US); Vitaly Odemchuk, San Francisco, CA (US); Xuanhua Ren, San Francisco, CA (US); Drew Richards, Brooklyn, NY (US); Neil Straghalis, San Francisco, CA (US); Katherine Swett, Long Island City, NY (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 16/261,434

(22) Filed: Jan. 29, 2019

Related U.S. Application Data

(60) Provisional application No. 62/777,678, filed on Dec. 10, 2018.

(51) Int. Cl.
*G06F 17/00* (2019.01)
*G06F 3/0484* (2013.01)
*G06F 17/22* (2006.01)
*G06Q 30/06* (2012.01)
*G06Q 20/20* (2012.01)
*G06Q 30/02* (2012.01)

(52) U.S. Cl.
CPC ........ *G06F 3/0484* (2013.01); *G06F 17/2247* (2013.01); *G06Q 20/20* (2013.01); *G06Q 30/0641* (2013.01); *G06Q 30/0201* (2013.01); *G06Q 30/0244* (2013.01)

(58) Field of Classification Search
CPC .................. G06Q 30/0201; G06Q 30/0244
See application file for complete search history.

(56) References Cited

U.S. PATENT DOCUMENTS

| 8,332,271 | B1 * | 12/2012 | Wilder | ............... G06Q 30/0201 705/16 |
| 2008/0189156 | A1 * | 8/2008 | Voda | .................... G06Q 10/063 705/7.33 |

(Continued)

*Primary Examiner* — Andrew T McIntosh
(74) *Attorney, Agent, or Firm* — Lee & Hayes, P.C.

(57) ABSTRACT

Using combined eCommerce and brick-and-mortar data to produce intelligent recommendations for website editing is described. In an example, brick-and-mortar transaction data associated with a first merchant and second merchant(s) can be compared to identify a subset of the second merchant(s) that are similar to the first merchant. Performance metrics associated with eCommerce graphical user interfaces (GUIs) presented on behalf of the subset of the second merchant(s) can be determined based on aggregated transaction data associated with eCommerce point-of-sale (POS) transactions associated with the subset of the second merchant(s) and a recommendation based on content, a layout, and/or a design of at least a portion of the eCommerce GUIs can be generated. The recommendation can be sent to a computing device operable by the first merchant for use in creating or editing an eCommerce GUI to be presented on behalf of the first merchant.

20 Claims, 26 Drawing Sheets

(56) References Cited

U.S. PATENT DOCUMENTS

| | | | |
|---|---|---|---|
| 2009/0327101 A1* | 12/2009 | Sayed | G06F 17/248 |
| | | | 705/26.1 |
| 2014/0297437 A1* | 10/2014 | Natarajan | G06Q 30/0635 |
| | | | 705/21 |
| 2017/0109763 A1* | 4/2017 | Tsai | G06F 16/9535 |

\* cited by examiner

USING COMBINED ECOMMERCE AND BRICK-AND-MORTAR DATA TO PRODUCE INTELLIGENT RECOMMENDATIONS FOR WEB PAGE EDITING

PRIORITY

This application claims priority to U.S. Provisional Application No. 62/777,678, filed on Dec. 10, 2018, the entire contents of which are incorporated herein by reference.

BACKGROUND

People have come to expect every organization, event, and public figure to have a website. As a result, many web page editing applications have been developed to allow users who are unfamiliar with HTML, XML, Javascript, CSS, or other web design tools to create and maintain professional and aesthetically pleasing websites. Some of these web page editing applications allow users to change or add content to a web page.

BRIEF DESCRIPTION OF THE DRAWINGS

The above and other features of the present disclosure, its nature and various advantages, will be more apparent upon consideration of the following detailed description, taken in conjunction with the accompanying drawings, which are briefly described below.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
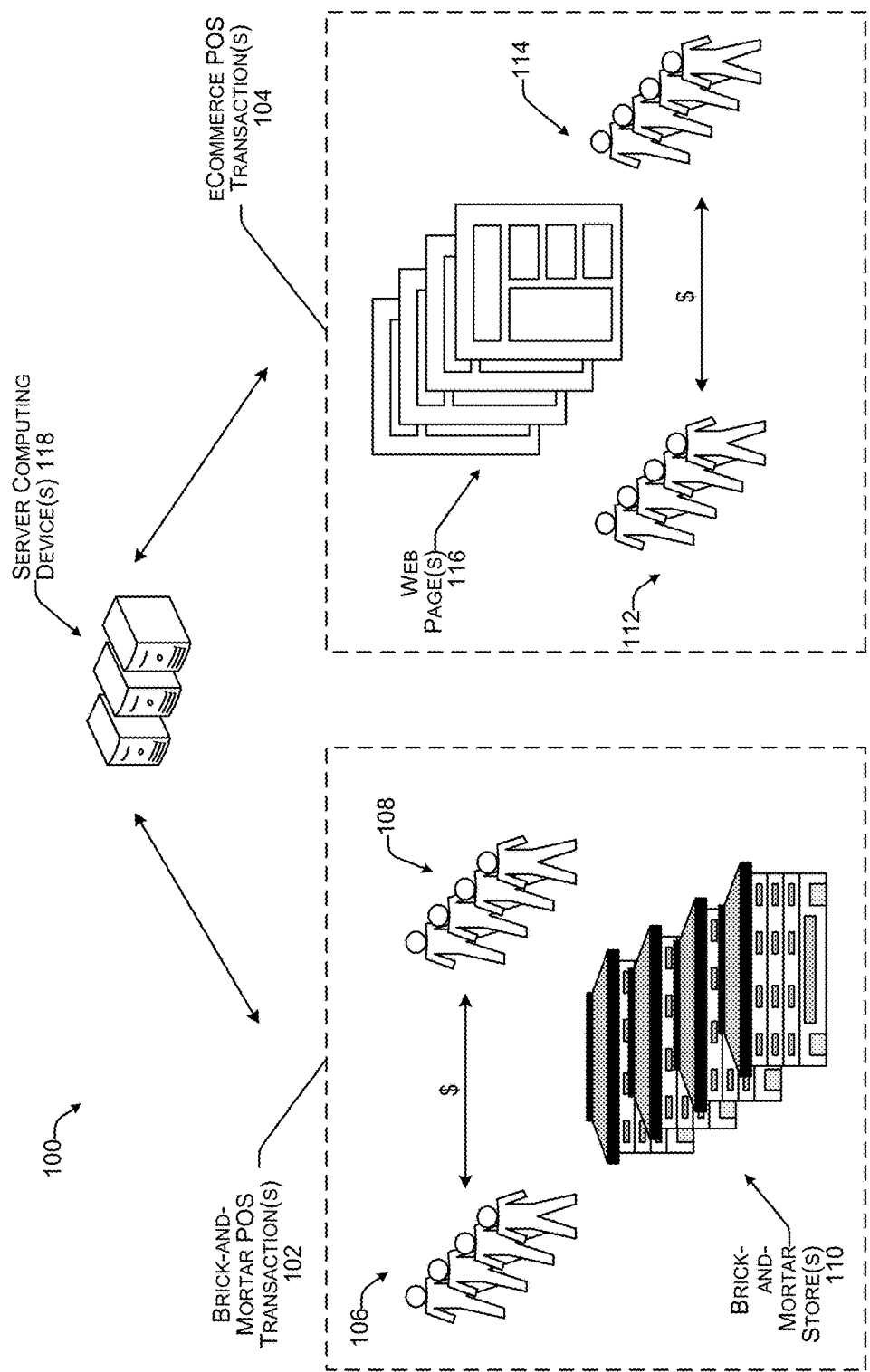
FIG. 1 illustrates an example environment for integrating brick-and-mortar point-of-sale (POS) activities and web page editing activities for achieving various efficiencies in a merchant ecosystem.

Techniques described herein are directed to leveraging brick-and-mortar point-of-sale (POS) activities to customize editing of web pages that facilitate eCommerce POS transactions (e.g., online transactions made via a web page). In an example, techniques described herein can utilize brick-and-mortar POS transaction data of a merchant (or, other similar merchants) to intelligently select and present web page features for creating and/or editing an eCommerce web page of the merchant. For instance, recommendations pertaining to a configuration of interchangeable sections and designs can be surfaced to a merchant at a particular time and particular place to simplify the merchant's choices in creating and/or editing an eCommerce web page. Further, in an example, brick-and-mortar data associated with a merchant can be used to auto-populate content associated with the eCommerce web page, thereby simplifying web page creation and/or editing for the merchant. Such techniques can enable a merchant to build an online presence that is consistent with the merchant's brick-and-mortar presence via a streamlined, efficient process.

In another example, techniques described herein are directed to making recommendations to a merchant for editing a web page based on web pages of other brick-and-mortar merchants that are similar to the merchant. For instance, techniques described herein can determine performance metrics (e.g., sales, conversion rates (e.g., a percentage of visitors that land on a web page who complete a purchase or otherwise make it to a predefined point in a commerce flow), total revenues, growth rates, page views, mouseover rates, click rates, bounce rates (e.g., landing on and immediately leaving a web page), share rates (e.g., to other web pages and/or platforms), social chatter (e.g., mentions on social media platforms), subscriptions, and the like) associated with web pages of merchants. Then, techniques described herein can identify web pages of merchants that are similar to a particular merchant (e.g., based on brick-and-mortar transaction data) that have proven to be successful for the similar merchants (as determined by the performance metrics). As a result, techniques described herein can recommend web page features to the particular merchant in an effort to assist the merchant in creating a web page that leads to eCommerce success.

In some examples, techniques described herein can utilize brick-and-mortar transaction data associated with customers to determine a variation of a web page to present to a customer. That is, merchants can have multiple variations of a web page and brick-and-mortar transaction data can be used to determine which variation of a web page is most relevant to a customer. As such, techniques described herein can surface relevant content to customers to improve experiences of customer interactions with merchants via eCommerce web pages.

Furthermore, techniques described herein are directed to synchronizing a brick-and-mortar POS platform with a web page editing platform to enable merchants to seamlessly utilize services offered by both platforms for holistically managing their businesses. That is, techniques described herein enable merchants to utilize a brick-and-mortar POS platform to manage brick-and-mortar aspects of their businesses and a web page editing platform to manage eCommerce aspects of their businesses. Decisions made on one platform can influence the other platform and vice versa.

In some examples, a centralized data store can store brand assets of merchants and updates on one platform can cause an update to a brand asset stored in the centralized data store. Such updates can be pushed, or otherwise provided, to the other platform such that the brick-and-mortar POS platform and the web services platform are associated with a consistent, uniform, and professional aesthetic. For the purpose of this discussion, a brand asset can be a logo (e.g., text logo, graphic logo, favicon, etc.), a font, a color, an image, an icon, a button style, effects, spacing, and the like used in association with a brand of the merchant. As an example, a merchant can, via the web page editing platform, modify a brand asset of the merchant. Based on the merchant modifying a brand asset of the merchant, the web page editing platform can cause the centralized data store to update the brand asset. The updated brand asset can be provided to the brick-and-mortar POS platform such that the brand asset is consistent across the brick-and-mortar POS platform and the web services platform. As a result, the brick-and-mortar POS platform can update instances of the brand asset across POS services (e.g., payment processing, inventory, orders, invoices, payroll, appointments, fulfillment, marketing, gift cards, restaurants, delivery, etc.).

As described above, many web page editing applications have been developed to allow users who are unfamiliar with HTML, XML, Javascript, CSS, or other web design tools to create and maintain professional and aesthetically pleasing websites. Some of these web page editing applications allow users to change or add content to a web page. Conventional web page editing applications are faced with challenges in balancing the amount of freedom granted to users to be creative and the quality of a web page. That is, enabling users to freely drag and drop web page features into a web page template requires good design skill and a significant amount of effort to assemble the web page. However, if the freedom of users to develop their own web pages is restricted, for instance by using a fixed template, users lack control over what they can change. This leads to frustration. Further, conventional web page editing applications are not modular and lack scalability.

Techniques described herein are directed to web page editing techniques that enable users to build effective and aesthetically pleasing web pages that are modular and scalable. Conventional techniques bundle page structure, layouts, fonts, colors, spacing, etc., thereby limiting how a user can interact with a web page editor and/or design their web page. As described below, techniques described herein can enable a user to build a single web page with interchangeable sections and designs. For example, various combinations of web page layouts can be used to generate visual diversity across different business verticals with minimal effort, all while maintaining high design quality of resulting web pages. As a result, techniques described herein optimize balance between freedom and quality.

Further, techniques described herein enable users to design personal and unique web pages that are responsive and functional. As described above, and also in more detail below, techniques described herein utilize data, for instance from brick-and-mortar POS transactions handled by a payment processing service associated with a web page editing service, to inform and streamline web page creation and/or editing. As a result, techniques described herein can customize the web page editing experience by surfacing layout and/or design possibilities that are highly relevant to the users. Further, techniques described herein can utilize dynamic data connections to easily integrate with any data backend, which can be constantly updated (e.g., in real-time or near real-time). That is, a user can build a multi-page, multi-product online store with dynamic data using techniques described herein.

Techniques described herein are therefore directed to improvements in user interfaces for creating and/or editing web pages and, similarly, managing POS services. Techniques described herein are directed to particular systems, processes, etc. of summarizing and presenting information in electronic devices (e.g., computing devices) to enable users to create and/or edit web pages that are responsive and functional and, as described below, in synch with other business activities of the user. Such techniques are not conventional and, instead, are directed to specific improvements over prior art systems, some limitations of which are described above. As described above, techniques described herein are directed to simplifying web page creation and/or editing for users, thereby improving the efficiency with which users use electronic devices (e.g., computing devices) for such proposes. That is, by displaying recommended data or web page components of interest via the user interfaces described herein, users are able to view the most relevant data or web page components without needing to sift through an over-abundance of options and/or selections. The speed of user's navigation through such data saves users from paging through multiple web page templates and/or designs and thus, techniques described herein are directed to an improvement in the functioning of computers (and, in some examples, can be particularly helpful for computing devices with small screens).

Furthermore, techniques described herein are directed to unconventional, non-routine systems, methods, etc. that enable various efficiencies in merchant environments. That is, techniques described herein are directed to a network-based technical environment whereby network-connected devices including, but not limited to, merchant devices (which can be configured as point-of-sale (POS) terminals), customer devices, and payment processing servers, exchange data to enable merchants to create and/or edit web pages that are responsive and functional and, as described below, in synch with other business activities of merchants. Similarly, techniques described herein are directed to a network-based technical environment whereby network-connected devices including, but not limited to, merchant devices (which can be configured as point-of-sale (POS) terminals), customer devices, and payment processing servers, exchange data to enable merchants to synchronize web-based actions and/or activities with actions and/or activities at brick-and-mortar locations to enable merchants to seamlessly utilize services offered by web platforms and/or POS platforms for holistically managing their businesses. That is, the unconventional, non-routine systems, methods, etc. described herein enable various efficiencies in merchant environments.

While techniques described herein are described in the context of creating and/or editing web pages, techniques described herein can be additionally or alternatively applicable for creating any online resource such as social media posts and links embeddable on other web pages or social media sites. That is, techniques described herein are directed to utilizing brick-and-mortar POS activity to intelligently create and/or edit web pages, social media posts, links embeddable on other web pages or social media sites to enable brick-and-mortar merchants to establish an online presence that is consistent with their brick-and-mortar presence. Similarly, data associated with web pages, social media posts, links embeddable on other web pages or social media sites can be used to inform creating and/or editing of other POS service features, as described herein.

FIG. 1 illustrates an example environment 100 for integrating brick-and-mortar point-of-sale (POS) activities and web page editing activities for achieving various efficiencies in the merchant ecosystem. That is, FIG. 1 depicts an example environment 100 for (i) utilizing transaction data associated with brick-and-mortar POS transaction(s) 102 to inform web page creation and/or editing and/or (ii) utilizing data associated with web pages facilitating eCommerce POS transaction(s) 104 to inform aspects of brick-and-mortar POS services. As described in more detail below, brick-and-mortar POS services can include services for managing payment processing, inventory, orders, invoices, payroll, appointments, fulfillment, marketing, gift cards, restaurants, delivery, etc. POS services more generally can include eCommerce web pages in addition to the brick-and-mortar POS services described above. Some brick-and-mortar POS services can be utilized for eCommerce services as well.

As illustrated in FIG. 1, merchants 106 can participate in transactions with customers 108 via POS systems at brick-and-mortar stores 110 of the merchants 106. For the purpose of this discussion, a merchant can be an entity that offers items (e.g., physical goods, digital goods, services, etc.) for acquisition (e.g., sale, rent, lease, borrow, free, etc.). For the purpose of this discussion, a customer can be an entity that acquires, or seeks to acquire, items offered for acquisition by merchants 106. In some examples, merchants 106 can sell items from physical stores, such as brick-and-mortar stores 110 (e.g., in addition, or as an alternative, to online stores). In such examples, merchants 106 can use POS systems (e.g., computing device(s) configured as POS terminals) to generate transaction data indicative of payment data, user authentication data, point-of-purchase information (e.g., indicative of items sold, locations of the items sold, prices of the items sold, parties to the transaction, etc.), transaction type, etc. The POS systems, described in more detail below, can transmit the transaction data to a payment processing service which can process payments for the items sold on behalf of the merchants 106. For the purpose of this discussion, transactions wherein the POS is a brick-and-mortar store can be called "brick-and-mortar POS transactions" or "brick-and-mortar transactions."

Further, in some examples, merchants 112 can participate in transactions with customers 114 via online stores. Web page(s) 116 can be configured to present item(s) offered for acquisition to customers 114, thereby comprising "online store(s)." The customers 114 can interact with the web page(s) 116 to add items to a virtual cart and can provide payment data associated with a payment instrument to pay for the items in the virtual cart. In at least one example, the web page(s) 116 (e.g., user interfaces associated therewith) can generate transaction data indicative of payment data, user authentication data, point-of-purchase information (e.g., indicative of items sold, locations of the items sold, prices of the items sold, parties to the transaction, etc.), transaction type, etc. associated with the online transactions and can send the transaction data to a payment processing service to process payments for the items sold on behalf of the merchants 112. In some examples, the payment processing service for processing payments for eCommerce transactions can be the same payment processing service used by the brick-and-mortar merchants 106 or a different payment processing service. For the purpose of this discussion, transactions wherein the POS is a website can be called "eCommerce POS transactions," "eCommerce transactions," or "online transactions."

It should be noted that the merchants 106 and the merchants 112 can be the same or different merchants. For the purpose of this discussion, "different merchants" can refer to two or more unrelated merchants. "Different merchants" therefore can refer to two or more merchants that are different legal entities that do not share accounting, employees, branding, etc. "Different merchants," as used herein, have different names, EINs, lines of business (in some examples), inventories (or at least portions thereof) and/or the like. That is, the use of the term "different merchants" does not refer to a merchant with various merchant locations or franchise/franchisee relationships. A merchant, can however, have various merchant locations. Furthermore, in some examples, the customers 108 and the customers 112 can be the same or different customers.

In an example, the environment 100 can include one or more server computing devices 118. In some examples, one or more of the server computing device(s) 118 can perform actions on behalf of the payment processing service. That is, in at least one example, actions attributed to the payment processing service can be performed by one or more of the server computing device(s) 118. In at least one example, the server computing device(s) 118 can be in communication with the POS systems at the brick-and-mortar store(s) 110 via a network-based communication infrastructure.

Further, in at least one example, one or more of the server computing device(s) 118 can perform actions on behalf of a web service (e.g., hosting web pages and/or websites, editing web pages and/or websites, etc.). That is, actions attributed to the web service (or, web page editing service) can be performed by one or more computing devices of the server computing device(s) 118. In at least one example, the server computing device(s) 118 can be in communication with devices (e.g., instances of a user interface associated with such devices) used to view and/or edit web pages via the network-based communication infrastructure. Additional details associated with the server computing device(s) 118 are described below.

As described above, transaction data derived from the brick-and-mortar POS transaction(s) 102 can be leveraged to inform creation and/or editing of web page(s) 116. In some examples, transaction data derived from the brick-and-mortar POS transaction(s) 102 can be leveraged to inform presentation of web page(s) 116 (e.g., selection of a variation of a web page that is relevant to a viewer). Furthermore, transaction data derived from eCommerce POS transaction(s) 104 can be used to inform POS services at brick-and-mortar store(s) 110. As such, techniques described herein are directed to integrating a platform for facilitating brick-and-mortar POS transactions and a platform for supporting editing of web pages that facilitate eCommerce POS transactions (e.g., online transactions made via a web page) to enable merchants that utilize both brick-and-mortar and web page editing platforms (e.g., for editing eCommerce web pages) to more achieve various efficiencies, as described herein.

Figure 2:
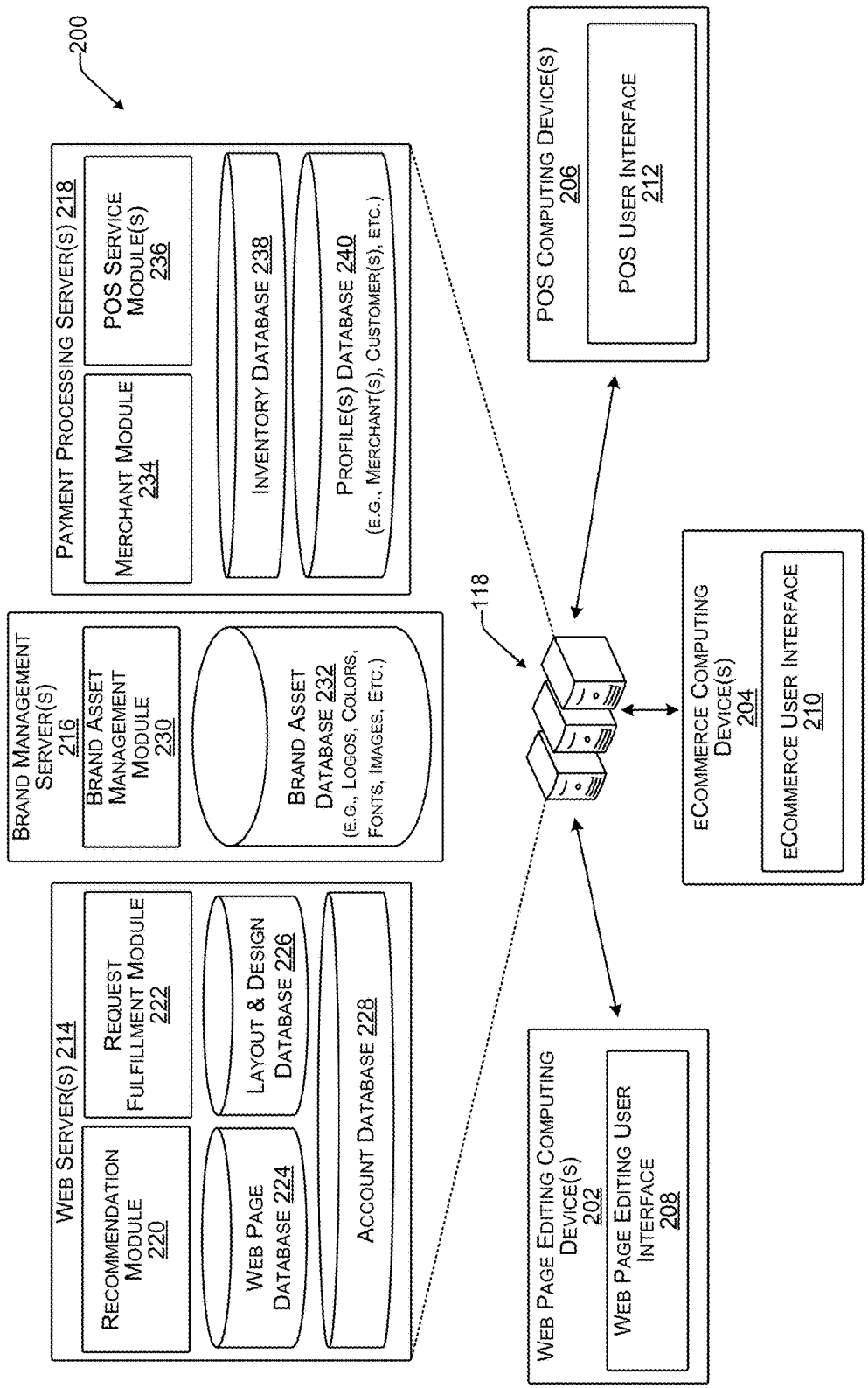
FIG. 2 illustrates additional details associated with the example environment described in FIG. 1.

FIG. 2 illustrates additional details associated with the environment 100 described above with reference to FIG. 1. Environment 200 includes the server computing device(s) 118 described above with reference to FIG. 1. Additionally, the environment 200 includes user computing device(s), including but not limited to web page editing computing device(s) 202, eCommerce computing device(s) 204, and POS computing device(s) 206. The web page editing computing device(s) 202, the eCommerce computing device(s) 204, and/or the POS computing device(s) 206 can be the same or different user computing device(s). Each of the user computing device(s) can have a user interface enabling users to interact with the respective user computing device(s). For instance, the web page editing computing device(s) 202 can be associated with a web page editing user interface 208, the eCommerce computing device(s) 204 can be associated with an eCommerce user interface 210, and the POS computing device(s) 206 can be associated with a POS user interface 212. In some examples, a user interface can be presented via a web browser, or the like, via a display of a user computing device. In at least one example, a user interface can be presented via an application, such as a mobile application, a desktop application, or an otherwise dedicated application.

The server computing device(s) 118 can include, but are not limited to, web server(s) 214, brand management server(s) 216, and payment processing server(s) 218. The server computing device(s) 118 can communicate with each other, as well as the user computing device(s), via a communication infrastructure provided by a network. The network can be any type of communication network such as the Internet, a Local Area Network (LAN), a Metropolitan Area Network (MAN), a Wide Area Network (WAN), a mobile wired or wireless network, a private network, a virtual private network, etc. In at least one example, the web server(s) 214, the brand management server(s) 216, and the payment processing server(s) 218 can be associated with application programming interface(s) (APIs) for transmitting data among one another. Additional or alternative functional components can additionally or alternatively be used for transmitting data among the web server(s) 214, the brand management server(s) 216, and the payment processing server(s) 218.

The web server(s) 214 can host web pages and/or websites. For the purpose of this discussion, a web page is a data item that can be rendered to generate a page of content with one or more visual elements (e.g., images, videos, text, etc.). Web pages can be viewable at uniform resource locators (URLs). As described below, a web page can be associated with web page features including, but not limited to, web page content, web page design, web page layout, web page components (e.g., widgets), etc. One or more web pages can be grouped together to comprise a website. That is, a website can include one or more individual web pages that are connected to each other (e.g., via hyperlinks). In some examples, a website can be associated with a web page hierarchy that describes relationships between different web pages of the website. Web pages and/or websites are described herein in the context of online stores and/or eCommerce; however, techniques described herein can be applicable to non-commerce web pages and websites as well.

The web server(s) 214 can host web pages and/or websites. In at least one example, the web server(s) 214 can provide a web page editing service and/or an eCommerce service (generally, web services). A web page editing service enables users to edit a web page. As used herein, "editing" a web page can correspond to editing an existing web page via a web editor associated with a web service (e.g., a web page editing service). Furthermore, in additional or alternative examples, "editing" a web page can correspond to creating a web page via a web editor associated with a web service. That is, as used herein, "editing" is not limited to making modifications to an existing web page and should be understood to be more broadly applicable to include creating a new web page as well.

In at least one example, the web server(s) 214 can include a recommendation module 220 and a request fulfillment module 222. The recommendation module 220 can determine recommendations, as described below. In some examples, the recommendation module 220 can determine recommendations responsive to receiving a query from the request fulfillment module 222, as described below. However, the recommendation module 220 can determine recommendations at any time and such recommendations can be stored, for instance, in a database associated with the web server(s) 214, as described below.

The request fulfillment module 222 receives and processes requests from user device(s). For example, the request fulfillment module 222 can receive a request from one of the web page editing computing device(s) 202 to edit a web page of a user of the web page editing computing device 222 and the request fulfillment module 222 can provide instructions for generating graphical user interface(s) for editing the web page to the web page editing computing device 222. Additional details are described below with reference to FIG. 4. Further, the request fulfillment module 222 can receive and fulfill requests to update the web page in the web page database 224 to incorporate modifications to the web page. Moreover, as described below, the request fulfillment module 222 can receive and fulfill requests to view a web page (e.g., from the eCommerce computing device(s) 204).

As described above, the environment 200 can include user computing device(s), including web page editing computing device(s) 202, which can exchange data with the request fulfillment module 222 to facilitate web page editing services. The web page editing computing device(s) 202 can be associated with a web page editing user interface 208, which can enable a user to edit a web page. In at least one example, a user can request a to edit a web page via the web page editing user interface 208 and the web page editing user interface 208 can receive instructions for rendering graphical user interface(s) for editing the web page. The web page editing user interface 208 can execute the instructions to render the graphical user interface(s) thereby enabling the user to edit the web page. In at least one example, the web page editing user interface 208 can receive user interactions with the graphical user interface(s) for editing a web page, make corresponding changes to the web page, and send edits to a web page back to the web server(s) 214. Such edits can be stored in association with the web page in the web page database 224. Additional details are described below with reference to FIGS. 3A-3E.

The web server(s) 214 can include a web page database 224, a layout and design database 226, and an account database 228. In some examples, the databases can be locally stored, in association with the modules, or can be stored remotely and can be accessible to the web server(s) 214.

The web page database 224 can store a plurality of web pages created by users of the web server(s) 214. Each web page in the web page database 224 can include instructions that define the size, position, and content of visual elements on the web page. Furthermore, the instructions associated with a web page in the web page database 224 can define one or more other web page features associated with the web page. The instructions can be stored as structured data that can be used to assemble markup language describing the page, in markup language (e.g., not as structured data), or as any other type of data that can be used to assemble the web page. The content of a visual element can be included as part of the instructions for the corresponding web page or stored as separate data items that are referenced in the instructions for the web page. For example, body text and headings on the web page can be included as part of the instructions, but images, inventory items, menus, etc. can be stored separately (e.g., alongside the web pages or on a separate server that is accessible to the web server(s) 214) and the instructions can include references to locations of such content. In at least one example, such instructions can include references to a location in the brand management server(s) 216 and/or the payment processing server(s) 218. Further, in at least one example, a web page in the web page database 224 can reference layout(s) and/or design(s) in the layout and design database 226 and/or other remotely located resources. In some examples, a web page in the web page database 224 can be associated with multiple variations of the web page. As described herein, a variations of web pages can vary by one or more web page features (e.g., web page layout, web page design, web page component(s) (e.g., widget(s)), web page content, etc.).

The layout and design database 226 can store data items that can be used to create and/or edit web pages (and web sites). Web page layouts can define the layout of content on a web page. Web page layouts can include frameworks, sections, and elements, which can have defined relationships. In some examples, sections and/or elements can be associated with particular web page components (e.g., widgets) and/or content. Additional details are described below with reference to FIGS. 3A-3E. Web page designs can define the appearance of a web page. Web page designs can include colors, fonts, spacing, user interface elements (e.g., buttons, forms, icons, etc.), etc. In some examples, web page layouts and/or web page designs can be associated with templates that are presented to a user as a recommended starting point for creating a web page. As described above, techniques described herein are directed to leveraging interchangeable sections and designs to generate visual diversity across different business verticals with minimal effort. That is, the layouts and designs stored in the layout and design database 226 can be combinatorially combined to generate visual diversity with minimal effort, as described herein.

The account database 228 can store data associated with accounts of users that use the web server(s) 214. In some examples, an account in the account database 228 can indicate a log-in associated with a user, demographic information associated with the user, payment instruments associated with the user (e.g., as used to pay for services of the web server(s) 214), linked accounts (e.g., to other services, etc.), online inventory of the user (e.g., if the user uses the web service for hosting an eCommerce web page), linked web pages of the user, domain(s) of the user, web page traffic (e.g., visitors, actions taken by visitors, etc.), eCommerce transaction data, etc. In some examples, accounts can be associated with (e.g., linked to) corresponding merchant profiles in the profile(s) database 240, described below. Account data can represent a profile of merchants that use the web service. That is, "profile" and "account" can be used interchangeably to refer to groupings of account data (e.g., by user/merchant) associated with the account database 228. At least a portion of the account data can be aggregated to represent aggregated transaction data representative of eCommerce activities of a merchant.

As described above, the web server(s) 214 can facilitate web page editing. Additionally, the web server(s) 214 can host web page(s) associated with online stores to facilitate eCommerce transactions. The eCommerce computing device(s) 204 can be associated with an eCommerce user interface 210 which can enable a user to view and/or interact with a web page to participate in online transactions. In at least one example, the eCommerce user interface 210 can present a graphical user interface via a display of the eCommerce computing device(s) 204, to enable a user to view and/or interact with a web page to participate in online transactions. Such a graphical user interface can be associated with a web page, an application, or the like. In at least one example, a user can request a web page via the eCommerce user interface 210 and the eCommerce user interface 210 can receive instructions from the request fulfillment module 222 for rendering the web page (e.g., in JSON or HTML). The eCommerce user interface 210 can execute the instructions to render a visual representation of the web page. The eCommerce user interface 210 can receive input from a user to purchase (or otherwise acquire) items presented for sale via the web page and the eCommerce user interface 210 can facilitate an online transaction. In at least one example, the eCommerce user interface 210 can utilize a payment processing service (e.g., associated with the payment processing server(s) 218 or another payment processing service) to process payment for the online transaction. Additional details are described below with reference to FIG. 6.

The brand management server(s) 216 can include a brand asset management module 230 and a brand asset database 232. As described above, a brand asset can be a logo (e.g., text logo, graphic logo, favicon, etc.), a font, a color, an image, an icon, a button style, effects, spacing, and the like used in association with a brand of the merchant. The brand asset database 232 can store information associated with brand assets of merchants. The brand asset management module 230 can manage the brand asset database 232. In some examples, the brand asset management module 230 can determine whether interactions with the web server(s) 214 and/or payment processing server(s) 218 affect a change to a brand asset of a merchant and, based at least in part on determining that an interaction affects a change, the brand asset management module 230 can update the brand asset (e.g., instructions associated therewith) in the brand asset database 232. Additionally, the brand asset management module 230 can provide the updated brand asset (e.g., instructions associated therewith) to the web server(s) 214 and/or payment processing server(s) 218 so that the brand asset is consistent across both (or all) platforms. Additional details associated with the brand management server(s) 216 and managing brand assets are described below.

The payment processing server(s) 218 can facilitate payment processing on behalf of merchants, as well as offering various other POS services. In some examples, the payment processing server(s) 218 can include a merchant module 234 for processing transactions on behalf of merchants. As described below in FIG. 5, in at least one example, the merchant module 234 can receive transaction data from POS computing device(s) 208. Transaction data can include, but is not limited to, encrypted payment data, user authentication data, point-of-purchase information (e.g., indicative of items sold, locations of the items sold, prices of the items sold, parties to the transaction, etc.), transaction type, etc. The merchant module 234 can send the transaction data to bank and/or card networks to determine whether the payment instrument provided is authorized for an amount of a transaction and can send an indication back to the POS computing device(s) 206 indicating whether the transaction is authorized or not. The merchant module 234 can facilitate payment of funds to bank accounts of merchants based on funds received from payments that are processed by the payment processing service. The merchant module 234 can additionally enable the merchant to manage transactions, payments, and so forth, via a dashboard. For the purpose of this discussion, a "dashboard" can be a user interface that provides an at-a-glance view of key information (e.g., associated with transactions, payments, etc.).

The payment processing server(s) 218 can additionally support other POS services via the POS service module(s) 236, which can supplement or otherwise be ancillary to the payment processing service. The other POS services can include, but are not limited to, management of inventory, orders, invoices, payroll, appointments, fulfillment, marketing, gift cards, restaurants, delivery, etc. For instance, the payment processing server(s) 218 can enable merchants to manage an inventory database 238 storing inventory data associated with item(s) offered for sale by the merchants. The inventory data, for example, can include a description of an item, a price of the item, a discount available for the item, taxes applicable to the item, a location of the item, image(s) of the item, characteristic(s) of the item, etc. The POS service module(s) 236 can enable a merchant to manage its inventory. The POS service module(s) 236 can similarly enable a merchant to manage other POS services.

Additionally, the payment processing server(s) 218 can include a profile(s) database 240, storing one or more merchant profiles, one or more customer profiles, etc. For the purpose of this discussion "profile" can be used interchangeably with "account" to refer to an account of a merchant or a customer with the payment processing service. At least a portion of the merchant data and/or customer data can be aggregated to generate aggregated data that is representative of brick-and-mortar activities of merchants and/or customers.

Merchant profiles can be associated with merchants that utilize the payment processing service. That is, the profile(s) database 240 can store merchant profiles associated with two or more different merchants (e.g., merchants, as described above. A merchant profile can include merchant data associated with a merchant including, but not limited to, a merchant category classification (MCC), item(s) offered for sale by the merchant (e.g., inventory), transaction data associated with transactions conducted by the merchant (e.g., brick-and-mortar POS transactions, eCommerce POS transactions, etc.), bank information associated hardware (e.g., device type) used by the merchant, geolocations of physical stores of the merchant, previous loans made to the merchant, previous defaults on said loans, an indication of risk (e.g., based at least in part on fraud, chargeback, etc.) associated with the merchant, etc. In at least one example, a merchant profile can be mapped to, or otherwise associated with, a portion of the inventory database 238 associated with the merchant's inventory. Furthermore, in some examples, a merchant profile can be mapped to, or otherwise associated with, brand asset(s) in the brand asset database 232, an account of the web service 202, and/or one or more web pages (e.g., stored in the web page database 224). A merchant profile can store additional or alternative types of merchant data.

Customer profiles can be associated with customers of merchants that utilize the payment processing service. A customer profile can include customer data associated with a customer including, but not limited to, demographic information (e.g., name, phone number, address, banking information, etc.), customer preferences (e.g., learned or customer-specified), purchase history data (e.g., identifying one or more items purchased (and respective item information), payment instruments used to purchase the one or more items, returns associated with one or more orders, statuses of one or more orders (e.g., preparing, packing, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, interactions associated with such reservations, etc.), customer service data, etc. Additional or alternative customer data can be stored in the customer profiles.

In at least one example, the payment processing server(s) 218 can exchange data with the POS computing device(s) 206 to enable merchants to utilize services of the payment processing service. The POS user interface 212 can receive user interactions and can transmit indications of such user interactions to the payment processing server(s) 218. In at least one example, the POS user interface 212 can determine transaction data, which can be sent to the payment processing server(s) 218. Additional details associated with the payment processing service are described below with reference to FIG. 5.

It should be noted that this disclosure references a "web service platform" and a "payment processing platform." In at least one example, the "web service platform" can correspond to at least the web server(s) 214, the web page editing computing device(s), and/or the eCommerce computing device(s), and their associated functional components. The web service platform can provide web services, for instance, editing a web page, viewing and/or interacting with a web page (e.g., in association with shopping at an online store, etc.). Further, in at least one example, the "payment processing platform" can correspond to the payment processing server(s) 218 and the POS computing device(s) 206. The payment processing platform can provide payment processing services (and other POS services).

As described in more detail below, the modules described above with reference to FIG. 2 can be functional components that comprise instructions or programs that are executable by the processors and that, when executed, specifically configure the one or more processors to perform the actions attributed above to the respective module. Examples of functional components can include applications, APIs, and the like. While functional components are shown associated with particular server(s) in FIG. 2, in additional and/or alternative examples, functional components can be associated with other server(s) and/or remotely located computing devices (e.g., the user computing device(s), etc.). Furthermore, while the databases are shown as being stored locally with each of the server(s), the databases can be stored locally or remotely. When stored remotely, data stored in the databases can be accessible to the server computing device(s) 118. Moreover, techniques described herein are not limited to storing data in databases. Data can be stored in any type of data store, wherein the data is accessible to the server(s).

FIGS. 3A-3E illustrate example graphical user interfaces that can be presented via the web page editing user interface 208 to facilitate editing a web page.

Figure 3A:
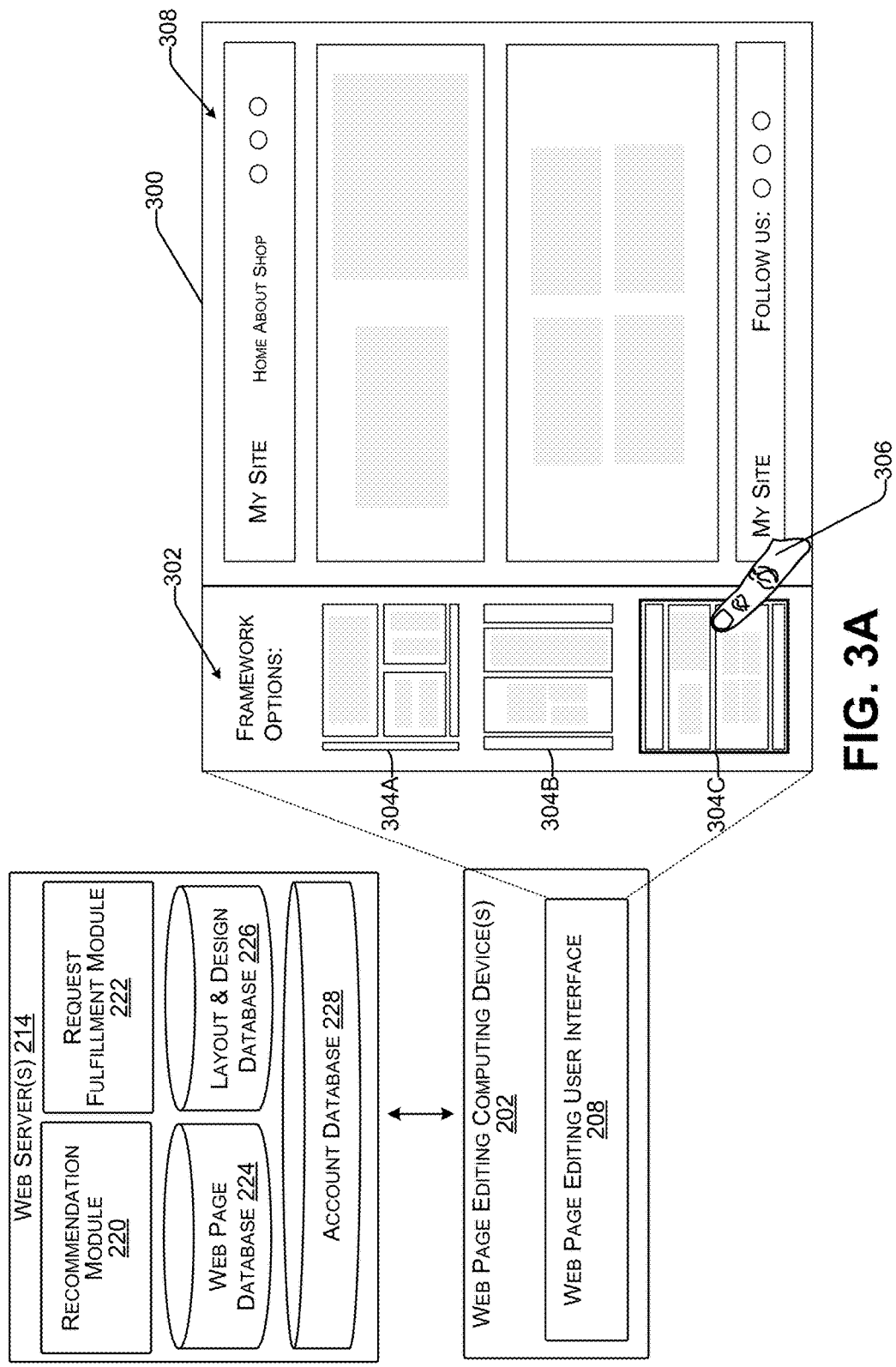
FIGS. 3A-3E illustrate example graphical user interfaces that can be presented via a web page editing user interface to facilitate editing a web page.

In at least one example, the web page editing user interface 208 can receive a request to edit a web page of a merchant. In such an example, the web page editing user interface 208 can present a graphical user interface to enable the merchant (or an agent acting on behalf of the merchant) to create and/or edit a web page. FIG. 3A illustrates a graphical user interface 300 that enables the merchant to select a framework for a web page. For the purpose of this discussion, "framework" is used to describe the structural configuration of the web page. The framework can indicate how sections (e.g., navigation, header, main content, footer, etc.) are arranged on an area of a web page. Furthermore, the framework can also determine how the sections are displayed on different end-user devices (e.g., mobile phone, tablet, laptop, etc.). Instructions for generating different frameworks can be stored in the layout and design database 226.

In at least one example, responsive to receiving a request to edit a web page, the web page editing user interface 208 can send a request to the request fulfillment module 222. The request fulfillment module 222 can access the layout and design database 226 to access one or more frameworks. Each framework can be associated with instructions for generating the corresponding framework. The request fulfillment module 222 can send instructions to the web page editing user interface 208 to present a graphical user interface 300 that includes a representation of the one or more frameworks that are available for the web page. The graphical user interface 300 includes a panel 302 comprising representations 304A-C of frameworks that are available for the web page. While three frameworks are represented, any number of frameworks are possible.

The graphical user interface 300 can additionally include a second panel 308 that can present a representation of the web page that is being edited. If a web page already exists, the web page editing user interface 208 can render a visual representation of the existing web page in the second panel 308, and the existing framework can appear highlighted, for example. In such an example, the web page editing user interface 208 can receive instructions for rendering the (existing) web page (e.g., in JSON or HTML). The web page editing user interface 208 can execute the instructions to render a visual representation of the existing web page in the second panel 308. If a web page does not already exist, the web page editing user interface 208 can render a visual representation of a template of a web page having a framework corresponding to the selected framework. In such examples, the web page can be "blank" (e.g., without content) or can include at least some pre-populated content, as described below. In some examples, as a user 306 interacts with a representation (e.g., representation 304C), web page configured in the corresponding framework can be presented in the second panel 308 in the graphical user interface 300. As the user 306 edits the web page, the web page editing user interface 208 can determine interactions with the web page and can update the web page in real-time or near real-time so that the user 306 can view modifications to the layout, design, content, etc. in real-time or near real-time. In some examples, the user 306 can toggle between different layout options, the changes which can be viewed in the second panel 308, all while keeping the same content.

In at least one example, the user 306 can select one of the frameworks by interacting with the graphical user interface 300 (e.g., touch input, actuation of an input/output device, etc.). Responsive to receiving a selection, the web page editing user interface 208 can update the user interface 300. In at least one example, the web page editing user interface 208 can send an indication of the user selection back to the web server(s) 214 and such a selection can be stored in association with the web page in the web page database 224. In some examples, a user may need to confirm a modification via an input associated with the web page editing user interface 208 (e.g., activation of a "save" control, etc.). In examples where the web page is associated with content, when the user 306 changes the framework, the framework can change but the content associated with the web page can persist (albeit in a different layout).

In at least one example, and as described in additional detail below, the recommendation module 220 can identify frameworks to recommend to merchants based at least in part on brick-and-mortar POS transaction data associated with the merchant (or, in some examples, other similar merchants), data associated with eCommerce web sites of other merchants, etc. For instance, machine-learning mechanisms can be employed to recommend frameworks to users based on their vertical (e.g., MCC), location, etc., which can be determined from brick-and-mortar POS transaction data available via the payment processing server(s) 218.

Figure 3B:
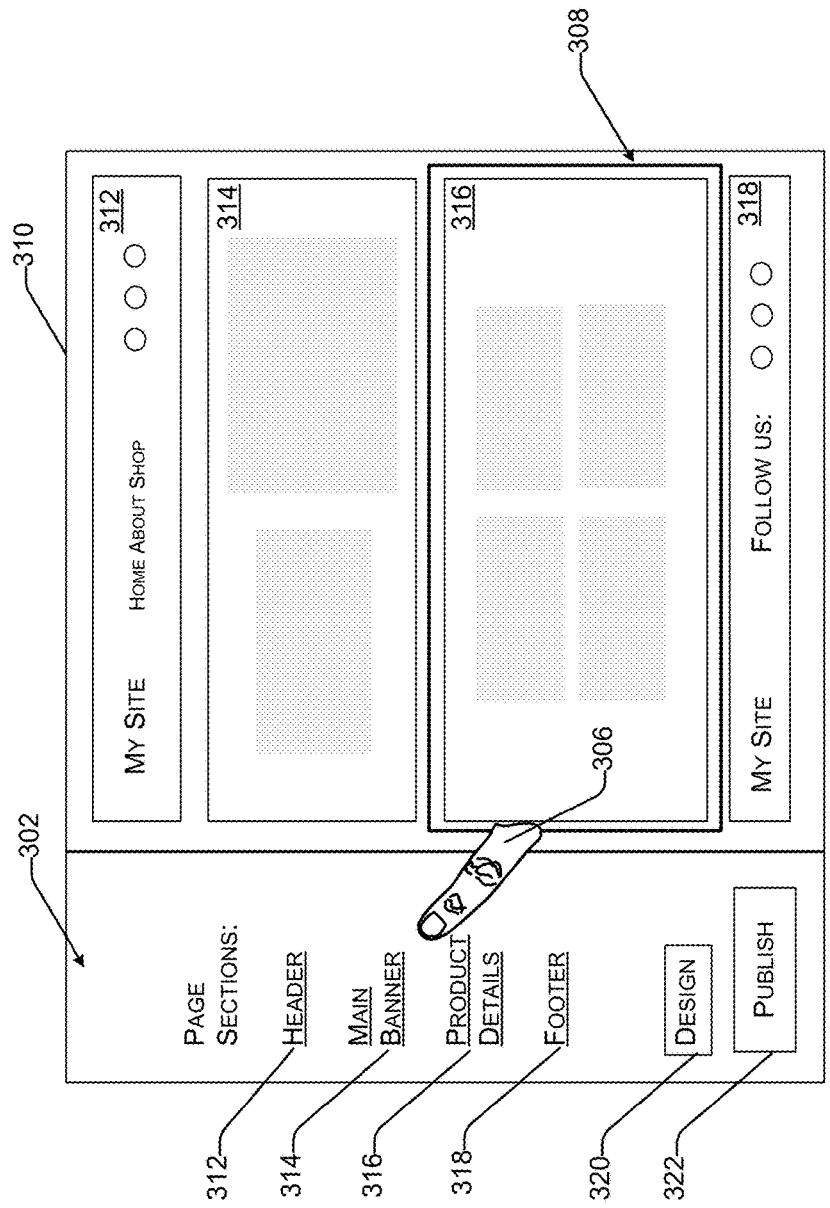

FIG. 3B illustrates another graphical user interface 310 that can be presented by the web page editing user interface 208. The graphical user interface 310 can enable the user 306 to customize individual sections of the selected framework. As illustrated, the first panel 302 has been updated to include selectable controls corresponding to individual sections that comprise the framework. For instance, a first selectable control corresponds to a header section 312, a second selectable control corresponds to a main banner section 314, a third selectable control corresponds to a product details section 316, and a fourth selectable control corresponds to a footer section 318. For the purpose of this discussion, "sections" are used to describe purpose-based groupings of elements. The way that the sections are configured (pursuant to the framework) can indicate the content layout of the web page. In some examples, relationships between sections and frameworks can be predefined by programmers prior to being available to end users. Each section can have one or more options associated with how content is configured within that section. That is, sections can have configurable layouts.

Figure 3C:
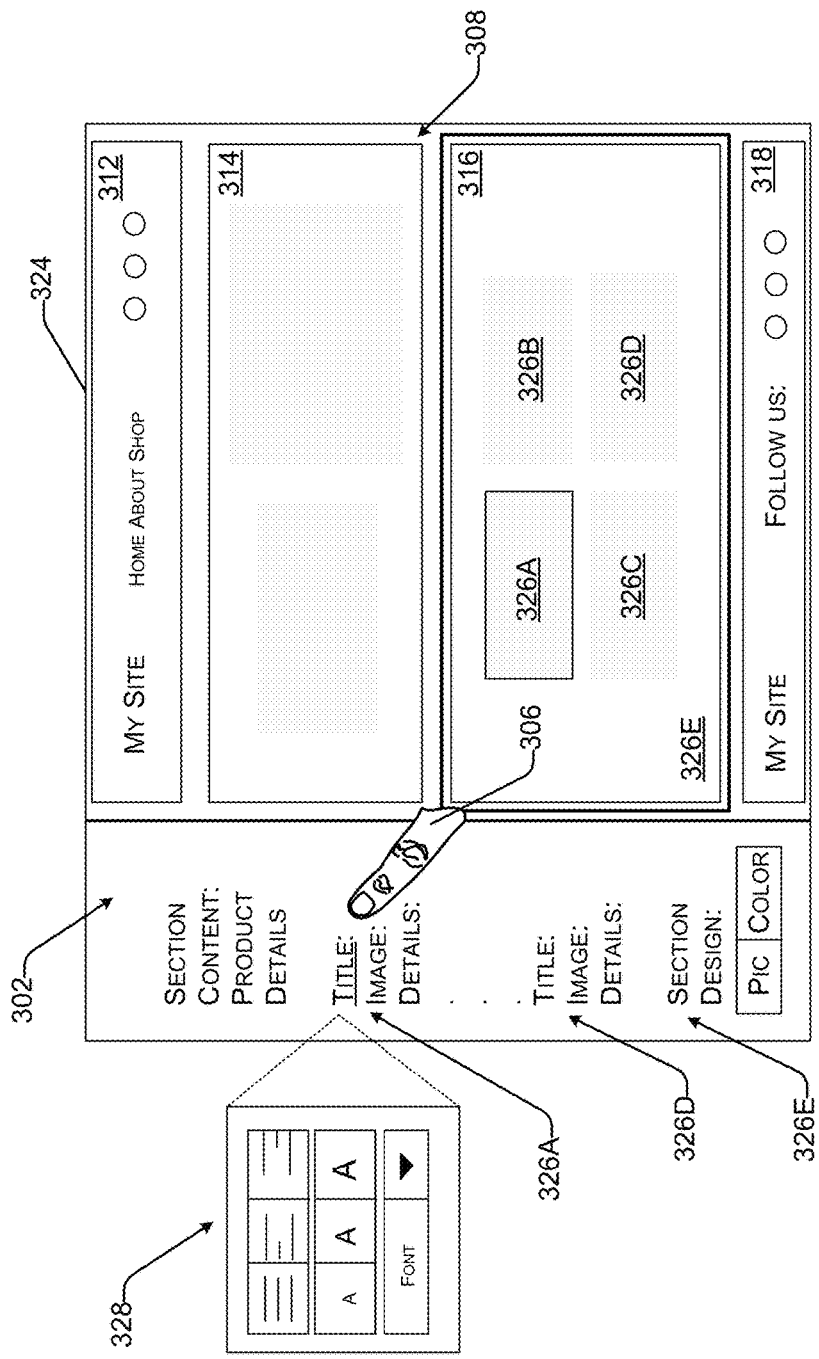
Figure 3D:
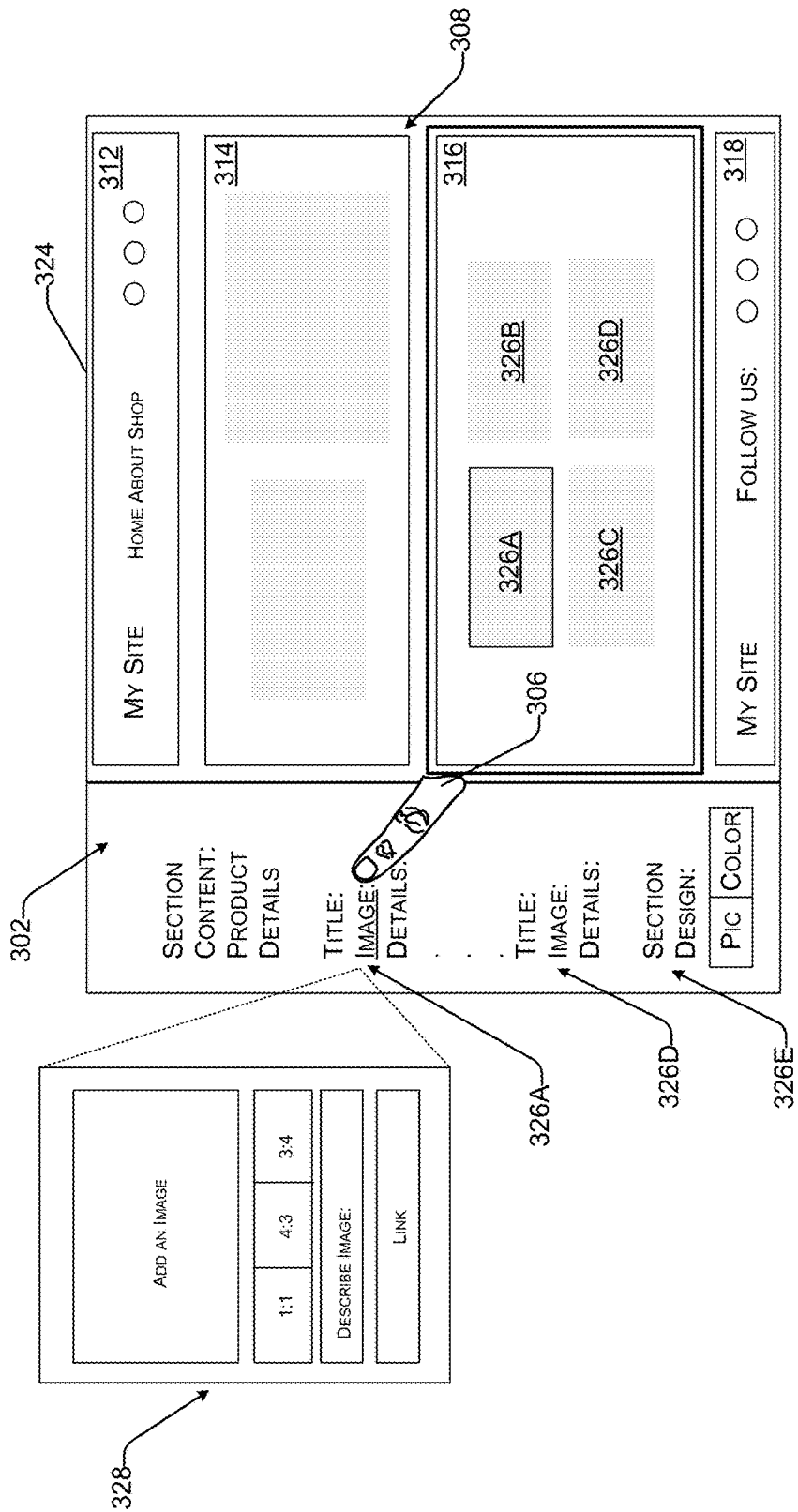

In at least one example, the user 306 can actuate one of the selectable controls, such as the selectable control associated with the product details 316, and the web page editing user interface 208 can cause an update to the graphical user interface 310 to enable the user 306 to edit the content of the section. FIGS. 3C and 3D illustrate another example graphical user interface 324 that enables the user 306 to edit one or more elements within a section. For the purpose of this discussion, "element" or "visual element" is used to describe a content item within a section. Each section can have one or more elements, which, in some examples, can be predefined by programmers prior to being provided to the end users.

In at least one example, elements can be associated with content or links to content, which can be dynamic. In some examples, elements can be connected to data sources (e.g., instructions associated with a section can include a reference to a location of a data source). Such connections can enable the content associated with the elements to be updated in near real-time or real-time (e.g., dynamically). In an example, an element can be connected to a menu data source and can be updated in near real-time or real-time if/when an item on the menu is updated (e.g., price, availability, etc.). In an additional example, an element can be linked to the inventory database 238 and can be updated in real-time or near real-time as the inventory database 238 is updated. Further, as yet another example, an element can be linked to a brand asset in the brand asset database 232 such that when a brand asset is updated, the brand asset corresponding to the element can be updated in real-time or near real-time. In some examples, elements can be associated with web page components (e.g., widgets). In an example, an element can be associated with a reservation web page component to enable customers to make reservations for dining at a particular restaurant.

In at least one example, and as described in additional detail below, a content can be intelligently recommended by the recommendation module 220 based at least in part on brick-and-mortar POS transaction data associated with the merchant (or, in some examples, other similar merchants), data associated with eCommerce web sites of other merchants, etc. For instance, machine-learning mechanisms can be employed to recommend content to users based on their vertical (e.g., MCC), location, etc., which can be determined from brick-and-mortar POS transaction data available via the payment processing server(s) 218.

As illustrated in FIG. 3C, the product details section 316 has at least five elements 326A-E which correspond to items that are offered for sale by the merchant and a background element (326E) for the section. The user 306 can select one of the elements (e.g., 326A) and can add content (e.g., text, image, etc.) to the element. In some examples, the graphical user interface 324 can present the elements via the first panel 302 and the user 306 can interact with individual of the elements.

Responsive to receiving an input associated with an element, the web page editing user interface 208 can present one or more options 328 for customizing the content and/or design of the element. For instance, if the user 306 selects the "title" element to edit, the one or more options 328 can include alignment, font size, font type, etc. Or, as shown in FIG. 3D, if the user 306 selects the "image" element, the one or more options can include adding an image, selection an aspect ratio, describing the image, adding a link to the image, etc. In some examples, the one or more options 328 can be presented via a pop-up that overlays the graphical user interface 324, a new graphical user interface, etc. In at least one example, in addition to enabling the user 306 to edit elements in the section, the user 306 can freely add, remove, and/or rearrange elements from a section. In at least one example, as the user 306 interacts with individual elements (e.g., by selecting options and/or providing content), the web page editing user interface 308 can update the corresponding element in the second panel 308 in the graphical user interface 324. Accordingly, the user 306 can view its edits in near real-time or real-time.

In some examples, as described herein, the one or more options 328 can be intelligently suggested to the user 306. For instance, in at least one example, the recommendation module 220 can analyze data (e.g., associated with the merchant, merchants similar to the merchant, etc.) to make recommendations regarding which options 328 to present to the user 306 and/or which options 328 the user 306 should select, which can be based on vertical (e.g., MCC), location, etc. Moreover, in at least one example, the recommendation module 220 can utilize brick-and-mortar POS data to make intelligent recommendations regarding when and/or how to present particular content. For instance, brick-and-mortar POS data can indicate that particular items sell better at particular times, on particular days, during particular seasons, in particular locations, etc. The recommendation module 220 can thus surface recommendations to include content associated with such items at the particular times, on the particular days, during the particular seasons, in association with merchants and/or customers in the particular locations, and the like. Furthermore, in some examples, at least some of the content corresponding to the elements in a section can be pre-populated based on brick-and-mortar POS transaction data.

In at least one example, any edits made to the web page can be received via the web page editing user interface 208, and the web page editing user interface 208 can send an indication of the user selection back to the web server(s) 214. In some examples, a user may need to confirm a modification via an input associated with the web page editing user interface 208 (e.g., activation of a "save" control, etc.). Resulting modifications can be stored in association with the web page in the web page database 224.

Figure 3E:
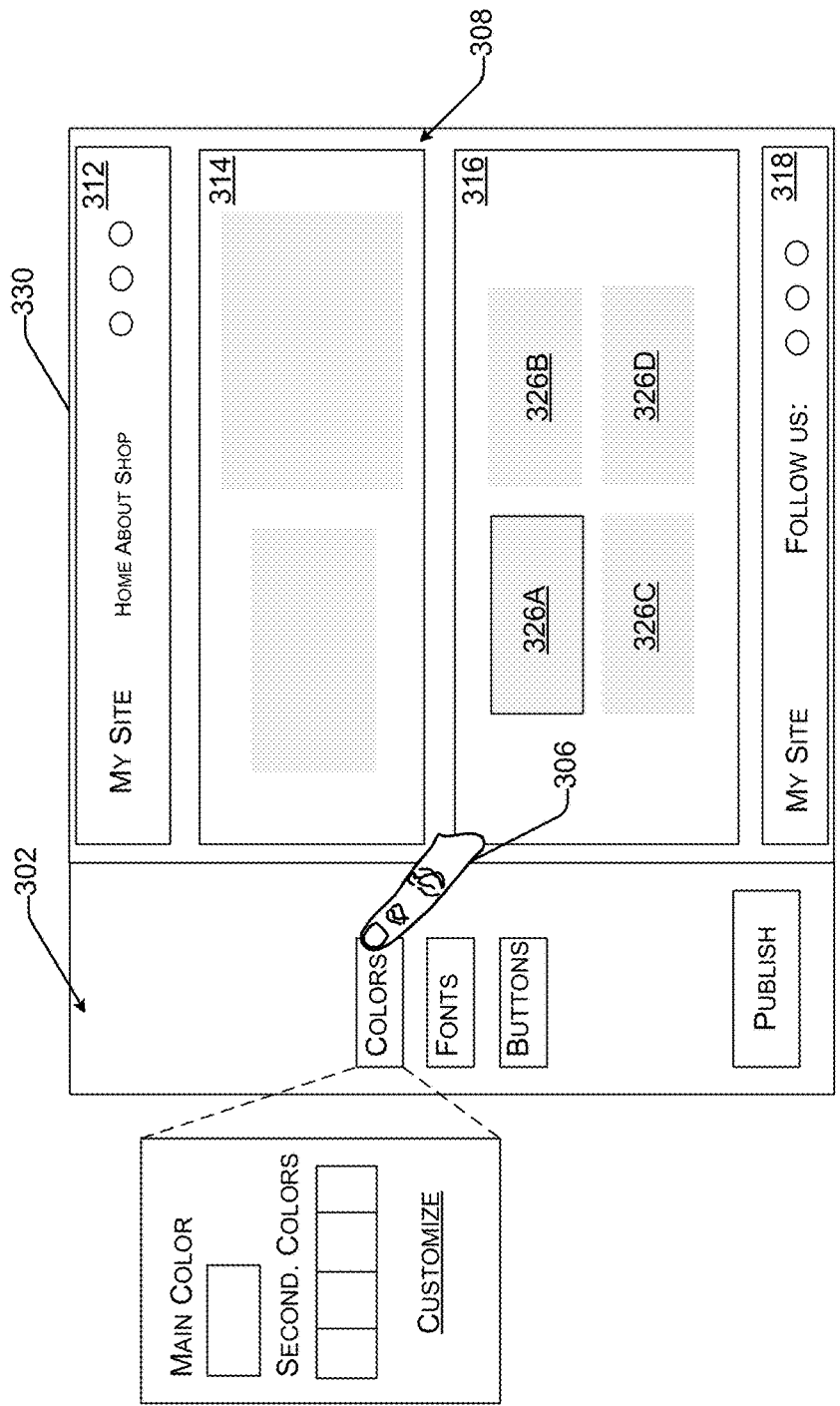

Returning back to FIG. 3B, in some examples, the graphical user interface 310 can include selectable control(s) that enable the user 306 to edit the design of the web page (e.g., design 320) and/or publish the web page (e.g., publish 322). Responsive to the user 306 selecting the design 320 selectable control, the web page editing user interface 208 can cause an update to the graphical user interface 310 to enable the user 306 to edit the design of the web page, as illustrated in FIG. 3E. FIG. 3E illustrates another example of a graphical user interface 330 to enable the user 306 to edit the design of the web page. For the purpose of this discussion, the "design" of the web page can refer to the aesthetic aspects of the web page, such as, but not limited to, colors, fonts, spacing, user interface elements (e.g., buttons, forms, icons, etc.), etc.

In at least one example, responsive to receiving a request to edit the design of the web page (e.g., signaled by the selection of the design 320 selectable control), the web page editing user interface 208 can send a request to the request fulfillment module 222. The request fulfillment module 222 can access the layout and design database 226 to access one or more design options. The request fulfillment module 222 can send instructions to the web page editing user interface 208 to present the graphical user interface 330 that includes a representation of the one or more design options that are available for the web page.

In at least one example, responsive to the user 306 changing the design of the web page, the web page editing user interface 208 can cause the design to be applied to the framework, sections, and elements of the web page. That is, the user 106 need only interact with a design feature once to affect a change to the entire web page (e.g., framework, sections, elements). In some examples, as described herein, one or more design options 332 can be intelligently suggested to the user 306. For instance, in at least one example, the recommendation module 220 can analyze data (e.g., associated with the merchant, merchants similar to the merchant, etc.) to make recommendations regarding web design (e.g., colors, fonts, spacing, user interface elements (e.g., buttons, forms, icons, etc.), etc.).

In some examples, as a user 306 interacts with the web page editing user interface 308, the web page editing user interface 308 can update the web page design in the second panel 308 in the graphical user interface 330. Accordingly, the user 306 can view its edits in near real-time or real-time. Furthermore, as described above, in at least one example, any edits made to the web page can be received via the web page editing user interface 208, and the web page editing user interface 208 can send an indication of the user selection back to the web server(s) 214. In some examples, a user may need to confirm a modification via an input associated with the web page editing user interface 208 (e.g., activation of a "save" control, etc.). Resulting modifications can be stored in association with the web page in the web page database 224. In some examples, a design modification can affect a brand asset of a merchant. In such examples, the brand asset can be updated in the brand management server(s) 216 and accessible to other POS services, as described below.

Again, returning to FIG. 3B, responsive to the user 306 selecting the publish 322 selectable control, the web page editing user interface 208 can send a request to the web server(s) 202 to publish the web page and the web page editing user interface 208 can receive instructions for rendering the (edited) web page (e.g., in JSON or HTML). The web page editing user interface 208 can execute the instructions to render a visual representation of the web page. The web page editing user interface 208 can include components that interpret structured data (e.g., JSON) to assemble markup language (e.g., HTML) and generate information associated with the rendered web page. As a result, the user 306 can view its edits to the web page in near real-time or real-time.

While FIGS. 3A-3E are directed to editing a web page. As described above, a website can comprise one or more web pages. As such, when a merchant edits a web page, the merchant is consequently editing the associated website. In some examples, the frameworks, sections, and elements can be associated with multiple web pages and some web pages of a website can have different frameworks, sections, and elements. In at least one example, responsive to the user 306 modifying the design of a web page, the design can be implemented across all web pages associated with the same website.

Furthermore, while the user 306 referenced above is a merchant, techniques described herein can be applicable for all types of users. Additionally, the graphical user interfaces depicted are examples of graphical user interfaces that can be presented via the web page editing user interface 208. Additional and/or alternative configurations are within the scope of this disclosure.

As noted above, and reiterated here, in at least one example, a user can modify web page layouts and/or designs without affecting the content that has been added to the web page. That is, in at least one example, content can be associated with an object that is independent from the layout and/or design. As such, if a user modifies the layout and/or design of a web page, the content can persist. For instance, if the user has added product descriptions for each of the items offered for sale via an online store and the user decides to change the framework, the content can persist despite the change in the layout of the web page. Similarly, if the user has added product descriptions for each of the items offered for sale on via an online store and the user decides to change the color palette, the content can persist despite the change in the design of the web page.

Figure 4:
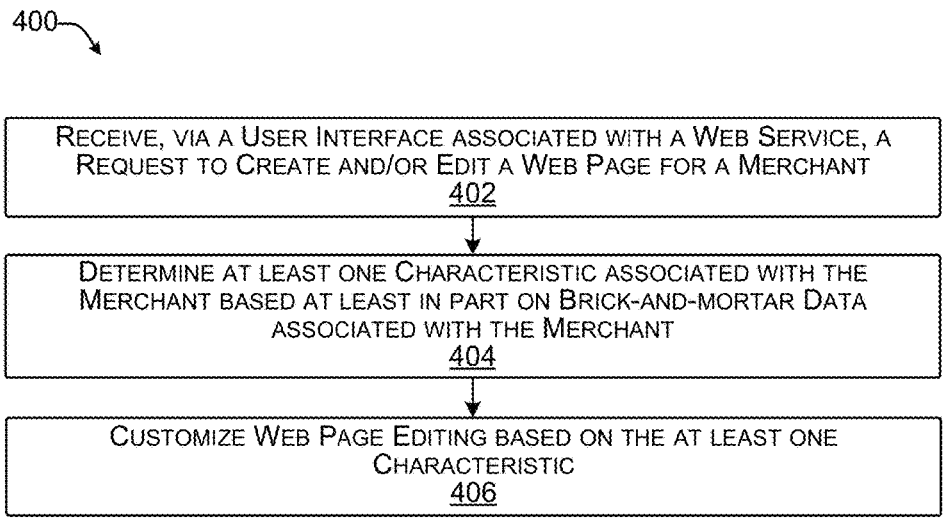
FIG. 4 illustrates an example process for customizing web page editing based on characteristics of a user.

FIG. 4 illustrates an example process 400 for customizing web page editing based on characteristics of a user.

Block 402 illustrates receiving, via a user interface associated with a web service, a request to create and/or edit a web page for a merchant. In at least one example, a merchant can interact with a user interface to request to edit a web page. In some examples, the request can be associated with an identifier of the merchant. For instance, the merchant can be logged-in to an account of the web service and the request, which can be sent from the web page editing user interface 208, can be associated with account information identifying the merchant. In an additional or alternative example, the merchant can be logged-in to an account of the payment processing service and the request, which can be sent from the POS user interface 212, can be associated with an identifier of the merchant. For instance, the request can be initiated by an interaction with a selectable control (or other input mechanism) presented in association with a dashboard of the merchant. The web page editing user interface 208 and/or the POS user interface 212 can send the request to the request fulfillment module 222.

Responsive to receiving the request, the request fulfillment module 222 can access the account database 228 and/or the web page database 224 to determine whether the merchant is associated with an account and/or a web page. If the merchant is associated with a web page, the request fulfillment module 222 can access the web page from the web page database 224. If the merchant is not associated with an account and/or a web page, the request fulfillment module 222 can access a blank web page. Additionally, as described above, the request fulfillment module 222 can access the layout and design database 226 to determine available layouts and designs available for the web page.

Block 404 illustrates determining at least one characteristic associated with the merchant based at least in part on brick-and-mortar data associated with the merchant. In at least one example, prior to sending instructions for rendering the graphical user interface(s) to the web page editing user interface 208, the request fulfillment module 222 can query the recommendation module 220 to determine whether the recommendation module 220 has any recommendations for customizing the web page and/or the creation and/or editing thereof. Responsive to receiving the query the recommendation module 220 can send a request to the payment processing server(s) 218 for access to brick-and-mortar data associated with the merchant. In some examples, the recommendation module 220 can access transaction data associated with brick-and-mortar transactions processed by the payment processing server(s) 218 and can determine at least one characteristic associated with the merchant based on the brick-and-mortar transaction data. For instance, the recommendation module 222 can determine an MCC associated with the merchant based on brick-and-mortar transaction data, a price-point associated with the merchant (e.g., budget, moderate, high-end, etc.), etc. based on the brick-and-mortar transaction data. Additional or alternative data associated with the merchant that is stored in the profile(s) database 240 (e.g., merchant profile)

can additionally or alternatively be used to determine at least one characteristic of the merchant. For instance, merchant data can indicate a location of the merchant, inventory of the merchant, eCommerce transactions of the merchant, etc.

In at least one example, the at least one characteristic can be inferred based on POS transaction data of merchants that are similar to the requesting merchant. For instance, if the merchant does not have a merchant profile associated with the payment processing server(s) 218, account data and/or sign-in data can be used to compare the merchant with other merchants that do have merchant profiles associated with the payment processing server(s) 218. In at least one example, the at least one characteristic can be inferred based on merchant data associated with the similar merchants. Additional details are described below.

Block 406 illustrates customizing web page editing based on the at least one characteristic. In at least one example, the recommendation module 220 can determine a recommendation for customizing web page editing based on the at least one characteristic. In some examples, such a recommendation can be associated with one or more features of a web page, including but not limited to, a web page design, a web page layout, a web page component (e.g., widget), web page content, etc. In some examples, the recommendation module 220 can utilize rules, statistical analyses, machine-trained models, etc. to generate such recommendations. Based at least in part on determining the recommendation, the recommendation module 220 can provide the recommendation to the request fulfillment module 222. In at least one example, the request fulfillment module 222 can leverage the recommendation to incorporate the recommendation into the instructions for rendering a graphical user interface for editing the web page. In some examples, a recommended web page feature can be emphasized or otherwise represented such to call attention to the recommendation. In an additional or alternative example, the request fulfillment module 222 can send the recommendation with the instructions for rendering the graphical user interface for editing the web page. In such an example, the recommendation can be associated with a pop-up, a callout, or other directive presented in association with the graphical user interface. Both incorporating the recommendation into the instructions for rendering a graphical user interface for editing a web page and/or surfacing a recommendation via the graphical user interface can be considered "presenting a recommendation" for the purposes of this discussion.

The request fulfillment module 222 can send the instructions to the web page editing user interface 208 and the web page editing user interface 208 can execute the instructions to render the graphical user interface for editing the web page. In at least one example, the graphical user interface can be customized for the merchant (or be associated with a recommendation for customizing the graphical user interface) based on at least one characteristic of the merchant. Such customization can affect the graphical user interface through which the merchant can edit the web page (e.g., the editing component) and/or a web page feature associated with the web page (e.g., the web page itself). For the purpose of this discussion, a "web page feature" can be any feature of a web page such as the layout, the design, web page components (e.g., widgets), content, etc.

In some examples, as described above, a merchant can be editing a new web page (e.g., creating a web page). In additional or alternative examples, a merchant can be editing an existing web page. Recommendations as described herein can be associated with either or both examples. That is, in some examples, the recommendation module 220 can make recommendations for creating a web page and/or editing an existing web page. In at least one example, the request fulfillment module 222 can determine how to surface the recommendation and can generate instructions for surfacing the recommendation as described above.

While reference is made herein to modifying a graphical user interface and/or what is presented via the graphical user interface to customize editing of a web page, in additional or alternative examples, recommendations can be utilized to modify any means for editing a web page. For instance, a user can edit a web page via a spoken instruction and in such an example, a voice user interface can be generated and/or modified based on a recommendation.

Figure 5:
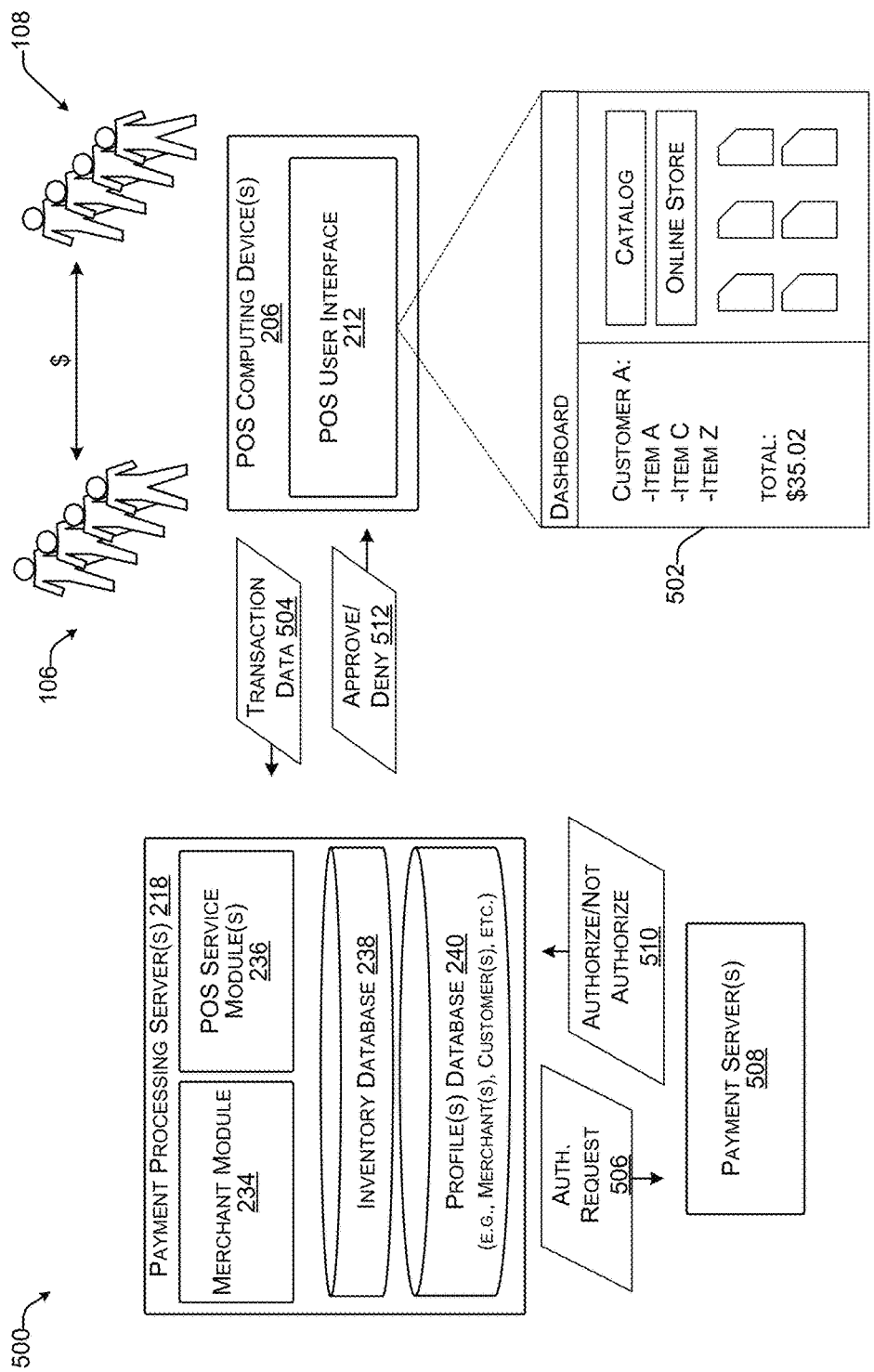
FIG. 5 illustrates an example environment for processing payments associated with brick-and-mortar POS transactions via a payment processing service.

FIG. 5 illustrates an example environment 500 for processing payments for brick-and-mortar POS transactions via a payment processing service. As described above, in at least one example, merchants 106 can utilize POS systems (e.g., POS computing device(s) 206) at brick-and-mortar locations 110 to process payments for items sold to customers 108. In at least one example, a merchant 106 can interact with the POS user interface 212 to generate and/or process a POS transaction. In at least one example, the POS user interface 212 can present a graphical user interface 502 to enable a merchant 106 to add items to a ticket (e.g., a data structure storing data associated with a transaction), order the items based on a ticket (if appropriate), manage one or more open tickets (e.g., data structures storing data associated with not-yet-settled transactions), access a catalog of items available for sale, access a corresponding online store, etc. In some examples, the graphical user interface 502 can enable the merchant 106 (or, in some examples, a customer 108) to access and/or interact with other POS services, as described above. Further, in at least one example, the POS user interface 212 can enable the POS computing device(s) 206 to interact with one or more payment readers to obtain payment data associated with payment instruments used to pay for transactions.

In at least one example, the POS user interface 212 can determine transaction data 504, which can be sent to the payment processing server(s) 218 (e.g., the merchant module 234). The transaction data 504 can be sent to the payment processing server(s) 218 with a request to authorize the tendered payment instrument for a cost of the associated transaction. The merchant module 234 can receive the transaction data 504 and can send authorization request 506 to one or more payment servers 508. The payment server(s) 508 can be associated with payment instrument issuers (e.g., financial institutions that issue payment instruments), payment instrument networks (e.g., entities that decide where payment instruments can be used and facilitate payments made using payment instruments to merchants through banks), and/or banks (e.g., financial institutions that takes in deposits and/or lends money). The payment server(s) 508 can determine whether the payment instrument is authorized for the cost of the transaction and can send an indication 510 of whether the payment instrument is authorized (or not) to the payment processing server(s) 218. The merchant module 234 can receive the indication 510 and can forward an indication 512 to the POS computing device(s) 206 indicating whether the transaction is approved or denied.

The transaction data 504 can be stored in association with merchant and/or customer profiles in the profile(s) database 240, and can be used for informing web page editing, as described below. Such transaction data can be brick-and-mortar transaction data, as described above.

Figure 6:
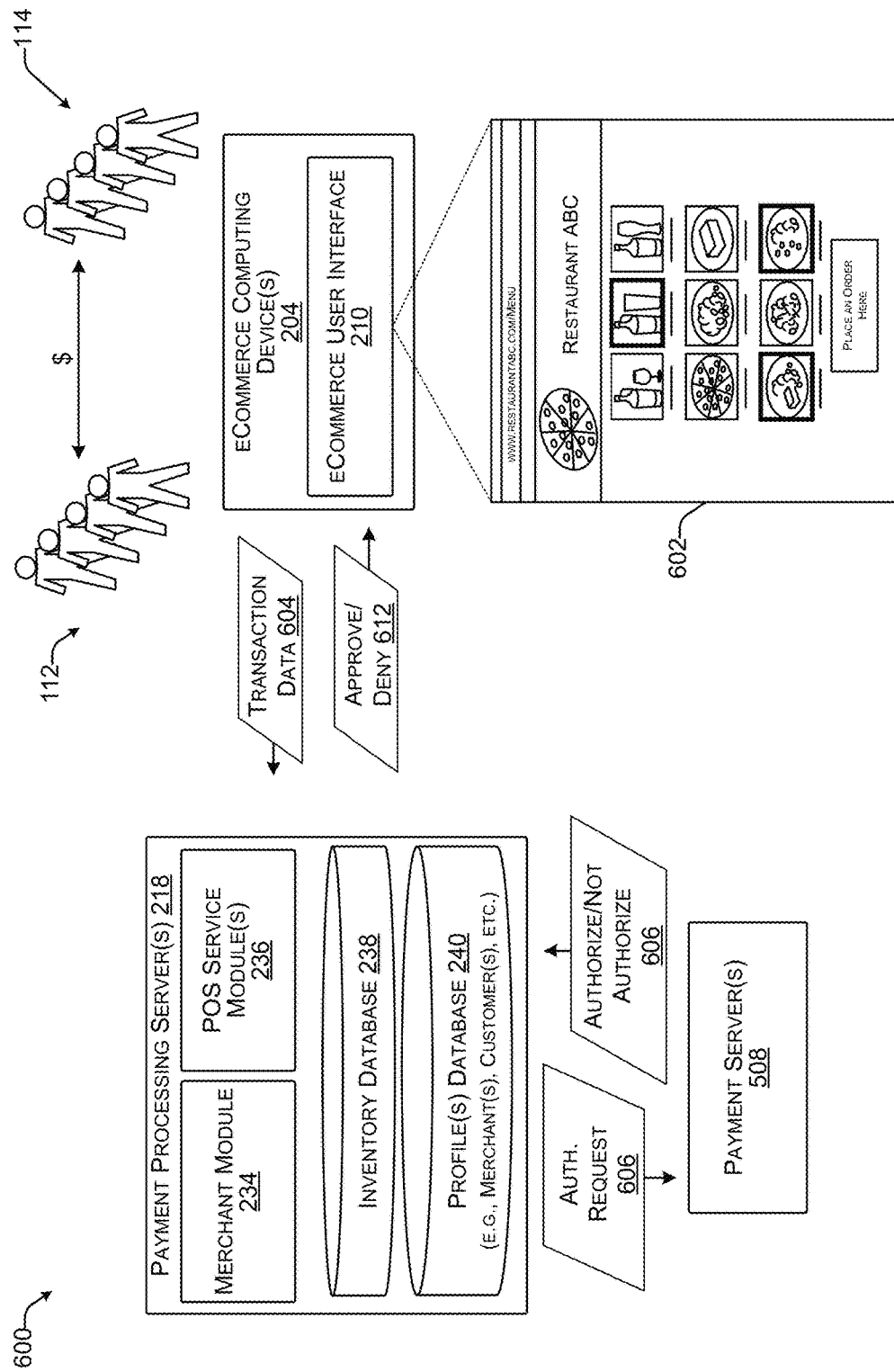
FIG. 6 illustrates an example environment for processing payments associated with eCommerce POS transactions via a payment processing service.

FIG. 6 illustrates an example environment 600 for processing payments for eCommerce POS transactions via a payment processing service. As described above, in at least one example, merchants can utilize web pages 602 to transact with customers. In such an example, a customer can interact with an eCommerce user interface 210 to request a web site of a merchant. As described above, the request fulfillment module 222 can send instructions for rendering the web page to the eCommerce user interface 210 and the eCommerce user interface 210 can execute the instructions to present the web page 602. In at least one example, a customer 114 can interact with the web page, via the eCommerce user interface 210, to add one or more items to a virtual cart. When the customer 114 is ready to purchase the items in the virtual cart, the customer 114 can provide payment data via the eCommerce user interface 210. For example, in some examples, the customer 114 can input payment data via a secure inline frame or other secure portal, which provides the payment data to the payment processing server(s) 218 securely. The eCommerce user interface 210 can determine transaction data 604, which can be sent to the payment processing server(s) 218 (e.g., the merchant module 234). In some examples, the eCommerce user interface 210 can send the transaction data 604 to the payment processing server(s) 218 directly. In other examples, the eCommerce user interface 210 can send the transaction data 604 to the payment processing server(s) 218 indirectly (e.g., via the web server(s) 214). In some examples, the eCommerce user interface 210 can utilize additional or alternative payment processing server(s) to process eCommerce payments.

In at least one example, the transaction data 604 can be sent to the payment processing server(s) 218 with a request to authorize the payment instrument associated with the provided payment data for a cost of the associated transaction. The merchant module 234 can receive the transaction data 604 and can send authorization request 606 to one or more payment servers 608. The payment server(s) 608 can be associated with payment instrument issuers, payment instrument networks, and/or banks, as described above. The payment server(s) 608 can determine whether the payment instrument is authorized for the cost of the transaction and can send an indication 610 of whether the payment instrument is authorized (or not) to the payment processing server(s) 218. The merchant module 234 can receive the indication 610 and can forward an indication 612 to the POS computing device(s) 206 indicating whether the transaction is approved or denied.

The transaction data 604 can be stored in association with merchant and/or customer profiles in the profile(s) database 240, and can be used for informing web page editing, as described below. Such transaction data can be eCommerce transaction data, as described above.

Figure 7:
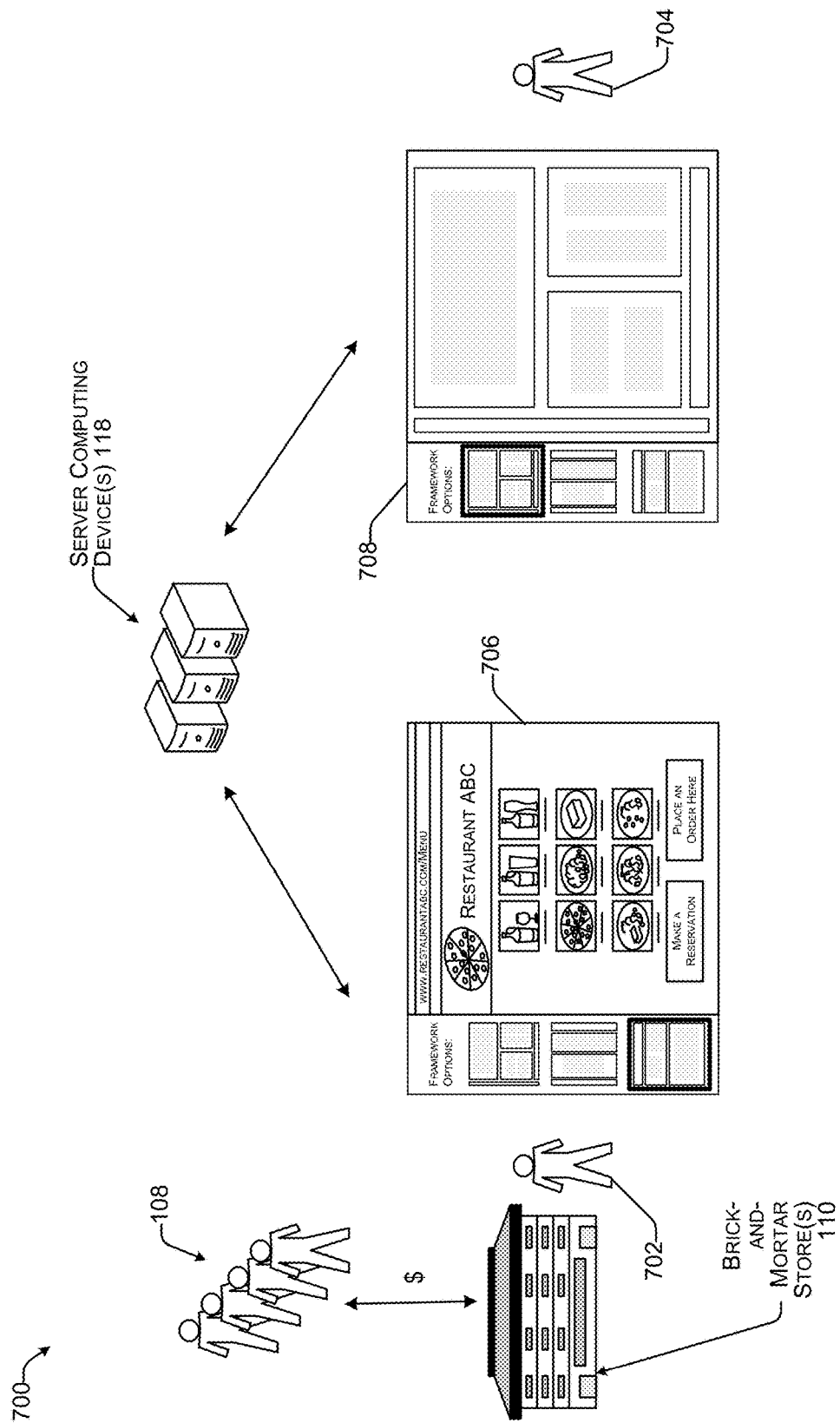
FIG. 7 illustrates an example environment for utilizing transaction data associated with brick-and-mortar transactions to generate intelligent recommendations for web page editing.

FIG. 7 illustrates an example environment 700 for utilizing transaction data associated with brick-and-mortar transactions to generate intelligent recommendations for web page editing. In FIG. 7, a first merchant 702 (e.g., a merchant of the merchant(s) 106) can participate in transactions with customers 108 at a brick-and-mortar store 110 using the payment processing service. As such, the first merchant 702 can be associated with brick-and-mortar transaction data, which can be stored, or otherwise associated with, a merchant profile in the profile(s) database 240 of the payment processing server(s) 218. As described above, transaction data can include, but is not limited to, payment data, user authentication data, point-of-purchase information (e.g., indicative of items sold, locations of the items sold, prices of the items sold, parties to the transaction, etc.), transaction type, etc. The first merchant 702 can additionally be associated with a merchant profile storing other brick-and-mortar merchant data associated with the first merchant 702.

A second merchant 704 has not previously used the payment processing service for processing transactions between the second merchant 704 and customers. As such, the second merchant 704 is not associated with brick-and-mortar transaction data and/or a merchant profile that is stored in the profile(s) database 240. Further, for at least the example described in FIGS. 7-10, neither the first merchant 702 nor the second merchant 704 have used the web server(s) 214 for creating and/or editing a web page and thus, neither the first merchant 702 nor the second merchant 704 have accounts in the account database 228.

In at least one example, the first merchant 702 can interact with a user interface (e.g., via a computing device) to send a request to the web server(s) 214 to create a web page. As described above, in some examples, the first merchant 702 can interact with the web page editing user interface 208 or, in additional or alternative examples, the first merchant 702 can interact with the POS user interface 212 (e.g., via a dashboard presented via the POS user interface 212). The request fulfillment module 222 can receive the request. In some examples, the request can be associated with an identifier of the first merchant 702. For instance, if the first merchant 702 requests to create the web page via the POS user interface 212, the request can be associated with log-in information that corresponds to the profile of the first merchant 702. Or, if the first merchant 702 requests to create the web page via the web page editing user interface 208, the first merchant 702 can provide an email address, phone number, or other identifier in association with the request (e.g., as required to open an account with the web service).

In at least one example, prior to sending instructions for rendering the graphical user interface(s) to the web page editing user interface 208, the request fulfillment module 222 can query the recommendation module 220 to determine whether the recommendation module 220 has any recommendations for customizing the web page and/or the creation thereof. Responsive to receiving the query, the recommendation module 220 can utilize the identifier to determine information associated with the first merchant 702. As the first merchant 702 does not have an account in the account database 228, such data may not be useful. However, because the first merchant 702 has used the payment processing service for processing brick-and-mortar transactions, transaction data and other data associated with the merchant profile in the profile(s) database 240 can be used to determine information associated with the first merchant 702. For instance, the recommendation module 220 can determine an MCC of the first merchant 702, a location of the first merchant 702, inventory of the first merchant 702, etc. from brick-and-mortar transaction data. In at least one example, the recommendation module 220 can send a request to the payment processing server(s) 218 to access the inventory database 238 and/or the profile(s) database 240. In such an example, the first merchant 702 can grant the recommendation module 220 permission to access the data associated with the payment processing server(s) 218.

Based at least in part on determining information associated with the first merchant 702, the recommendation module 220 can determine a recommendation for customizing web page editing for the first merchant 702. For instance, the recommendation module 220 can determine a layout (or portion thereof) to recommend to the first merchant 702. Furthermore, in at least one example, the recommendation module 220 can access a logo or other brand asset associated with the merchant profile and can determine a web page design to recommend to the first merchant 702 based on the logo or other brand asset. Additionally or alternatively, the recommendation module 220 can recommend a web page component for the web page. As an example, if the first merchant 702 is a restaurant, the recommendation module 220 can recommend a web page component for placing online orders and/or making reservations. Moreover, the recommendation module 220 can utilize the transaction data and/or other data associated with the merchant profile to auto-populate at least some of the web page content. For instance, if the first merchant 702 is a restaurant, the recommendation module 220 can auto-populate an element associated with a menu with the menu of the restaurant stored in association with the merchant profile.

In some examples, the recommendation module 220 can analyze data associated with the first merchant 702 to identify data that is relevant to various features of a web page, and can determine recommendations based on such an analysis. For instance, the recommendation module 220 can utilize rules, a statistical analysis, etc. to determine such recommendations. As an example, if a feature of a web page calls for a logo, the recommendation module 220 can identify a logo of the merchant to recommend for including in the web page. Or, as another example, a rule can indicate that a particular framework is designed for retail merchants and, based on determining that a merchant is a retail merchant, the recommendation module 220 can recommend the particular framework.

In additional or alternative examples, the recommendation module 220 can utilize machine-trained model(s) to determine recommendations. In at least one example, the machine-trained model(s) can output relevancy scores indicating which web page features are most relevant to a merchant, in view of brick-and-mortar data associated with the merchant. Such relevancy scores can be leveraged to determine which web page features to recommend to a merchant, such as the first merchant 702.

The recommendation module 220 can provide the recommendation to the request fulfillment module 222, which, in some examples, can modify the instructions for generating graphical user interface(s) via the web page editing user interface 208 and/or can generate a recommendation for sending with the instructions for generating the graphical user interface(s) based on the recommendation. For instance, in some examples, the request fulfillment module 222 can utilize the recommendation to auto-populate content for an element of the web page based on data associated with the merchant profile. In additional or alternative examples, the request fulfillment module 222 can select a framework with a section that corresponds to a particularly relevant web page component (e.g., widget) to suggest to the first merchant 702 (with options for selecting alternative frameworks). The request fulfillment module 222 can send instructions to the web page editing user interface 208, which can execute the instructions to render graphical user interface(s) 706 for editing a web page of the first merchant 702.

In at least one example, the second merchant 704 can interact with a user interface (e.g., via a computing device) to send a request to the web server(s) 214 to create a web page. As described above, in some examples, the second merchant 704 can interact with the web page editing user interface 208 or, in additional or alternative examples, the second merchant 704 can interact with the POS user interface 212. However, in this example, the second merchant 704 does not have an account and/or profile with either the web service or the payment processing service.

The request fulfillment module 222 can receive the request. In some examples, the request can be associated with an identifier of the second merchant 704. For instance, the second merchant 704 can provide an email address, phone number, or other identifier in association with the request, as described above. In at least one example, prior to sending instructions for rendering the graphical user interface(s) to the web page editing user interface 208, the request fulfillment module 222 can query the recommendation module 220 to determine whether the recommendation module 220 has any recommendations for customizing the web page and/or the creation thereof. As the second merchant 704 does not have an account in the account database 228, such data may not be useful. Further, because the second merchant 704 has not used the payment processing service for processing brick-and-mortar transactions, the second merchant 704 may not have a merchant profile associated with the profile(s) database 240. As such, the recommendation module 220 may not be able to identify any information associated with the second merchant 704 to make a recommendation. In such an example, the recommendation module 220 may refrain from sending an indication to the request fulfillment module 222 (or, can send a recommendation indicating a generic editing process). As such, the request fulfillment module 222 can send instructions associated with generating a graphical user interface that is generic (e.g., not personalized and/or customized for the second merchant 704) to enable the second merchant 704 to create its web page. The web page editing user interface 208 can receive the instructions and execute the instructions to generate the graphical user interface(s) 708 for enabling the second merchant 704 to create a web page.

As illustrated in FIG. 7, POS data associated with brick-and-mortar transactions can be useful for streamlining web page editing. That is, because the first merchant 702 is associated with a merchant profile (and corresponding transaction data), the graphical user interface(s) 706 presented for the first merchant 702 can be customized for the first merchant 702. Further, in some examples, content associated with the web page to be created can be auto-populated based on data associated with the merchant profile. That is, the web page editing user interface 208 (e.g., the graphical user interface(s) presented therein) can be customized based on the recommendations and/or the content of the web page can be customized based on the recommendations. However, because the second merchant 704 has not used the payment processing service and/or the web page editing service, the second merchant 704 may be required to interact with the web page editing user interface 208 more than the first merchant 702 in creating a web page. That is, the second merchant 704 is not able to participate in the customized web page editing experience that the first merchant 702 is able to participate in due to the availability of data associated with the first merchant 702 at the payment processing service.

Figure 8:
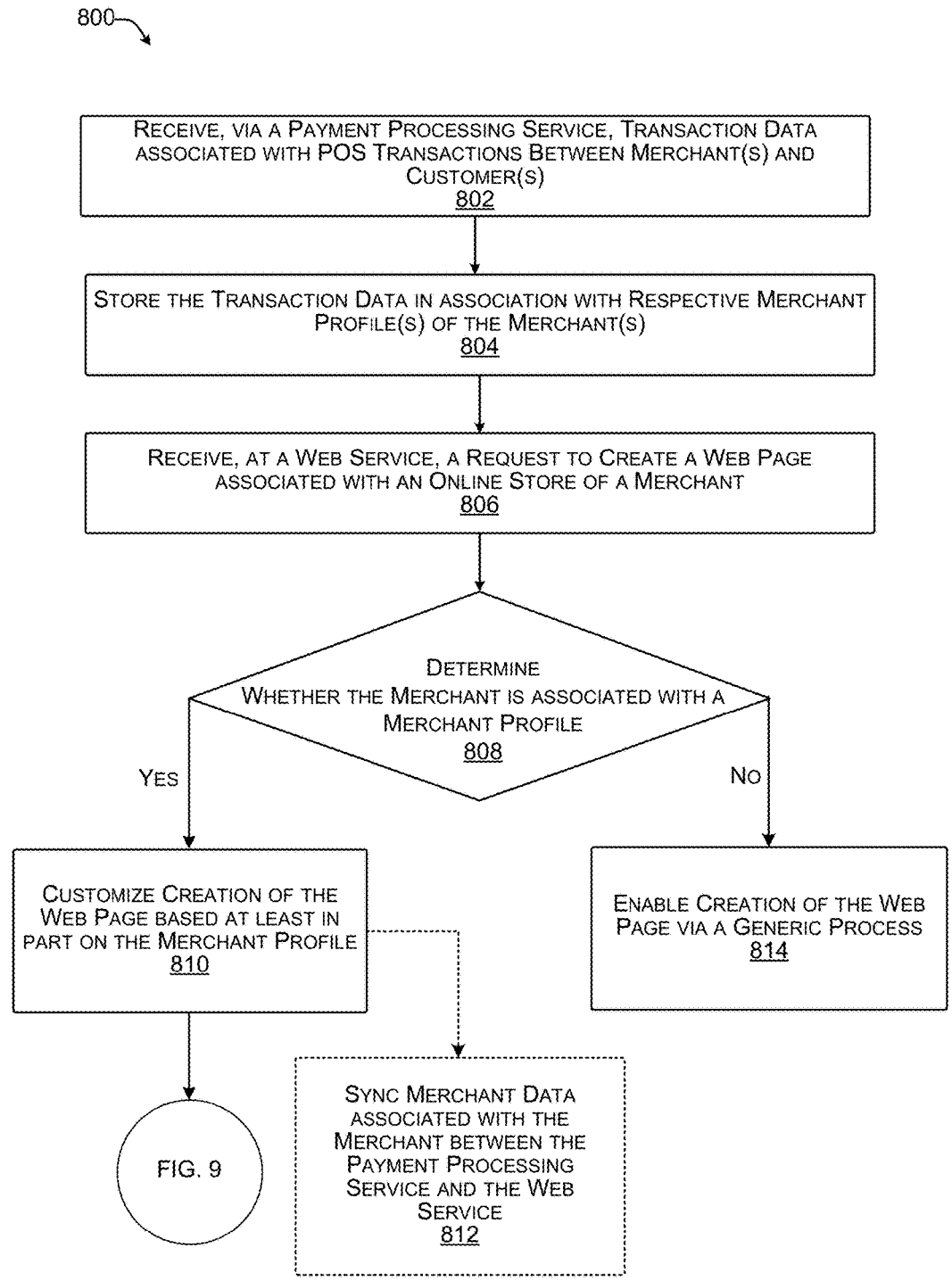
FIG. 8 illustrates an example process for customizing web page editing based on brick-and-mortar POS data associated with a merchant.

FIG. 8 illustrates an example process 800 for customizing web page editing based on brick-and-mortar POS data associated with a merchant.

Block 802 illustrates receiving, via a payment processing service, transaction data associated with POS transactions between merchant(s) and customer(s). As described above with reference to FIG. 5, the payment processing server(s) 218 can process payments on behalf of merchants. Resulting transaction data can be received by the merchant module 234 and stored in the profile(s) database 240. That is, the brick-and-mortar transaction data can be stored in association with respective merchant profile(s) of the merchants, as illustrated in block 804.

Block 806 illustrates, receiving, at a web page editing service, a request to create a web page associated with an online store of a merchant. In at least one example, the merchant can interact with a user interface (e.g., via a computing device) to send a request to the web server(s) 214 to create a web page. As described above, in some examples, the merchant can interact with the web page editing user interface 208 or, in additional or alternative examples, the merchant can interact with the POS user interface 212 (e.g., via a dashboard presented via the POS user interface 212). In some examples, the request can be associated with an identifier of the merchant. For instance, if the merchant requests to create the web page via the POS user interface 212, the request can be associated with log-in information that corresponds to the profile of the merchant. Or, if the merchant requests to create the web page via the web page editing user interface 208, the merchant can provide an email address, phone number, or other identifier in association with the request. The request fulfillment module 222 can receive the request.

Block 808 illustrates determining whether the merchant is associated with a merchant profile. In at least one example, prior to sending instructions for rendering the graphical user interface(s) to the web page editing user interface 208, the request fulfillment module 222 can query the recommendation module 220 to determine whether the recommendation module 220 has any recommendations for customizing the web page and/or the creation thereof. Responsive to receiving the query, the recommendation module 220 can utilize the identifier in an effort to determine information associated with the merchant. In at least one example, the recommendation module 220 can utilize the identifier to determine information associated with the merchant. In the event the merchant has not previously interacted with the web server(s) 214 to create a web page, the merchant will not have an account in the account database 228, and such data may not be useful. However, if the merchant has used the payment processing service for processing brick-and-mortar transactions, the merchant (e.g., the identifier) can be associated with transaction data and other data associated with a merchant profile in the profile(s) database 240. Such data can be used to determine information associated with the merchant.

Block 810 illustrates customizing creation of the web page based at least in part on the merchant profile. Based at least in part on determining that the merchant is associated with a merchant profile, the recommendation module 220 can utilize information determined from the profile to generate recommendations for customizing web page editing for the merchant. That is, the web page editing user interface 208 (e.g., the graphical user interface(s) presented therein) can be customized based on the recommendations and/or the content of the web page can be customized based on the recommendations. In some examples, the recommendation module 220 can analyze data associated with the merchant to identify data that is relevant to various features of a web page, and determine a recommendation based on such an analysis. In additional or alternative examples, the recommendation module 220 can utilize machine-trained model(s) to determine recommendations. Additional details associated with determining recommendations are described below with reference to FIG. 9.

The recommendation module 220 can provide the recommendation to the request fulfillment module 222, which, in some examples, can modify the instructions for generating graphical user interface(s) via the web page editing user interface 208 and/or can generate a recommendation for sending with the instructions for generating the graphical user interface(s) based on the recommendation. The request fulfillment module 222 can send instructions to the web page editing user interface 208, which can execute the instructions to render graphical user interface(s) for editing a web page of the merchant.

Block 812 illustrates syncing data associated with the merchant between the payment processing service and the web page editing service. In addition to customizing the creation of the web page, in at least one example, responsive to the merchant requesting to create a web page, the web server(s) 214 and the payment processing server(s) 218 can synchronize, with the merchant's permission (e.g., via acceptance of terms and conditions), at least a portion of the data associated with the merchant between the account database 228, the inventory database 238, and the profile(s) database 240. For instance, in at least one example, the web server(s) 214 and the payment processing server(s) 218 can synchronize demographic information (e.g., brick-and-mortar location addresses, business hours, contact information, etc.), items (e.g., names, descriptions, images, options, etc.), prices, SKUs, item variations, modifiers, inventory (e.g., brick-and-mortar and online), orders (e.g., brick-and-mortar and online), gift cards (e.g., purchased, redeemed, etc.), etc. between the web server(s) 214 and the payment processing server(s) 218. For the purpose of this discussion, "synchronizing" can refer to comparing data stored in association with each of the services (e.g., web scraping) and transmitting data so that both services have the same data set from which they are working. In some examples, either the data associated with the web server(s) 214 or the data associated with the payment processing server(s) 218 can serve as a single source of truth (e.g., the data can only be edited via the system associated with the single source of truth), which can be accessible to the other server(s) and/or can be used to update the other server(s). For instance, the inventory database 238 and the profile(s) database 240 can serve as the single source of truth which can be accessible by the web server(s) 214 (e.g., in real-time or near real-time) and/or can be used to update the account database 226.

In at least one example, such synchronization alleviates the need for merchants to manually enter and manage all items (e.g., of inventory) on both platforms. That is, a merchant can synchronize items (e.g., names, descriptions, images, options, etc.), prices, SKUs, item variations, modifiers, etc. on initial set-up with the web server(s) 214 so that the merchant doesn't need to manually enter and manage all of the items via the web server(s) 214 (as well as the payment processing sever(s) 218). Furthermore, when a merchant creates or deletes an item via an interaction with the web server(s) 214 or the payment processing server(s) 218, the modification can be synchronized across both services so that the merchant does not have to manually create or delete items in separate systems. In some examples, a merchant can upload an image associated with an item (e.g., for inventory and/or catalog purposes via the POS or an item listing associated with a web page) and the image can be synched with the other platform. As an example, an image can be associated with an item for presentation on the web page and such image can be associated with the item in the inventory database 238. As such, the image can be used in association with the item in association with brick-and-mortar POS transactions.

In some examples, some data may not be synchronized if it is not appropriate for the other system. For instance, in some examples, images submitted via the payment processing server(s) 218 (e.g., to represent inventory items) may be inadequate (e.g., poor quality and/or resolution) for a web site. In such an example, the web page editing user interface 208 and/or the POS user interface 212 can cause a notification to be presented to the merchant, requiring the merchant to upload alternative images for the web page. In some examples, merchants can toggle a switch to enable/disable two-way sync of various item features (e.g., images, descriptions, prices, etc.). If a merchant has opted to disable two-way sync, such item features may not be synchronized between the web server(s) 214 and the payment processing server(s) 218. In some examples, if a merchant subsequently opts to enable the two-way sync, item features as existent in the source of truth system can override the item features as existent in the other system. For instance, item features as existent in the inventory database 238 and/or profile(s) database 240 can override item features as existent in the account database 228. In at least one example, the merchant is required to affirmatively accept the override.

In an additional or alternative example, a merchant can selectively choose which items are available in an online inventory and an offline inventory. In such an example, the merchant module 234 can indicate such (e.g., by adding a flag to the respective items in the inventory database 238) so that items reserved for online inventory are not presented in association with the offline inventory (e.g., via the POS user interface 212) and items reserved for offline inventory are not presented in association with online inventory (e.g., via the eCommerce user interface 210).

In at least one example, when a merchant adds an eCommerce option to an existing brick-and-mortar business, the web server(s) 214 and the payment processing server(s) 218 synchronize and supplement existing POS services. For instance, the web server(s) 214 and the payment processing server(s) 218 can establish a payment gateway to enable the merchant to use payment processing services supported by the payment processing server(s) 218 to process payments for orders generated via the web page (e.g., eCommerce store). That is, the merchant, who is already using the payment processing service as a payment gateway, can sync the payment mechanism associated with the web page so that the payment processing service is processing all transactions (e.g., online and brick-and-mortar) for the merchant. In an example, the eCommerce user interface 210 can route transaction data to the payment processing server(s) 218 as described above with reference to FIG. 6.

In an additional example, by adding an eCommerce option to an existing brick-and-mortar option, merchants avail options for fulfillment. As an example, when customers purchase items via the eCommerce web page, customers can opt to have items shipped to their home, or they can pick the items up in-store (e.g., at a brick-and-mortar location). In at least one example, a merchant can be required to select a designated fulfillment method for online orders, which can be an in-store pickup location or a shipping address. In some examples, a merchant can set a preparation time for item(s) to be picked-up in-store and/or an in-store pickup hours (which may be different than normal store hours) to ensure that the merchant has time to prepare the item(s) prior to pick-up and the customer knows when to arrive to pick-up the item(s). Additionally or alternatively, in some examples, a merchant can toggle whether in-store pickup is available or not. Such merchant preferences can be stored in associated with the merchant profile in the profile(s) database 240.

In some examples, a merchant can interact with the POS user interface 212 to specify which products are available for shipping. To enable shipping (e.g., to a customer's home), additional functionality can be provided to the payment processing server(s) 218 to enable shipping label printing via a shipping order workflow that can be executed by the POS service module(s) 236. For instance, a merchant can request access to shipping functionality via a graphical user interface presented via the POS user interface 212. The POS user interface 212 can forward the request to the POS service module(s) 236, which can establish a web session and redirect the request to a defined resource associated with the web server(s) 214. The merchant can generate a shipping label and the resulting shipping status (e.g., shipped) and tracking number can be provided back to the POS service module(s) 236 to be associated with the order. The merchant can view shipping orders via the POS user interface 212.

Furthermore, orders can be synchronized between the web server(s) 214 and the payment processing server(s) 218 such that brick-and-mortar merchants can view and/or manage online orders from their POS user interface 212 (e.g., via an associated dashboard), and such orders (e.g., as presented via the POS user interface 212) can be deeply linked to the online orders. In at least one example, such synchronization alleviates the need for merchants to manually enter and manage all orders on both platforms. As an example, when an order is created via the eCommerce user interface 210, the eCommerce user interface 210 can send the order to the payment processing server(s) 218. In at least one example, the order can be associated with fulfillment data (e.g., customer name, recipient name, address, etc.), which can be stored in association with the order. The POS service module(s) 236 can generate an order that can be viewed via the POS user interface 212. If the order is updated via the eCommerce user interface 210, the eCommerce user interface 210 can send the update to the payment processing server(s) 218 and the POS service module(s) 236 can update the order. The eCommerce user interface 210 can receive a webhook, process the webhook received, ensure that it corresponds to the order, and update the order in the eCommerce user interface 210. In the event the update to the payment processing server(s) 218 fails, the eCommerce user interface 210 can retrieve the latest order from the payment processing server(s) 217 and request the customer to resubmit the changes to the order.

Block 814 illustrates enabling creation of the web page via a generic process. If the merchant does not have an account in the account database 228 and/or a merchant profile associated with the profile(s) database 240, the recommendation module 220 may not be able to identify any information associated with the merchant to make a recommendation. In such an example, the recommendation module 220 may refrain from sending an indication to the request fulfillment module 222 (or, can send a recommendation indicating a generic editing process). As such, the request fulfillment module 222 can send instructions associated with generating a graphical user interface that is not personalized and/or customized for the merchant. The web page editing user interface 208 can receive the instructions and execute the instructions to generate the graphical user interface(s) for enabling the merchant to create a web page.

Figure 9:
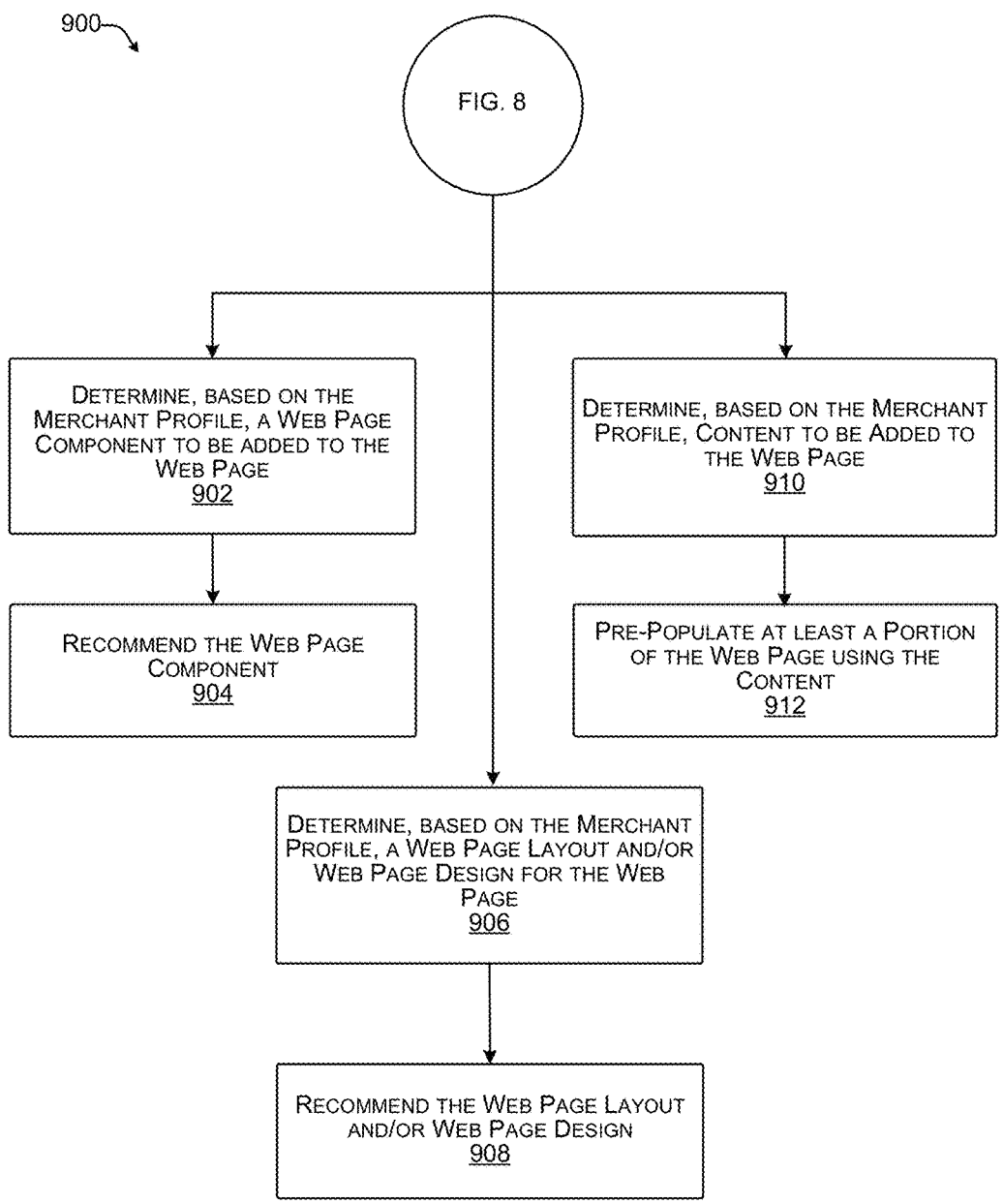
FIG. 9 illustrates an example process for generating recommendations for editing a web page.

FIG. 9 illustrates an example process 900 for generating recommendations.

As described above, based at least in part on determining that the merchant is associated with a merchant profile, the recommendation module 220 can utilize information determined from the profile to generate recommendations for customizing web page editing for the merchant. That is, the web page editing user interface 208 (e.g., the graphical user interface(s) presented therein) can be customized based on the recommendations and/or the content of the web page can be customized based on the recommendations. Furthermore, in some examples, the recommendation module 220 can generate recommendations for customizing web page editing based on trends observed from brick-and-mortar POS data.

Block 902 illustrates determining, based on the merchant profile, a web page component to be added to the web page. In at least one example, the recommendation module 220 can access the merchant profile of the merchant and can determine a web page component to be added to the web page. As described above, a web page component can be a widget, for example, that can be associated with a section of the web page. In at least one example, the recommendation module 220 can utilize rules, a statistical analysis, etc. to identify a web page component to recommend to the merchant. In some examples, the recommendation module 220 can utilize a machine-trained model to assign a relevance score (e.g., based on information associated with the merchant profile) to various web page components. In some examples, the relevance score can be based on data indicating how other, similar merchants have integrated web page components into their web pages. That is, the machine-trained model can be trained by a machine-learning mechanism based on data indicating how other, similar merchants have integrated web page components into their web pages, which can be observed from web page data and/or merchant data.

The recommendation module 220 can select one or more of the most relevant web page components (e.g., highest relevance score, relevance score above a threshold, highest ranking, etc.) to recommend to the merchant. As an example, the recommendation module 220 can determine that the merchant is associated with a restaurant and, accordingly, web page components associated with placing online orders or making reservations can be determined to be relevant to the merchant. Thus, the recommendation module 220 can recommend a web page component associated with placing orders online and/or a web page component associated with making reservations to the merchant. Or, as another example, the recommendation module 220 can determine that a merchant is associated with spa services and can recommend a web page component associated with making appointments.

Based on determining a recommended web page component to be added to the web page, the recommendation module 220 can recommend the web page component to the request fulfillment module 222, as illustrated in block 904. As described above, the request fulfillment module 222 can modify the instructions for generating graphical user interface(s) via the web page editing user interface 208 (e.g., thereby presenting the recommended web page component via a graphical user interface) and/or can generate a recommendation for sending with the instructions for generating the graphical user interface(s) based on the recommendation. The request fulfillment module 222 can send instructions to the web page editing user interface 208, which can execute the instructions to render graphical user interface(s) for editing a web page of the merchant.

Block 906 illustrates determining, based on the merchant profile, a web page layout and/or web page design for the web page. In at least one example, the recommendation module 220 can access the merchant profile of the merchant and can determine a web page layout and/or web page design for to the web page. That is, the recommendation module 220 can identify, from the layout and design database 226, one or more web page layouts and/or web page designs to recommend to the merchant. In at least one example, the recommendation module 220 can utilize rules, a statistical analysis, etc. to identify a web page layout and/or design to recommend to the merchant. In some examples, the recommendation module 220 can utilize a machine-trained model to assign a relevance score (e.g., based on information associated with the merchant profile) to individual layouts and/or designs in the layout and design database 226. The relevance score can be based on data indicating web page layouts and/or designs for other, similar merchants. That is, the machine-trained model can be trained by a machine-learning mechanism based on data indicating how other, similar merchants have integrated web page layouts and/or designs into their web pages, which can be observed from web page data and/or merchant data.

The recommendation module 220 can select one or more of the most relevant layouts and/or designs (e.g., highest relevance score, relevance score above a threshold, highest ranking, etc.) to recommend to the merchant. For instance, if the merchant profile indicates that the merchant is a retailer, a layout associated with a framework that includes a robust section for product descriptions may be determined to be relevant to the merchant. Or, in at least one example, the recommendation module 220 can access a logo or other brand asset associated with the merchant profile and can determine a web page design to recommend to the first merchant 702 based on the logo or other brand asset. As an example, the recommendation module 220 can identify a recommended color palette and/or font based on a logo or other brand asset of the merchant.

Based on determining a recommended web page layout and/or design for the web page, the recommendation module 220 can recommend the web page layout and/or design to the request fulfillment module 222, as illustrated in block 908. As described above, the request fulfillment module 222 can modify the instructions for generating graphical user interface(s) via the web page editing user interface 208 (e.g., thereby causing the graphical user interface(s) to default to the recommended web page layout and/or design or otherwise focus the merchant's attention to the recommended web page layout and/or design) and/or can generate a recommendation for sending with the instructions for generating the graphical user interface(s) based on the recommendation. The request fulfillment module 222 can send instructions to the web page editing user interface 208, which can execute the instructions to render graphical user interface(s) for editing a web page of the merchant.

Block 910 illustrates determining, based on the merchant profile, content to be added to the web page. In at least one example, the recommendation module 220 can utilize rules, a statistical analysis, etc. to identify content to recommend to the merchant. In at least one example, the recommendation module 220 can access the merchant profile of the merchant and can determine content that can be added to the web page. For instance, the recommendation module 220 can access a business name of the merchant, a location of the merchant, hours of operation of the merchant, content information for the merchant, etc. from the merchant profile. Additionally or alternatively, the recommendation module 220 can access inventory data associated with the inventory database 238, which can be used to generate product descriptions. In at least one example, individual elements within a section can be associated with indicators identifying what type of content corresponds to that element. In such an example, the recommendation module 220 can identify content of the same type in the merchant profile, if applicable, to recommend. Furthermore, in some examples, the recommendation module 220 can access data stored in the brand management server(s) 216 for recommending web content to a merchant.

In some examples, the recommendation module 220 can utilize a machine-trained model to recommend content to a merchant. In some examples, the recommendation module 220 can utilize a machine-trained model to identify content that is particularly relevant for a web page, at a particular time. Such a machine-trained model can be trained by a machine-learning mechanism based on brick-and-mortar transaction data. The machine-trained model can observe trends with respect to MCC, location, price-point, date, time, season, etc. As such, the recommendation module 220 can recommend particular content based on the observed trends. As a non-limiting example, the recommendation module 220 can recommend that a merchant in Minnesota list winter jackets first in an item section of a web page and a merchant in Arizona list light-weight jackets first in an item section of a web page. As another non-limiting example, brick-and-mortar data can indicate that an item in a merchant's inventory is selling well for other, similar merchants. As such, the recommendation module 220 can recommend that the merchant feature the item on the merchant's web page. As yet another non-limiting example, brick-and-mortar data can indicate certain food/beverage items are more popular during a particular time of year (e.g., soup in the winter, holiday coffee drinks during the holidays, etc.). As such, the recommendation module 220 can recommend that a merchant include the certain food/beverage items on the web page and/or add the food/beverage items at a top of an item listing.

Based on determining recommended content to be added to the web page, the recommendation module 220 can recommend content to the request fulfillment module 222, as illustrated in block 912. As described above, the request fulfillment module 222 can modify the instructions for generating graphical user interface(s) via the web page editing user interface 208 and/or can generate a recommendation for sending with the instructions for generating the graphical user interface(s) based on the recommendation. For instance, the instructions can be modified to include the content, or a link to the content, in an element corresponding to such content when presented via a graphical user interface. Or, the instructions can be associated with a recommendation to add particular content to an element on the web page. The request fulfillment module 222 can send instructions to the web page editing user interface 208, which can execute the instructions to render graphical user interface(s) for editing a web page of the merchant.

Figure 10:
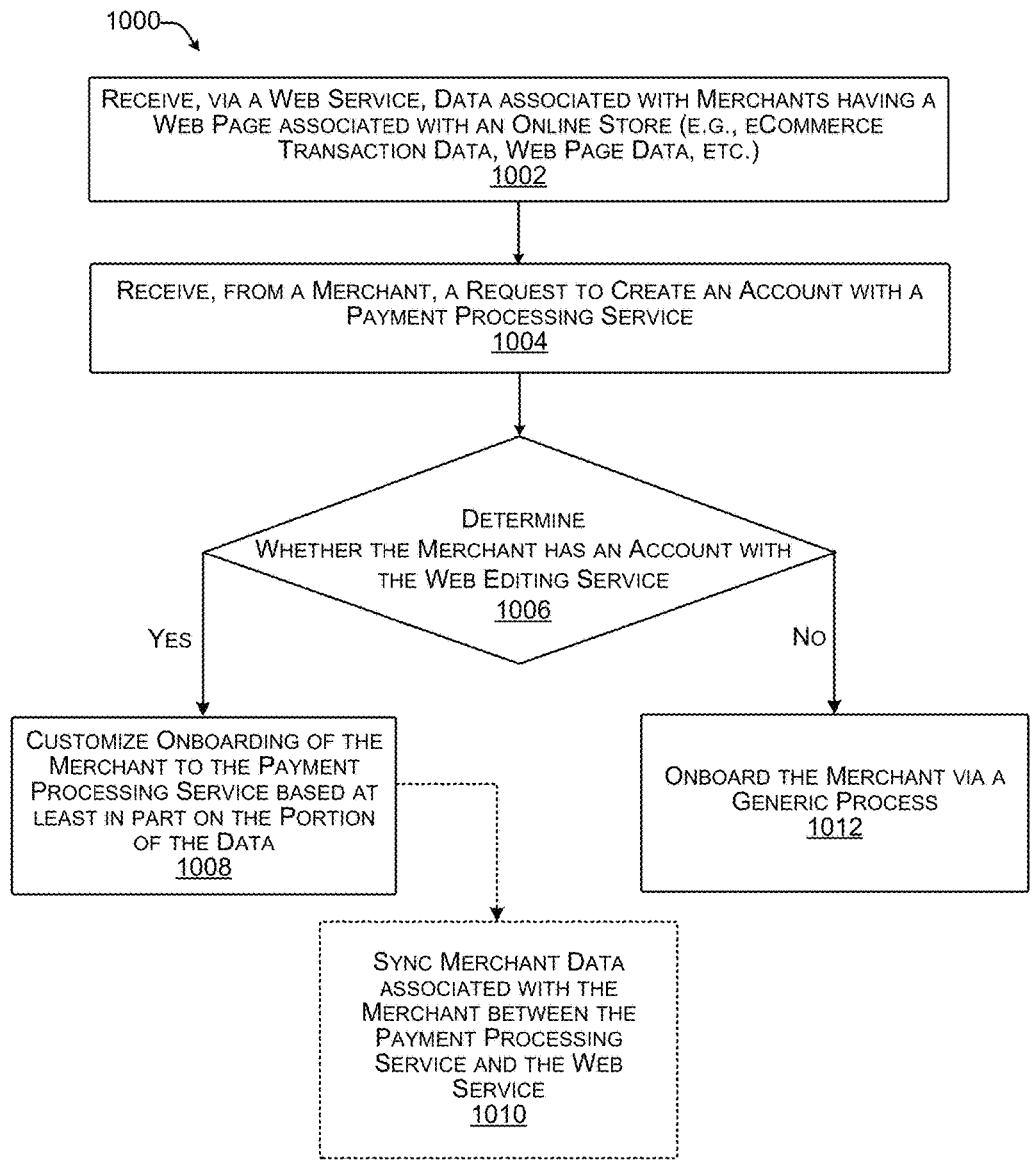
FIG. 10 illustrates an example process for customizing the onboarding of a merchant to a payment processing service based on data associated with a web page of the merchant.

FIG. 10 illustrates an example process 1000 for customizing onboarding a merchant to a payment processing service based on data associated with a web page of a merchant.

Block 1002 illustrates receiving, via a web service, data associated with merchants having a web page associated with an online store (e.g., eCommerce transaction data, web page data, etc.). As described above, a merchant can create and/or maintain a web page associated with an online store. The web page can be stored in the web page database 224 associated with the web server(s) 214. The web page can be linked to an account of the merchant. The account can be stored in the account database 228 with additional information about the merchant. In some examples, the account can indicate a log-in associated with a user, demographic information associated with the user, payment instruments associated with the user (e.g., as used to pay for services of the web server(s) 214), linked accounts (e.g., to other services, etc.), online inventory of the user (e.g., if the user uses the web service for hosting an eCommerce web page), linked web pages of the user, domain(s) of the user, web page traffic (e.g., visitors, actions taken by visitors, etc.), eCommerce transaction data, etc. The web server(s) 214 can receive the account information when a merchant first requests to create a web page using the web server(s) 214 and/or at a later time.

Block 1004 illustrates receiving, from a merchant, a request to create an account with a payment processing service. In at least one example, the merchant may desire to begin using the payment processing service. In such an example, the merchant can interact with an instance of the POS user interface 212 to request to create an account with the payment processing service. In at least one example, the request can be associated with an identifier of the merchant. For instance, the merchant can provide an email address, phone number, or other identifier in association with the request.

Block 1006 illustrates determining whether the merchant has an account with the web page editing service. In at least one example, the payment processing server(s) 218 can utilize an onboarding module to onboard the merchant. Based at least in part on receiving the identifier, the onboarding module can determine whether the email address, phone number, or other identifier is associated with a merchant profile in the profile(s) database 240. Assuming it is not (at least for this example), the onboarding module can forward the email address, phone number, or other identifier to the request fulfillment module 222 with a query whether the email address, phone number, or other identifier is associated with an account in the account database 228.

Block 1008 illustrates customizing onboarding of the merchant to the payment processing service based at least in part on the portion of the data. If the email address, phone number, or other identifier is associated with an account in the account database 228, the request fulfillment module 222 can send at least a portion of the data associated with the account to the onboarding module (with the merchant's permission) for use in onboarding the merchant. The onboarding module can customize the onboarding by auto-populating at least some information required for generating an account with the payment processing service using the information from the merchant's account with the web server(s) 214. Additionally or alternatively, the onboarding module can modify the presentation of information and/or prompts based on the information from the merchant's account with the web server(s) 214. That is, merchant data can cause a modification to the onboarding flow. For instance, if the merchant has inventory data stored with the web server(s) 214, the onboarding module can auto-populate the inventory data from the web server(s) 214 and skip the onboarding step that prompts the merchant to input its inventory (or modify the step to prompt the merchant to confirm its inventory).

Block 1010 illustrates synching merchant data associated with the merchant between the payment processing service and the web page editing service. In addition to customizing the onboarding process, in at least one example, responsive to the merchant requesting to create a web page, the web server(s) 214 and the payment processing server(s) 218 can synchronize at least a portion of the data associated with the merchant between the account database 228, the inventory database 238, and the profile(s) database 240. Additional details associated with synching merchant data associated with the merchant between the payment processing service and the web page editing service are described above with reference to block 812.

Block 1012 illustrates onboarding the merchant via a generic process. If the email address, phone number, or other identifier is not associated with an account in the account database 228, the request fulfillment module 222 can send an indication to the onboarding module indicating that the email address, phone number, or other identifier is not associated with an account. The onboarding module can then utilize a generic process for onboarding the merchant (or can personalize the onboarding process based on other indicators).

While FIGS. 7-10 are directed to determining an identity of a merchant based on an identifier (e.g., log-in, email address, phone number, etc.), in additional and/or alternative examples, an identity of a merchant can be inferred based on data known about a merchant (given what is known about other merchants that share or are otherwise similar to the data known about the merchant), and such data can be utilized more generally to customize web page editing and/or onboarding of a merchant to a payment processing service. For instance, in some examples, a business name, an MCC, a location, etc. of a merchant (e.g., which can be provided by the merchant or otherwise determined) can be used to intelligently recommend web page designs, web page layouts, web page components, and/or web page content to the merchant based on other merchants that are similar to the merchant (e.g., similar business name, MCC, location, etc.). As such, the creation and/or editing of the web page can be customized for the merchant based on merchant data associated with the other, similar merchants. Additionally or alternatively, a business name, an MCC, a location, etc. of a merchant (e.g., which can be provided by the merchant or otherwise determined) can be used to intelligently modify onboarding of a merchant based on other merchants that are similar to the merchant. As such, the onboarding experience can be customized for the merchant based on merchant data associated with the other, similar merchants.

Figure 11:
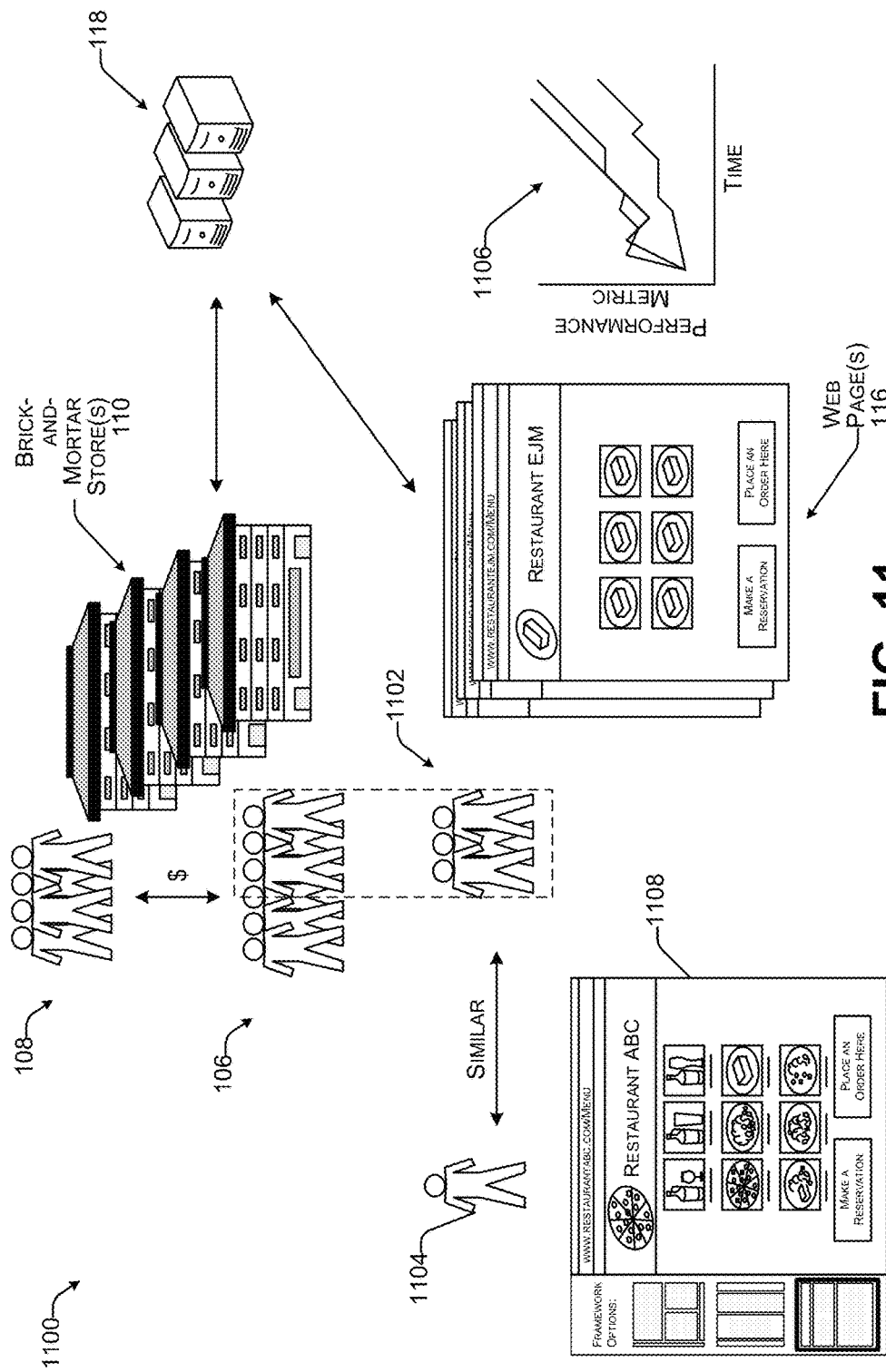
FIG. 11 illustrates an example environment for making web page editing recommendations to a merchant based on web pages of other merchants that are determined to be similar to the merchant (e.g., as determined by brick-and-mortar data).
Figure 12:
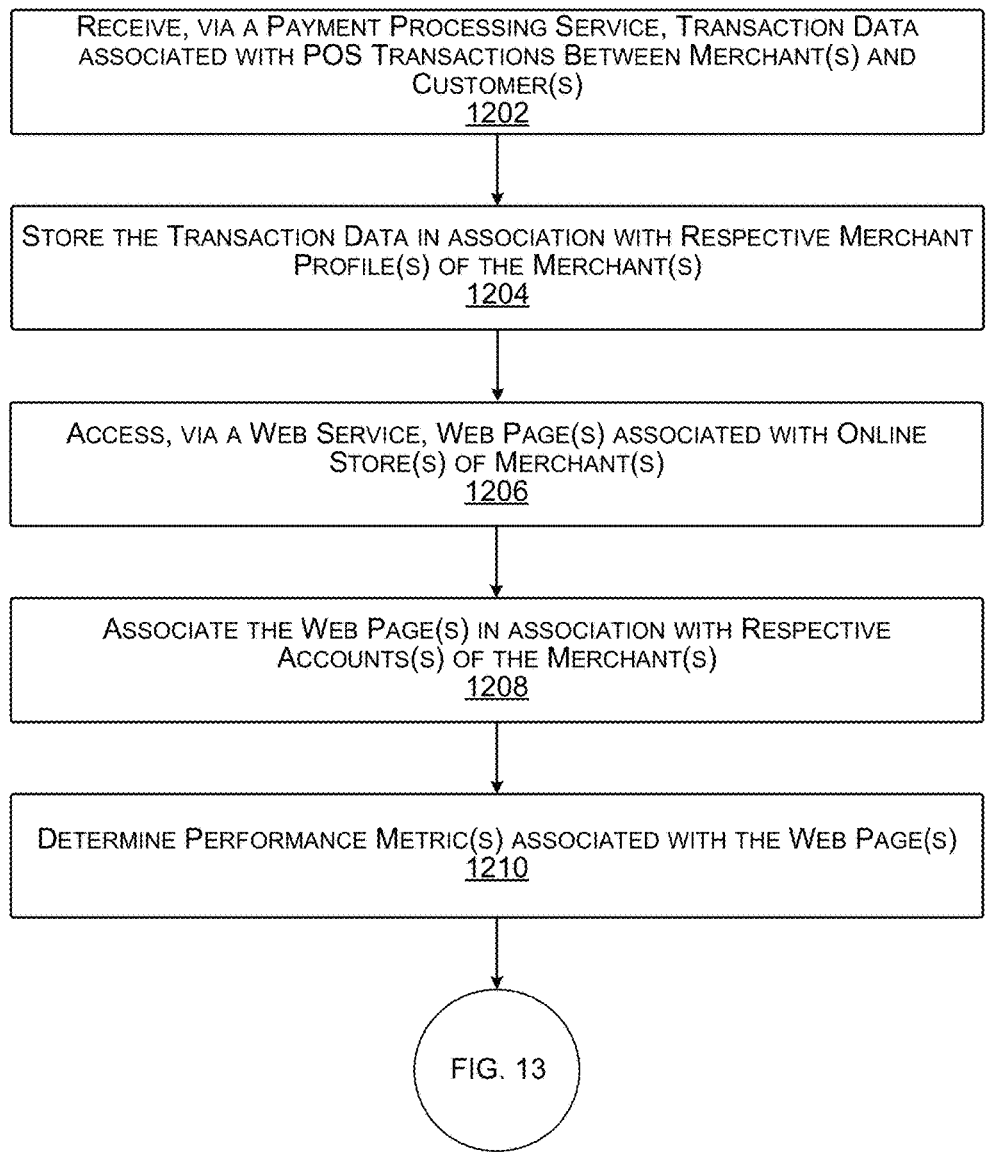
FIG. 12 illustrates a process for making web page editing recommendations to a merchant based on web pages of other merchants that are determined to be similar to the merchant (e.g., as determined by brick-and-mortar data).
Figure 13:
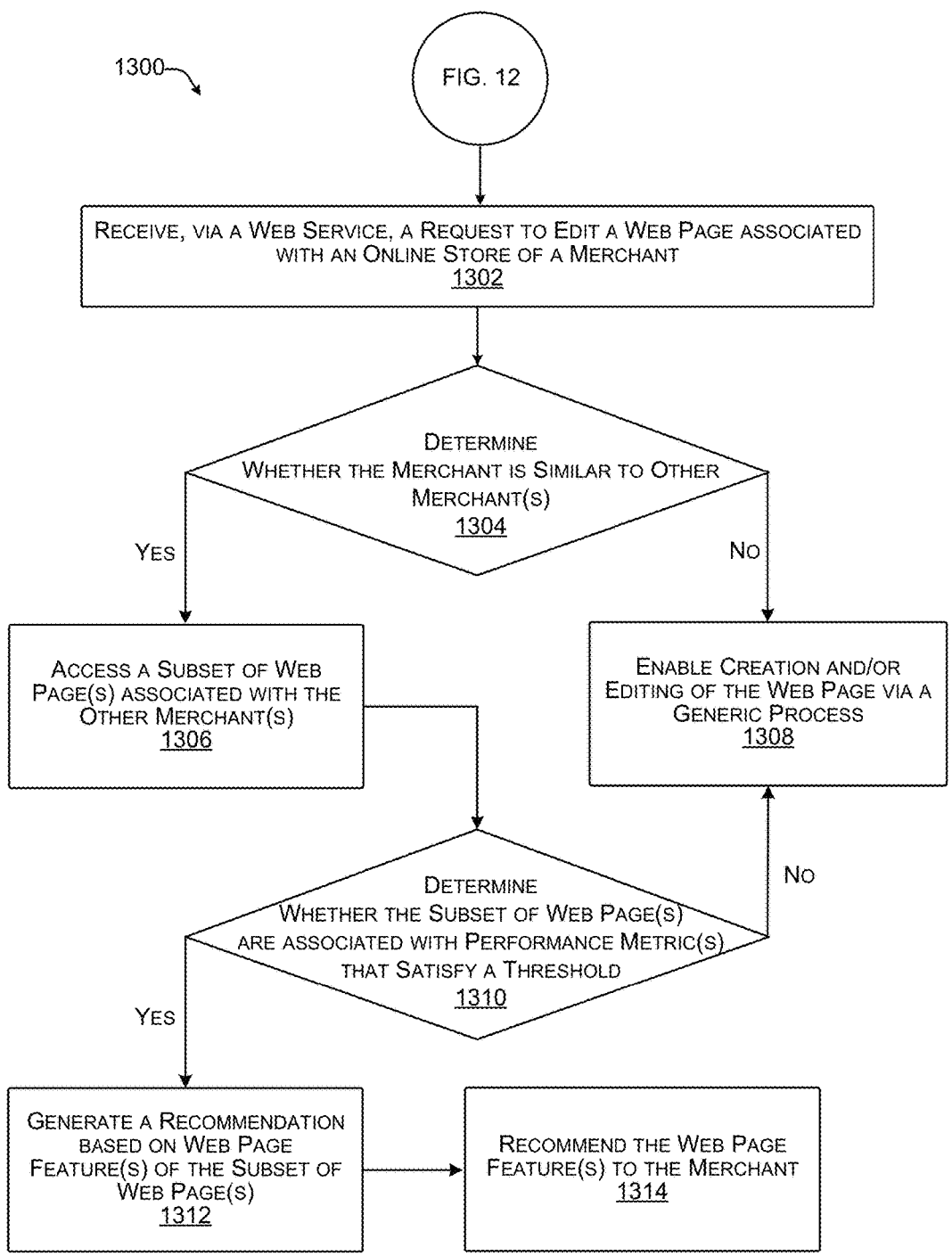
FIG. 13 illustrates an example process including additional details associated with making web page editing recommendations to a merchant based on web pages of other merchants that are determined to be similar to the merchant (e.g., as determined by brick-and-mortar data).

As described above, techniques described herein are directed to making recommendations to a merchant for editing a web page based on web pages of other merchants that are similar to the merchant (e.g., as determined based on brick-and-mortar transaction data). For instance, techniques described herein can determine performance metrics (e.g., sales, conversion rates (e.g., a percentage of visitors that land on a web page who complete a purchase or otherwise make it to a predefined point in a commerce flow), total revenues, growth rates, page views, mouseover rates, click rates, bounce rates (e.g., landing on and immediately leaving a web page), share rates (e.g., to other web pages and/or platforms), social chatter (e.g., mentions on social media platforms), subscriptions, and the like) associated with web pages of merchants. Then, for merchants that are determined to be similar to a particular merchant (e.g., based on brick-and-mortar transaction data), techniques described herein can identify web pages of the similar merchants that have proven to be successful (e.g., per the performance metrics) for the similar merchants. As a result, techniques described herein can recommend web page features to the particular merchant in an effort to assist the merchant in creating a web page that leads to eCommerce success and streamlines web page editing. FIGS. 11-13 are directed to such techniques.

FIG. 11 illustrates an example environment 1100 for making web page editing recommendations to a merchant based on web pages of other merchants that are determined to be similar to the merchant (e.g., as determined by brick-and-mortar data).

As described above with reference to FIG. 1, merchants 106 can participate in transactions with customers 108 via POS systems at brick-and-mortar stores 110 of the merchants 106. In some examples, merchants 106 can sell items from physical stores, such as brick-and-mortar stores 110 (e.g., in addition, or as an alternative, to online stores). In such examples, merchants 106 can use POS systems (e.g., computing device(s) configured as POS terminals) to generate transaction data indicative of payment data, user authentication data, point-of-purchase information (e.g., indicative of items sold, locations of the items sold, prices of the items sold, parties to the transaction, etc.), transaction type, etc. The POS systems, described in more detail below, can transmit the transaction data to a payment processing service which can process payments for the items sold on behalf of the merchants 106.

In FIG. 11, the recommendation module 220 can utilize brick-and-mortar transaction data, and in some examples additional or alternative merchant data, to identify similarities between merchants. For instance, in at least one example, the recommendation module 220 can request and receive, or otherwise access, merchant data from the profile(s) database 240 and can determine a group of merchants 1102 that are similar to another merchant 1104 based at least in part on the merchant data. In some examples, the group of merchants 1102 and the merchant 1104 can have merchant profiles in the profile(s) database 240, and data associated with corresponding merchant profiles of the merchants 1102, 1104 can be analyzed to determine similarities. In other examples, the merchant 1104 can be a new merchant that doesn't have a merchant profile in the profile(s) database 240. In such examples, the merchant 1104 can provide at least some merchant data (e.g., business name, MCC, locations, etc.) upon onboarding to the payment processing service which can be analyzed in view of merchant profiles associated with the other merchants.

In at least one example, the group of merchants 1102 can be determined to be similar to the merchant 1104 based on similarities observed from merchant data associated with the group of merchants 1102, which can include transaction data associated with brick-and-mortar POS transactions. In some examples, the recommendation module 220 can perform a statistical analysis to determine a group of merchants 1102 that are similar to the merchant 1104. In additional or alternative examples, the recommendation module 220 can utilize a machine-trained model (e.g., a model trained by a machine learning mechanism on training data including, for example, merchant data and indications of similarity) to determine a group of merchants 1102 that are similar to the merchant 1104. For instance, the recommendation module 220 can analyze merchant data associated with the merchants 106 and can identify individual of the merchants 106 that are similar to the merchant 1104, for example, based on a similarity score. Merchants 106 having similarity scores that meet or exceed a threshold can be grouped together to form the group of merchants 1102. Additionally or alternatively, a number of merchants 106 that have the highest similarity scores can be grouped together to form the group of merchants 1102. In at least one example, merchants in the group of merchants 1102 can share one or more characteristics (e.g., MCC, location, inventory, etc.) with the merchant 1104.

In some examples, at least some merchants in the group of merchants 102 can additionally use web pages 116 for offering their items for sale via an online store (e.g., via the web server(s) 214). Such web pages 116, and data descriptive of features associated with the web pages 116, can be stored in the web page database 224. The recommendation module 220 can determine performance metrics 1106 associated with the web pages 116, based at least in part on transaction data associated with eCommerce transactions conducted via the web pages 116. A performance metric can include, but is not limited to, sales, conversion rates (e.g., a percentage of visitors that land on a web page who complete a purchase or otherwise make it to a predefined point in a commerce flow), total revenues, growth rates, page views, mouseover rates, click rates, bounce rates (e.g., landing on and immediately leaving a web page), share rates (e.g., to other web pages and/or platforms), social chatter (e.g., mentions on social media platforms), subscriptions, and the like. The recommendation module 220 can compare the performance metrics 1106 associated with the web pages 116 to a threshold and, for web pages 116 that are associated with performance metrics 1106 that meet or exceed a threshold, the recommendation module 220 can make recommendations based on the identified web pages 116. That is, the recommendation module 220 can analyze successful web pages 116 (as defined by performance metrics 1106 satisfying a threshold) and can determine how such web pages 116 are similar. The recommendation module 220 can then make a recommendation from among the similar web pages 116 (that are successful). In some examples, such recommendations can be based on performant features associated with the web pages 116. That is, the recommendation module 220 can analyze successful web pages 116 (as defined by performance metrics 1106 satisfying a threshold), identify performant features associated with such web pages 116, and can make a recommendation based on such performant features.

In some examples, the recommendation module 220 can utilize statistical analyses and/or a machine-trained model for identifying features of successful web pages 116. The recommendation module 220 can determine a recommendation for the merchant 1104 based at least in part on the features associated with the web pages 116 that are associated with performance metrics 1106 that meet or exceed a threshold. That is, if a particular framework is shown to be associated with the web pages 116 that are associated with performance metrics 1106 that meet or exceed a threshold, the recommendation module 220 can determine a recommendation for the merchant 1104 to utilize the same framework. Additionally or alternatively, if a particular web page component (e.g., widget) is shown to be associated with the web pages 116 that are associated with performance metrics 1106 that meet or exceed a threshold, the recommendation module 220 can determine a recommendation for the merchant 1104 to incorporate the same web page component in its web page. Further, if some combination of web page features is shown to be associated with the web pages 116 that are associated with performance metrics 1106 that meet or exceed a threshold, the recommendation module 220 can determine a recommendation for the merchant 1104 to incorporate the same combination of features in its web page.

As described above, in at least one example, the merchant 1104 can interact with a user interface (e.g., via a computing device) to send a request to the web server(s) 214 to create and/or edit a web page. In some examples, the merchant 1104 can interact with the web page editing user interface 208 or, in additional or alternative examples, the merchant can interact with the POS user interface 212 (e.g., via a dashboard presented via the POS user interface 212). The request fulfillment module 222 can receive the request. In at least one example, the request fulfillment module 222 can query the recommendation module 220 to determine whether the recommendation module 220 has any recommendations for customizing the web page and/or the creation thereof. Responsive to receiving the query, the recommendation module 220 can perform the operations described above. That is, the recommendation module 220 can identify web page features to recommend to the merchant 1104 based on the merchant 1104 sending a request to create and/or edit a web page.

Based at least in part on determining the recommendation, the recommendation module 220 can provide the recommendation to the request fulfillment module 222. In at least one example, the request fulfillment module 222 can leverage the recommendation to incorporate the recommendation into the instructions for rendering a graphical user interface for editing the web page. In an additional or alternative example, the request fulfillment module 222 can send the recommendation with the instructions for rendering the graphical user interface for editing the web page. The request fulfillment module 222 can send the instructions to the web page editing user interface 208 and the web page editing user interface 208 can execute the instructions to render the graphical user interface for editing the web page. In at least one example, the graphical user interface 1108 can be customized for the merchant (or be associated with a recommendation for customizing the graphical user interface) based on the recommendation.

In some examples, performance metrics can be analyzed over time and can be stored in association with web pages in the web page database 224 and/or the profile(s) database 240. Similarly, relationships (e.g., similarities) between merchants can be determined over time and stored in association with merchant profiles in the profile(s) database 240. That is, in some examples, the recommendation module 220 need not determine performance metrics and/or similar merchants in real-time or near real-time, responsive to receiving a request. Instead, the recommendation module 220 can access and/or receive determined performance metrics and/or determined similarities between merchants and can generate a recommendation based on such information. However, in some examples, the recommendation module 220 can determine performance metrics and/or similar merchants in real-time or near real-time, responsive to receiving a request, as described above.

FIG. 12 illustrates a process 1200 for making web page editing recommendations to a merchant based on web pages of other merchants that are determined to be similar to the merchant (e.g., as determined by brick-and-mortar data).

Block 1202 illustrates receiving, via a payment processing service, transaction data associated with POS transactions between merchant(s) and customer(s). As described above with reference to FIG. 5, the payment processing server(s) 218 can process payments on behalf of merchants. Resulting transaction data can be received by the merchant module 234 and stored in the profile(s) database 240. That is, the brick-and-mortar transaction data can be stored in association with respective merchant profile(s) of the merchants, as illustrated in block 1204.

Block 1206 illustrates accessing, via a web service, web page(s) associated with online store(s) of merchant(s). As described above, a merchant can create and/or maintain a web page associated with an online store. The web page can be stored in the web page database 224 associated with the web server(s) 214. In at least one example, each web page can be associated with data indicating features of the corresponding web page (e.g., web page layout, web page design, web page component(s), web page content, etc.).

Block 1208 illustrates associating the web page(s) with respective account(s) of the merchant(s). The web page can be linked to an account of the merchant. The account can be stored in the account database 228 with additional information about the merchant. In some examples, the account can indicate a log-in associated with a user, demographic information associated with the user, payment instruments associated with the user (e.g., as used to pay for services of the web server(s) 214), linked accounts (e.g., to other services, etc.), online inventory of the user (e.g., if the user uses the web service for hosting an eCommerce web page), linked web pages of the user, domain(s) of the user, web page traffic (e.g., visitors, actions taken by visitors, etc.), eCommerce transaction data, etc. The web server(s) 214 can receive the account information when a merchant first requests to create a web page using the web server(s) 214 and/or at a later time.

Block 1210 illustrates determining performance metric(s) associated with the web page(s). In at least one example, the recommendation module 220 can determine performance metric(s) associated with the web pages, based at least in part on transaction data associated with eCommerce transactions and/or data indicative of web page traffic. A performance metric can include, but is not limited to, sales, conversion rates (e.g., a percentage of visitors that land on a web page who complete a purchase or otherwise make it to a predefined point in a commerce flow) total revenues, growth rates, page views, mouseover rates, click rates, bounce rates (e.g., landing on and immediately leaving a web page), share rates (e.g., to other web pages and/or platforms), social chatter (e.g., mentions on social media platforms), subscriptions, and the like. In some examples, the performance metrics) can be stored with the web page(s) in the web page database 224 and/or the account database 228. In at least one example, the performance metric(s) can be used by the recommendation module 220 to recommend web page components to a merchant, as described below with reference to FIG. 13.

FIG. 13 illustrates an example process 1300 including additional details associated with making web page editing recommendations to a merchant based on web pages of other merchants that are determined to be similar to the merchant (e.g., as determined by brick-and-mortar data).

Block 1302 illustrates, receiving, at a web service, a request to edit a web page associated with an online store of a merchant. In at least one example, the merchant can interact with a user interface (e.g., via a computing device) to send a request to the web server(s) 214 to create a web page. As described above, in some examples, the merchant can interact with the web page editing user interface 208 or, in additional or alternative examples, the merchant can interact with the POS user interface 212 (e.g., via a dashboard presented via the POS user interface 212). In some examples, the request can be associated with an identifier of the merchant. For instance, if the merchant requests to create the web page via the POS user interface 212, the request can be associated with log-in information that corresponds to the profile of the merchant. Or, if the merchant requests to create the web page via the web page editing user interface 208, the merchant can provide log-in information that corresponds to an account of the merchant. If the merchant is not associated with a profile and/or an account, the merchant can provide an email address, phone number, or other identifier in association with the request.

In at least one example, the request fulfillment module 222 can receive the request. Responsive to receiving the request, the request fulfillment module 222 can query the recommendation module 220 to determine whether the recommendation module 220 has any recommendations for customizing the web page and/or the creation thereof.

Block 1304 illustrates determining whether the merchant is similar to other merchant(s). In at least one example, the recommendation module 220 can identify the merchant based on the identifier and can access merchant data associated with the merchant. Additionally, the recommendation module 220 can request and receive, or otherwise access, merchant data from the profile(s) database 240 and can determine whether any merchants are similar to the merchant. In at least one example, the recommendation module 220 can utilize brick-and-mortar transaction data to identify whether similarities exist between merchants.

In at least one example, a group of merchants can be determined to be similar to the merchant based on similarities observed from merchant data associated with the group of merchants, which can include transaction data associated with brick-and-mortar POS transactions, and merchant data associated with the merchant. In some examples, the recommendation module 220 can perform a statistical analysis to determine a group of merchants that are similar to the merchant. In additional or alternative examples, the recommendation module 220 can utilize a machine-trained model to determine a group of merchants that are similar to the merchant. For instance, the recommendation module 220 can analyze merchant data associated with the merchants and can identify individual of the merchants that are similar to the merchant, for example, based on a similarity score. Merchants having similarity scores that meet or exceed a threshold can be grouped together to form the group of merchants. Additionally or alternatively, a number of merchants that have the highest similarity scores can be grouped together to form the group of merchants. In at least one example, merchants in the group of merchants can share one or more characteristics (e.g., MCC, location, inventory, etc.) with the merchant.

Block 1306 illustrates accessing a subset of web page(s) associated with the other merchant(s). In some examples, at least some merchants in the group of merchants that are similar to the merchant can additionally use web page(s) for offering their items for sale via an online store (e.g., via the web server(s) 214). Such web page(s), and data descriptive of features associated with the web page(s), can be stored in the web page database 224.

Block 1308 illustrates enabling creation and/or editing of the web page via a generic process. If there are no merchants determined to be similar to the merchant, the recommendation module 220 may not be able to make a recommendation. In such an example, the recommendation module 220 may refrain from sending an indication to the request fulfillment module 222. As such, the request fulfillment module 222 can send instructions associated with generating a graphical user interface that is not personalized and/or customized for the merchant. The web page editing user interface 208 can receive the instructions and execute the instructions to generate the graphical user interface(s) for enabling the merchant to create a web page.

Block 1310 illustrates determining whether the subset, of web page(s) are associated with performance metric(s) that satisfy a threshold. As described above with reference to FIG. 8, the recommendation module 220 can determine performance metric(s) associated with individual web pages, based at least in part on transaction data associated with eCommerce transactions. A performance metric can include, but is not limited to, a conversion rate (e.g., a percentage of visitors that land on a web page who complete a purchase), a total revenue, a growth rate, and the like. The recommendation module 220 can compare the performance metrics 1106 associated with the web page(s) to a threshold and, for web page(s) that are associated with performance metrics 1106 that meet or exceed a threshold, the recommendation module 220 can generate a recommendation based on web page feature(s) associated with the subset of web page(s), as illustrated in block 1312. That is, the recommendation module 220 can analyze successful web page(s) (as defined by performance metrics 1108 satisfying a threshold) and can determine how such web page(s) are similar. In some examples, the recommendation module 220 can utilize statistical analyses and/or a machine-trained model for identifying features of successful web page(s). Such a machine-trained model can be a model trained via a machine learning mechanism on training data such as web page data, performance metric(s), web page traffic, and/or merchant data. The recommendation module 220 can determine a recommendation for the merchant based at least in part on the features associated with the web page(s) that are associated with performance metrics that meet or exceed a threshold.

Block 1314 illustrates recommending the web page feature(s) to the merchant. Based at least in part on determining the recommendation, the recommendation module 220 can provide the recommendation to the request fulfillment module 222. In at least one example, the request fulfillment module 222 can leverage the recommendation to incorporate the recommendation into the instructions for rendering a graphical user interface for editing the web page. In an additional or alternative example, the request fulfillment module 222 can send the recommendation with the instructions for rendering the graphical user interface for editing the web page. The request fulfillment module 222 can send the instructions to the web page editing user interface 208 and the web page editing user interface 208 can execute the instructions to render the graphical user interface for editing the web page. In at least one example, the graphical user interface can be customized for the merchant (or be associated with a recommendation for customizing the graphical user interface) based on the recommendation.

If the subset of web page(s) are not associated with performance metric(s) that satisfy a threshold, the process 1300 can return to block 1308, thereby enabling creation and/or editing of the web page via a generic process.

Figure 14:
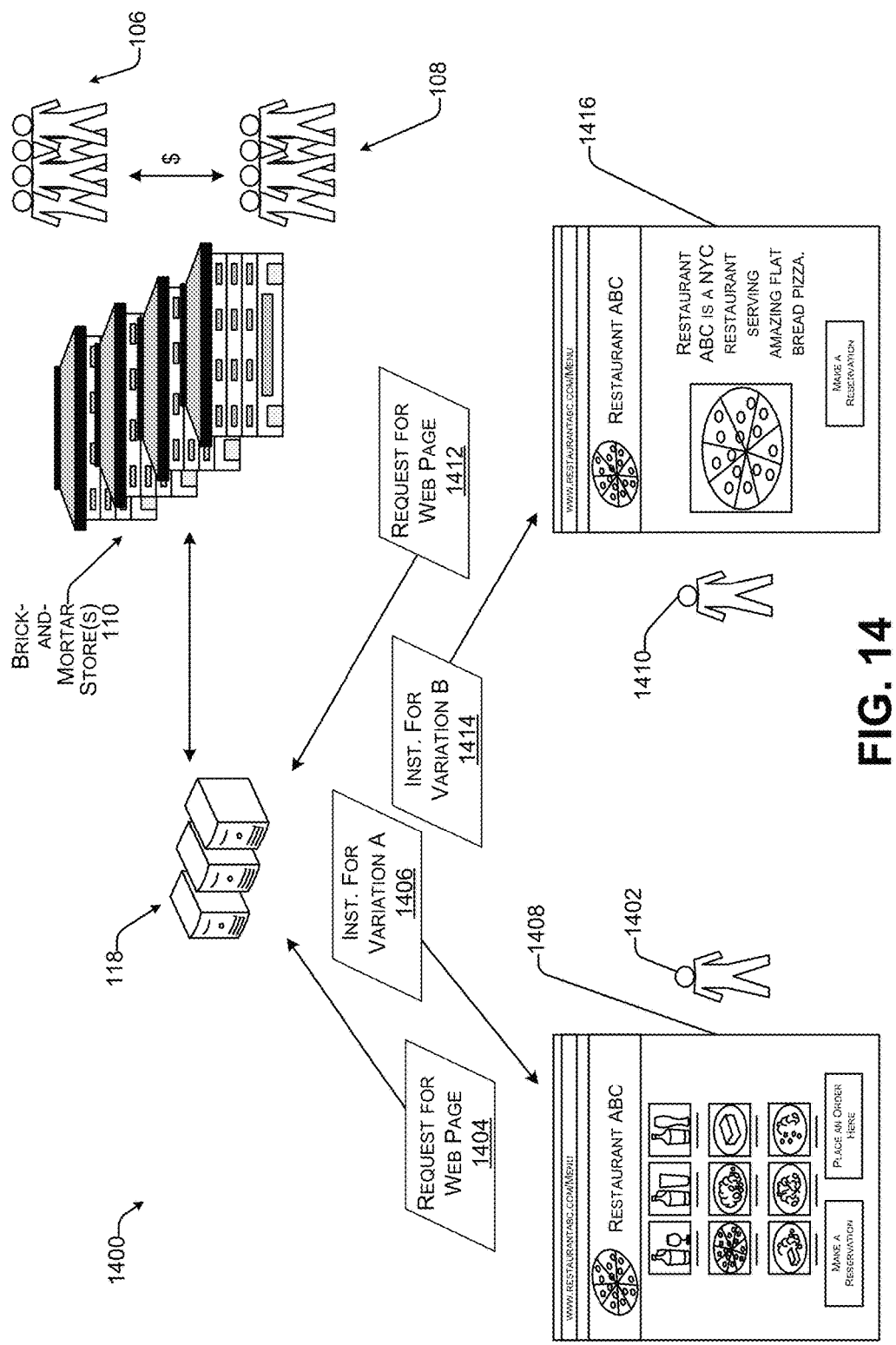
FIG. 14 illustrates an example environment for utilizing brick-and-mortar transaction data associated with customers to determine a particular variation of a web page to present to a particular customer.
Figure 15:
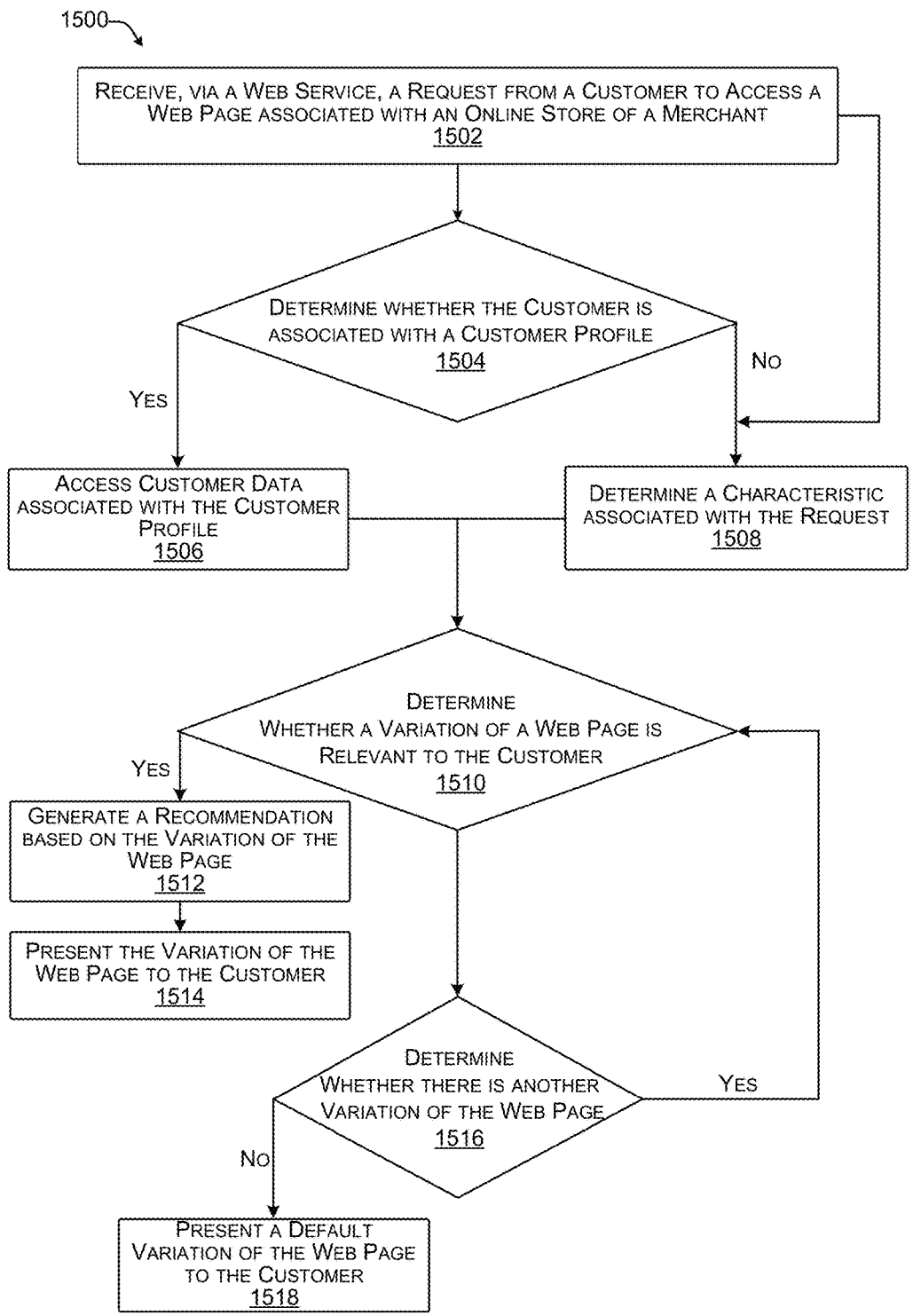
FIG. 15 illustrates an example process for utilizing data associated with customers to determine a particular variation of a web page to present to a particular customer.

As described above, in some examples, techniques described herein can utilize brick-and-mortar transaction data associated with customers to determine a particular variation of a web page to present to a particular customer. That is, merchants can have multiple variations of a web page and brick-and-mortar transaction data can be used to determine which variation of a web page is most relevant to a customer. As such, techniques described herein can surface relevant content to customers to improve experiences of customer interactions with merchants via eCommerce web pages. FIGS. 14 and 15 are directed to such techniques.

FIG. 14 illustrates an example environment 1400 for utilizing brick-and-mortar transaction data associated with customers to determine a particular variation of a web page to present to a particular customer. As described above with reference to FIG. 1, merchants 106 can participate in transactions with customers 108 via POS systems at brick-and-mortar stores 110 of the merchants 106. In some examples, merchants 106 can sell items from physical stores, such as brick-and-mortar stores 110 (e.g., in addition, or as an alternative, to online stores). In such examples, merchants 106 can use POS systems (e.g., computing device(s) configured as POS terminals) to generate transaction data indicative of payment data, user authentication data, point-of-purchase information (e.g., indicative of items sold, locations of the items sold, prices of the items sold, parties to the transaction, etc.), transaction type, etc. The POS systems, described in more detail below, can transmit the transaction data to a payment processing service, associated with server computing device(s) 118, which can process payments for the items sold on behalf of the merchants 106. In at least one example, payment processing server(s) 218 associated with the server computing device(s) 118 can store at least a portion of the transaction data in a profile(s) database 240, as described above.

As described above, the profile(s) database 240 can include customer profiles, which can be associated with customers of merchants that utilize the payment processing service. A customer profile can include customer data associated with a customer including, but not limited to, demographic information (e.g., name, phone number, address, banking information, etc.), customer preferences (e.g., learned or customer-specified), purchase history data (e.g., identifying one or more items purchased (and respective item information), payment instruments used to purchase the one or more items, returns associated with one or more orders, statuses of one or more orders (e.g., preparing, packing, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, interactions associated with such reservations, etc.), customer service data, etc.

As described above, in some examples, merchants (e.g., merchants 112 in FIG. 1) can participate in transactions with customers (e.g., customers 114 in FIG. 1) via online stores (in addition to, or as an alternative of, brick-and-mortar stores). Web page(s) (e.g., web page(s) 116 in FIG. 1) can be configured to present item(s) offered for acquisition to customers 114, thereby comprising "online store(s)." The server computing device(s) 118 can comprise web server(s) 214, as described above. The web page database 224 associated with the web server(s) 214 can store a plurality of web pages created by users of the web server(s) 214. Each web page in the web page database 224 can include instructions that define the size, position, and content of visual elements on the web page. Furthermore, the instructions associated with a web page in the web page database 224 can define one or more other web page features associated with the web page. The instructions can be stored as structured data that can be used to assemble markup language describing the page, in markup language (e.g., not as structured data), or as any other type of data that can be used to assemble the web page.

In some examples, a web page in the web page database 224 can be associated with multiple variations of the web page. That is, a web page in the web page database 224 can be associated with multiple variations such that individual variations differ in at least one web page feature. For instance, a first variation of a web page can be associated with a first framework and first content and a second variation of a web page can be associated with a second framework and the first content. That is, the first and second variations have different frameworks. Or, as another example, a first variation of a web page can be associated with a first content corresponding to an element and a second variation of a web page can be associated with a second content corresponding to the element. That is, the first and second variations are associated with different content. Web pages can vary in any of web page content, web page design, web page layout, web page components (e.g., widgets), etc.

As shown in FIG. 14, a first customer 1402 can interact with an eCommerce user interface 210 (e.g., associated with eCommerce computing device(s) 204) to initiate a request 1404 to view a web page associated with a merchant. The eCommerce user interface 210 can send the request 1404 to the web server(s) 214. The request fulfillment module 222 can receive the request 1404 and can query the recommendation module 220 to determine whether the recommendation module 220 has any recommendations for customizing the web page. The recommendation module 220 can determine information associated with the request (e.g., an IP address associated with the request 1404, a geolocation associated with the request 1404, etc.) and/or access customer data associated with a customer profile of the first customer 1402 (e.g., via a request to the payment processing server(s) 218). The recommendation module 220 can analyze the information associated with the request 1404 and/or the customer data to determine a variation of the requested web page to recommend to the first customer 1402. The recommendation module 220 can determine a recommendation regarding a variation of the web page based on the information associated with the request 1404 and/or the customer data associated with the first customer 1402. Based at least in part on determining the recommendation, the recommendation module 220 can provide the recommendation to the request fulfillment module 222. In at least one example, the request fulfillment module 222 can access the instructions corresponding to the recommended variation of the web page and the request fulfillment module 222 can send the instructions 1406 for rendering the web page to the eCommerce user interface 210. The eCommerce user interface 210 can execute the instructions to render a first variation the web page 1408, which can be customized to the first customer 1402.

Further, a second customer 1410 can interact with an eCommerce user interface 210 (e.g., associated with eCommerce computing device(s) 204) to initiate a request 1412 to view a web page associated with a merchant. The eCommerce user interface 210 can send the request 1412 to the web server(s) 214. The request fulfillment module 222 can receive the request 1412 and can query the recommendation module 220 to determine whether the recommendation module 220 has any recommendations for customizing the web page. The recommendation module 220 can determine information associated with the request (e.g., an IP address associated with the request 1412, a geolocation associated with the request 1412, etc.) and/or access customer data associated with a customer profile of the second customer 1410 (e.g., via a request to the payment processing server(s) 218). The recommendation module 220 can analyze the information associated with the request 1412 and/or the customer data to determine a variation of the requested web page to recommend to the customer 1402. The recommendation module 220 can determine a recommendation regarding a variation of the web page based on the information associated with the request 1412 and/or the customer data associated with the second customer 1410. Based at least in part on determining the recommendation, the recommendation module 220 can provide the recommendation to the request fulfillment module 222. In at least one example, the request fulfillment module 222 can access the instructions corresponding to the recommended variation of the web page and the request fulfillment module 222 can send the instructions 1414 for rendering the web page to the eCommerce user interface 210. The eCommerce user interface 210 can execute the instructions to render a second variation the web page 1416.

As illustrated in FIG. 14, the first variation of the web page 1408 includes web page components that enable the first customer 1402 to make a reservation and place an online order. The second variation of the web page 1416 only includes a web page component that enables the second customer 1410 to make a reservation. As a non-limiting example, the location data associated with the first customer 1402 can indicate that the first customer 1402 is located where the restaurant (e.g., Restaurant ABC) can fulfill an order (e.g., via pickup or delivery) and therefore, the variation of the web page presented for the first customer 1402 can include the web page component that allows the first customer 1402 to place an online order. However, the location data associated with the second customer 1410 can indicate that the second customer 1410 is located where the restaurant (e.g., Restaurant ABC) cannot fulfill an order (e.g., via pickup or delivery) and therefore, the variation of the web page presented for the second customer 1410 may not include the web page component that allows the second customer 1410 to place an online order. That is, location, loyalty, preferences, previous purchases, and the like of a customer can influence which variation of a web page is presented to the customer.

As noted above, one or more web pages can be grouped together to comprise a website. That is, a website can include one or more individual web pages that are connected to each other (e.g., via hyperlinks). In some examples, a website can be associated with a web page hierarchy that describes relationships between different web pages of the website. In at least one example, the web page database 224 can store different variations of websites. In such an example, each variation of a website can include a different web page hierarchy and/or different relationships between individual web pages. Techniques described herein can be applicable to recommendations associated with different variations of websites in addition to different variations of web pages.

FIG. 15 illustrates an example process 1500 for utilizing data associated with customers to determine a particular variation of a web page to present to a particular customer.

Block 1502 illustrates, receiving, at a web service, a request from a customer to access a web page associated with an online store of a merchant. In at least one example, the customer can interact with the eCommerce user interface 204 (e.g., associated with eCommerce computing device(s)) to send a request to the web server(s) 214 to access a web page. In some examples, the request can be associated with an identifier of the customer (e.g., the customer can be logged-in to an account or can otherwise provide an identifier in association with the request). The eCommerce user interface 210 can send the request to the web server(s) 214. The request fulfillment module 222 can receive the request and can query the recommendation module 220 to determine whether the recommendation module 220 has any recommendations for customizing the web page.

Block 1504 illustrates determining whether the customer is associated with a customer profile. As described above, the profile(s) database 240 can include customer profiles, which can be associated with customers of merchants that utilize the payment processing service. In at least one example, the recommendation module 220 can utilize the identifier to determine whether the customer is associated with a customer profile in the profile(s) database 240. That is, the recommendation module 220 can query the payment processing server(s) 218 to determine whether the identifier is associated with a customer profile in the profile(s) database 240. Based at least in part on determining that the customer is associated with a customer profile in the profile(s) database 240, the recommendation module 220 can access customer data associated with the customer profile, as illustrated in block 1506. As described above, a customer profile can include customer data associated with a customer including, but not limited to, demographic information (e.g., name, phone number, address, banking information, etc.), customer preferences (e.g., learned or customer-specified), purchase history data (e.g., identifying one or more items purchased (and respective item information), payment instruments used to purchase the one or more items, returns associated with one or more orders, statuses of one or more orders (e.g., preparing, packing, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, interactions associated with such reservations, etc.), customer service data, etc.

Block 1508 illustrates determining a characteristic associated with the request. In at least one example, the recommendation module 220 can determine a characteristic associated with the request. For instance, the recommendation module 220 can determine an IP address associated with the request, location data associated with the request, a date associated with the request, a time associated with the request, etc. In some examples, the recommendation module 220 can determine such characteristic(s) if it is determined that the customer is not associated with a customer profile. In other examples, the recommendation module 220 can determine such characteristic(s) regardless of whether the customer is associated with a customer profile.

Block 1510 illustrates determining whether a variation of a web page is relevant to the customer. In at least one example, the recommendation module 220 can utilize data associated with the customer (e.g., associated with the request, associated with the customer profile, etc.) to determine which variation of the web page to present to the customer. In some examples, the recommendation module 220 can utilize rules, an output of a statistical analysis, an output of a machine-trained model, etc. to determine whether a web page is relevant to a customer.

In at least one example, the recommendation module 220 can analyze data associated with the customer and/or the request in view of a particular variation of a web page to determine a relevancy score associated with the particular variation of the web page. The relevancy score can indicate whether a particular variation of a web page is relevant to a particular customer. The recommendation module 220 can compare the relevancy score with a threshold to determine whether the particular variation of the web page is relevant to the customer. If the relevancy score meets or exceeds the threshold, the recommendation module 220 can determine that the particular variation of the web page is relevant to the customer.

Block 1512 illustrates presenting the variation of the web page to the viewer. In at least one example, the recommendation module 220 can determine a recommendation regarding the variation of the web page that is determined to be relevant to the customer, as illustrated in block 1512. Based at least in part on determining the recommendation, the recommendation module 220 can provide the recommendation to the request fulfillment module 222. In at least one example, the request fulfillment module 222 can access the instructions corresponding to the recommended variation of the web page and the request fulfillment module 222 can send the instructions for rendering the web page to the eCommerce user interface 210. The eCommerce user interface 210 can execute the instructions to render the web page, thereby presenting the variation of the web page to the viewer, as illustrated in block 1514.

Block 1516 illustrates determining whether there is another variation of the web page. Based at last in part on determining that a variation of a web page is not relevant to the viewer, the recommendation module 220 can determine whether there is another variation of the web page. That is, the recommendation module 220 can access the web page database 224 to determine whether the web page is associated with additional variations. Based on determining that there is another variation of the web page, process 1500 can return to block 1510. Based on determining that there is not another variation of the web page, the recommendation module 220 can refrain from returning a response to the request for a recommendation and a default variation of the web page (e.g., a designated variation of the web page that is not customized for the viewer) can be presented via to the viewer, as illustrated in block 1518.

In an additional or alternative example, the recommendation module 220 can determine relevancy scores associated with each variation of the web page at or near a same time. In at least one example, the recommendation module 220 can rank the variations of the web page based on the relevancy scores. In some examples, a highest-ranking variation of the web page can be determined to be the most relevant web page for the viewer and the recommendation module 220 can recommend the highest-ranking variation of the web page to the request fulfillment module 222.

As noted above, one or more web pages can be grouped together to comprise a website. That is, a website can include one or more individual web pages that are connected to each other (e.g., via hyperlinks). In some examples, a website can be associated with a web page hierarchy that describes relationships between different web pages of the website. In at least one examples, the web page database 224 can store different variations of websites. In such examples, each variation of a website can include a different web page hierarchy and/or different relationships between web pages. In at least one example, process 1500 can be applicable to recommendations associated with different variations of websites in addition to different variations of web pages.

In some examples, techniques described herein can be used to access content that is relevant to a customer based on the customer data and/or a characteristic associated with the request. That is, in such examples, the recommendation module 220 can intelligently recommend content to be presented to a customer based on the customer data and/or a characteristic associated with the request. As a non-limiting example, if brick-and-mortar transaction data associated with the customer indicates that the customer prefers to purchase tennis shoes instead of dress shoes, the recommendation module 220 can recommend presenting content items associated with tennis shoes prior to presenting content items associated with dress shoes. Further, as another non-limiting example, if the request is associated with an IP address and/or location data indicative of a particular location, the recommendation module 220 can recommend presenting apparel (e.g., outerwear, athletic jerseys/apparel, etc.), that based on brick-and-mortar data sells well in the particular location, via the web page. Moreover, as yet another non-limiting example, if the request is associated with a date and/or time where brick-and-mortar transaction data indicates that a particular item sells better than other items (e.g., pumpkin-flavored lattes during the fall, rosé wine in the summer, etc.), the recommendation module 220 can recommend presenting content associated with the particular item via the web page. In some examples, content can be presented to customers dynamically and in real-time or near real-time.

As described above, in at least one example, techniques described herein are directed to synchronizing a brick-and-mortar POS platform with a web page editing platform to enable merchants to seamlessly utilize services offered by both platforms for holistically managing their businesses. That is, techniques described herein enable merchants to utilize a brick-and-mortar POS platform to manage brick-and-mortar aspects of their businesses and a web services platform to manage eCommerce aspects of their businesses. Decisions made on one platform can influence the other platform and vice versa. FIGS. 16-19 are directed to synchronizing brand assets between a brick-and-mortar POS platform and a web services platform, by use of a brand asset management platform. That is, FIGS. 16-19 are directed to techniques for programmatically customizing brand assets and/or POS service features for different mediums. As described below, techniques described herein can utilize a centralized data store for storing brand assets of merchants, wherein updates on one platform can cause an update to a brand asset stored in the centralized data store. Such updates can be pushed, or otherwise provided, to the other platform such that the brick-and-mortar POS platform and the web services platform are associated with a consistent, uniform, and professional aesthetic.

Figure 16A:
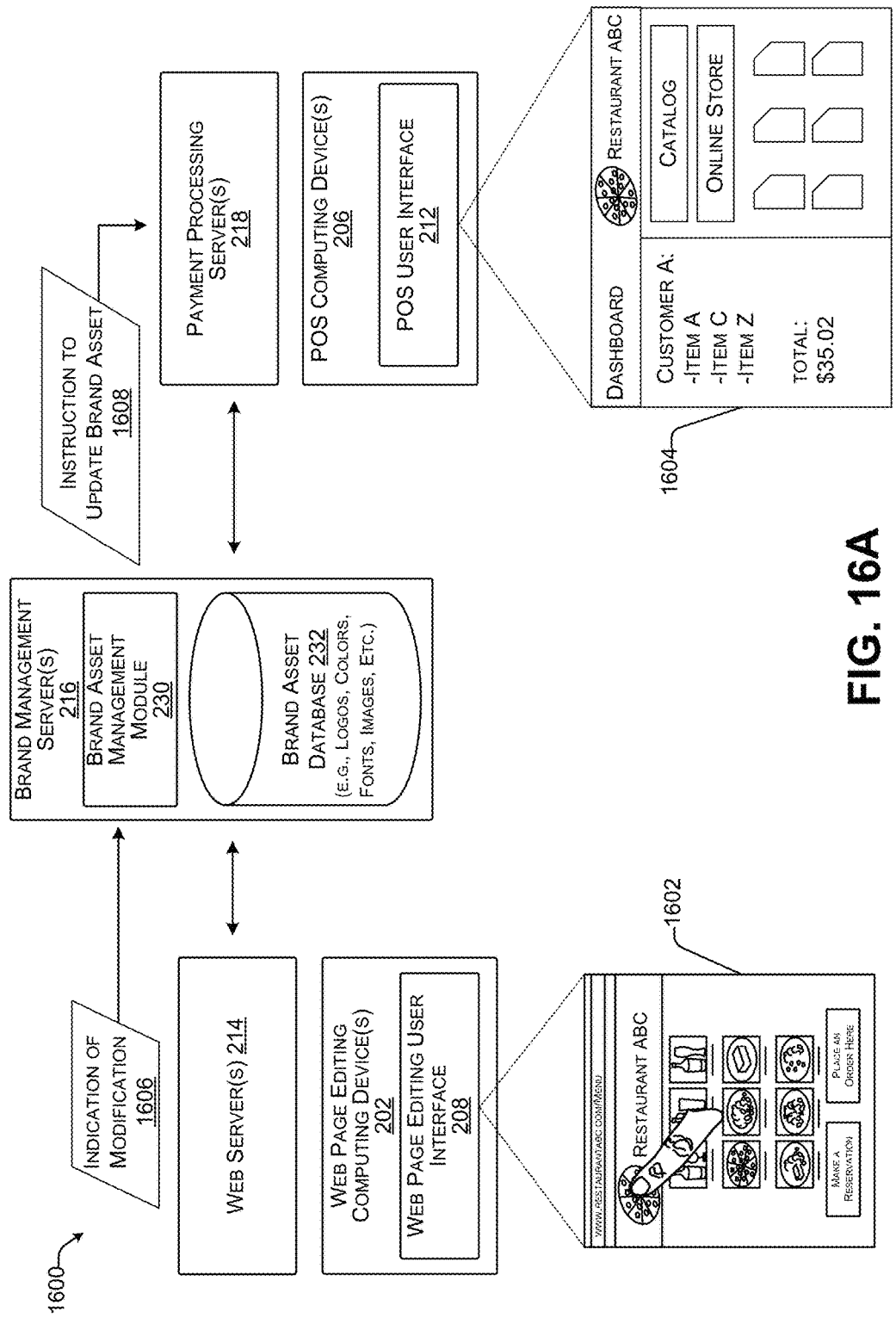
FIGS. 16A and 16B are directed to an example environment for synchronizing brand assets between a brick-and-mortar POS platform and a web services platform, by use of a brand asset management platform.
Figure 16B:
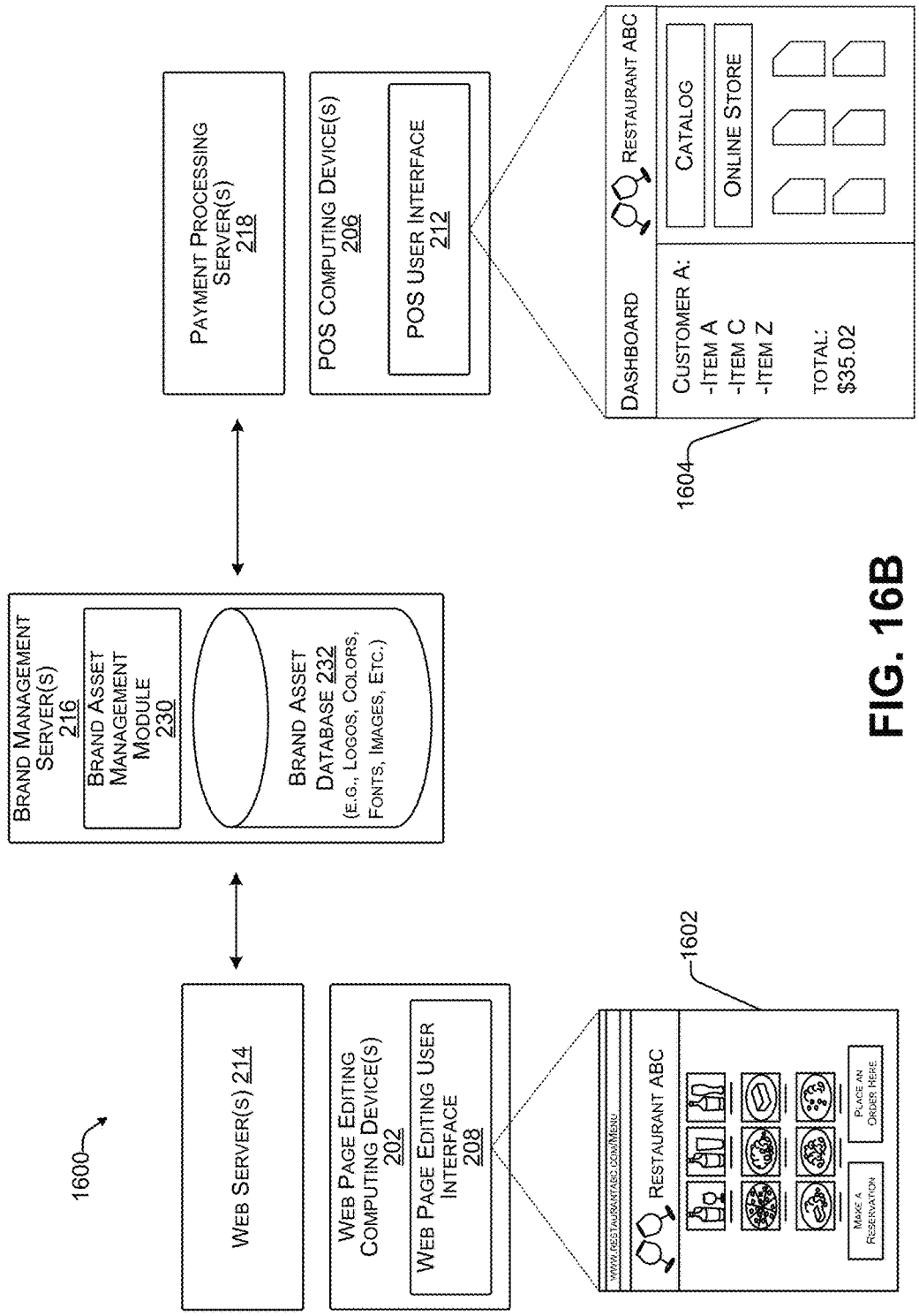

FIGS. 16A and 16B are directed to an example environment 1600 for synchronizing brand assets between a brick-and-mortar POS platform and a web services platform, by use of a brand asset management platform. As illustrated in FIG. 16A, the web page editing server(s) 214 can be in communication with brand management server(s) 216 and/or payment processing server(s) 218.

As described above, the brand management server(s) 216 can include a brand asset management module 230 and a brand asset database 232. The brand asset database 232 can store information associated with brand assets associated with merchants. A brand asset can be a logo (e.g., text logo, graphic logo, favicon, etc.), a font, a color, an image, an icon, a button style, effects, spacing, and the like used in association with a brand of the merchant. In some examples, a brand asset can be associated with multiple content items, which can be applicable to different end users and/or intended viewers. For instance, a brand asset corresponding to a logo can be associated with a logo that is presented to customers and a logo that is presented to merchants. The brand asset management module 230 can manage the brand asset database 232. In some examples, the brand asset management module 230 can determine whether interactions with the web server(s) 214 and/or payment processing server(s) 218 affect a change to a brand asset of a merchant and, based at least in part on determining that an interaction affects a change, the brand asset management module 230 can update the brand asset (e.g., the instructions associated therewith) in the brand asset database 232.

As illustrated in FIG. 16A, a merchant can be associated with a web page 1602, presented via a web page editing user interface 208, and a POS dashboard 1604, presented via the POS user interface 212. While each graphical user interface has unique features, the brand assets associated with each are consistent. For instance, both the web page 1602 and the POS dashboard 1604 are associated with a same font and logo (e.g., pizza). In some examples, while not pictured in FIG. 16A, the web page 1602 and the POS dashboard 1604 can have the same color palette, etc. In at least one example, a merchant can edit the web page 1602 (e.g., by replacing the logo with a new logo). The web page editing user interface 208 can detect the modification and can send an indication to the web server(s) 214. In at least one example, the request fulfillment module 222 can receive the indication (e.g., in association with a request to update the web page 1602) and the request fulfillment module 222 can determine that the modification affects a brand asset of the merchant. As such, the web server(s) 214 can send an indication 1606 of the modification to the brand management server(s) 216.

The brand management server(s) 216 can receive the indication 1606 and the brand asset management module 230 can determine that a brand asset has been modified based on the indication 1606. Based on determining that the brand asset has been updated, the brand asset management module 230 can update an association between the merchant's logo with the new logo in the brand asset database 232. Based at least in part on updating the brand asset, the brand management server(s) 216 can send an instruction 1608 to the payment processing server(s) 218 to cause the payment processing server(s) 218 to update the brand asset. Responsive to receiving the instruction 1608, the payment processing server(s) 218 can cause the various POS services to update the brand asset as it is applicable to their service. In at least one example, the POS services can determine which brand asset(s) to use and, in some examples, one or more modifications to the brand asset(s) (e.g., instructions associated therewith) for use with each of the respective POS services.

For example, in FIG. 16B, the logo has been updated in the web page 1602 and the POS dashboard 1604. Similarly, the logo can be updated as it is used in a POS graphical user interface used to facilitate transactions between merchants and customers, invoices, orders, menus, shipping labels, marketing, etc. That is, brand asset management module 230 can provide instructions associated with the updated brand asset to the payment processing server(s) 218 so that the brand asset is consistent across both (or all) platforms.

Figure 17:
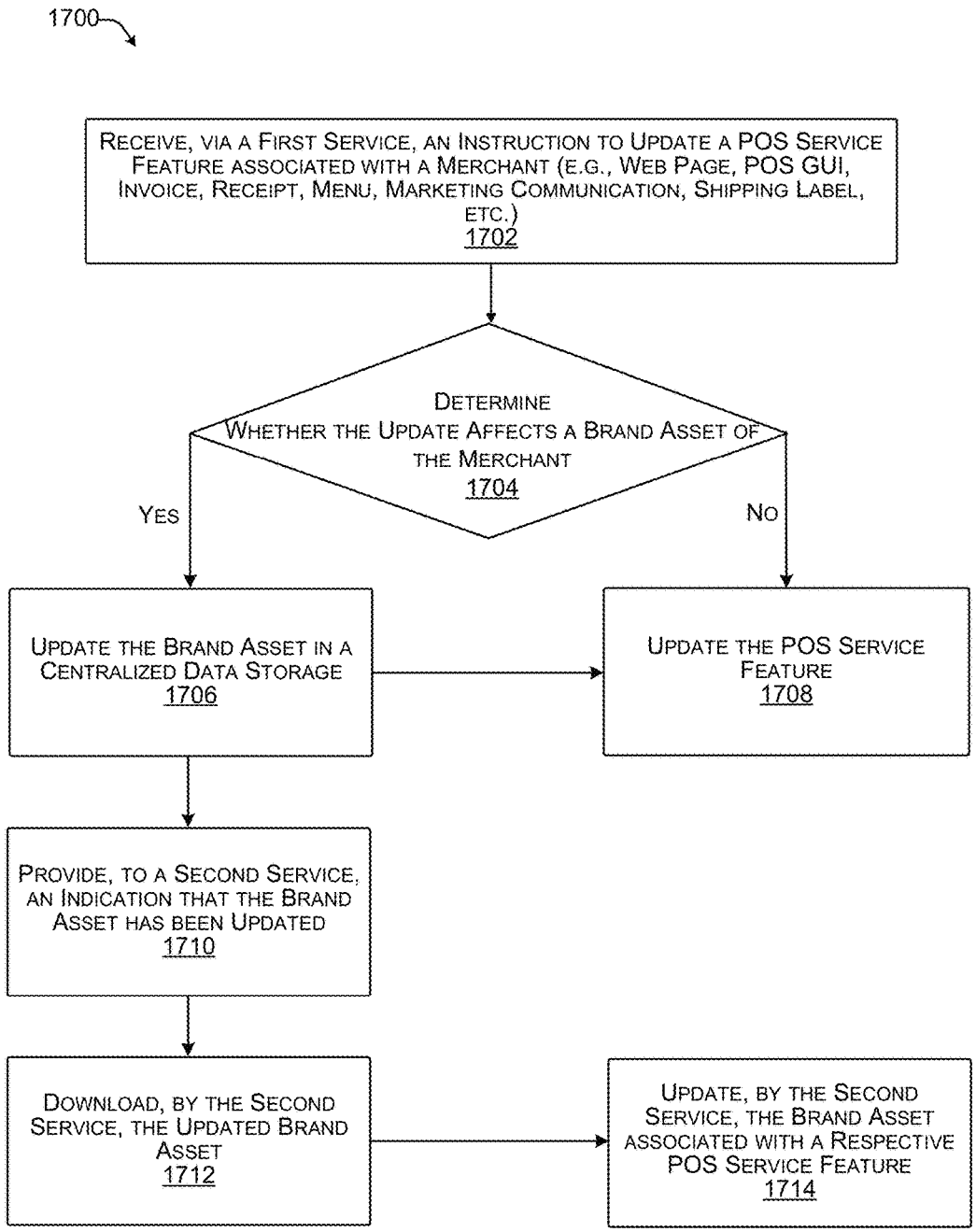
FIG. 17 illustrates an example process for managing a brand asset database for synchronizing brand assets across various POS services.

FIG. 17 illustrates an example process 1700 for managing a brand asset database for synchronizing brand assets across various POS services. As described above, operations attributed to "POS services" can be performed by server computing device(s) associated therewith.

Block 1702 illustrates receiving, via a first service, an instruction to update a POS service feature associated with a merchant (e.g., web page, POS dashboard, POS graphical user interface, invoice, receipt, menu, marketing communication, shipping label, etc.). In at least one example, a merchant can interact with a user interface (e.g., the web page editing user interface 208, the POS user interface 212, etc.) to edit a POS service feature associated with the merchant. For the purpose of this discussion, a "POS service feature" is a feature that enables a merchant to provide a POS service. For example, a web page is a POS service feature that enables a merchant to do business online via an eCommerce service. Additionally, a POS dashboard is a POS service feature that enables a merchant to process payments via a payment processing service. Furthermore, a shipping label is a POS service feature that enables a merchant to ship items purchased via a shipping service.

Moreover, an invoice is a POS service feature that enables a merchant to bill a customer via an invoice service. POS services can be associated with the payment processing server(s) 218 and/or other server(s) associated with the server computing device(s) 118. Additional POS service features are within the scope of this disclosure.

Block 1704 illustrates determining whether the update affects a brand asset of the merchant. In at least one example, a module (e.g., the request fulfillment module 222, the merchant module 234, the POS service module(s) 236, and/or the brand asset management module 230) can determine whether the update affects a brand asset of the merchant. In some examples, the module can compare the existing brand assets to all brand assets associated with the POS service feature after the update has been implemented and, if an existing brand asset differs from a brand asset resulting from the update to the POS service feature, the module can determine that the update affects the brand asset. Furthermore, in some examples, various aspects of POS service features can be mapped to, or otherwise associated with, particular brand assets, such that when a particular aspect is updated, the module can determine that the corresponding brand asset has been updated.

In some examples, a change to a brand asset can be inferred. For instance, based at least in part on adding a new logo, the module can analyze the logo to determine fonts, colors, etc. associated with the new logo. As a result, the module can determine that, in addition to the logo being updated, at least one of fonts, colors, etc. are also to be updated.

In at least one example, a functional component associated with the POS service can determine the update to the brand asset and can send an indication to the brand asset management module 230. In other examples, all modifications can be sent through the brand management server(s) 216 and the brand asset management module 230 can analyze data periodically to determine whether brand assets have been updated.

Block 1706 illustrates updating the brand asset in a centralized data store. Based at least in part on determining that an update affects a brand asset (and/or receiving an indication of such), the brand asset management module 230 can update the brand asset (e.g., instructions associated therewith) in the brand asset database 232. That is, the brand asset management module 230 can replace instructions associated with the existing brand asset with instructions associated with the new brand asset. In at least one example, prior to updating a brand asset in the centralized database 232, the module can surface a recommendation to the merchant to confirm the update.

Block 1708 illustrates updating the POS service feature. If the update does not affect the brand asset, the user interface (and corresponding server(s)) can cause the POS service feature to be updated, without updating the brand asset management module 230.

Block 1710 illustrates providing, to a second service, an indication that the brand asset has been updated. In at least one example, the brand asset management module 230 can provide an indication to at least a second service to notify the second service that the brand asset has been updated. In some examples, the brand asset management module 230 can push the indication to the second service. Such indications can be pushed at a particular frequency, responsive to the brand asset being updated, in association with a software and/or firmware update, etc.

In additional or alternative examples, such an indication can be provided responsive to a request from the second service. For instance, the second service can query the brand asset management module 230 to determine whether there have been any updates to the brand assets of the merchant and, if a brand asset is associated with an updated state, the brand asset management module 230 can send the indication. That is, the second service can send a query to the brand asset management module 230 querying statuses of brand assets. If a brand asset is associated with an updated status, the brand asset management module 230 can provide an indication of such to the second service. In at least one example, the second service can query the brand asset management module 230 prior to generating instructions for outputting a POS service feature. For instance, the merchant module 234 can query the brand asset management module 230 to determine whether any brand assets have been updated prior to generating instructions for rendering a POS dashboard and/or POS graphical user interface, which can be rendered by the POS user interface 212.

Block 1712 illustrates downloading, by the second service, the updated brand asset. In at least one example, responsive to receiving the indication that the brand asset has been updated, the second service can download the updated brand asset (e.g., instructions associated therewith). In an alternative example, the second service can download the updated brand asset (e.g., instructions associated therewith) without having first received the indication. That is, in some examples, prior to generating and/or otherwise outputting a POS service feature, the second service can query the brand asset management module 230 to determine whether any brand assets have been updated and, if a brand asset has been updated, the second service can download instructions associated with the updated brand asset.

Block 1714 illustrates updating, by the second service, the brand asset associated with a respective POS service feature. After the second service has downloaded the updated brand asset (e.g., instructions associated therewith), the second service can update the brand asset associated with a respective POS service feature. For example, if the second service is a web service, the web server(s) 214 can cause a web page of the merchant to be updated based on the updated brand asset. Additionally or alternatively, if the second service is a payment processing service, the payment processing server(s) 218 can update a POS dashboard, POS graphical user interface used to facilitate transactions between merchants and customers, an invoice template, a receipt template, a menu, a shipping label template, a marketing template, etc. based on the updated brand asset. As such, the POS service features can be updated based on the updated brand asset.

In at least one example, a POS service can be associated with a front-end rendering component to determine how to render, or otherwise present, brand assets. That is, the POS services can receive information associated with brand assets and can determine how to render such brand assets based on their individual uses. Each POS service can utilize brand assets in different ways. That is, some POS services may only utilize a logo of a merchant, while another POS service can utilize a logo, color palette, font, etc. In some examples, POS services can be associated with functional components (e.g., modules, applications, APIs, user interfaces, etc.) that can determine which brand assets to incorporate into the POS service features associated with the POS services. In some examples, the functional components associated with the POS services can perform one or more modifications to a brand asset (e.g., instructions associated therewith) to ensure consistency across different mediums. For instance, a POS shipping service can modify a color palette so that the color palette appears consistent to customers who view the color palette on a shipping label (e.g., as printed) and on a computer display. Furthermore, in some examples, POS services can perform one or more modifications to a brand asset (e.g., instructions associated therewith) to ensure that the brand asset conforms with the output medium. For instance, if a spacing brand asset specifies a particular spacing, a functional component of a POS service can analyze the spacing brand asset and modify the spacing to conform with the corresponding output medium. Additionally or alternatively, a POS service can modify instructions associated with a brand asset based on an output device (e.g., display size, display resolution, etc.), to maintain consistency of the output.

Figure 18:
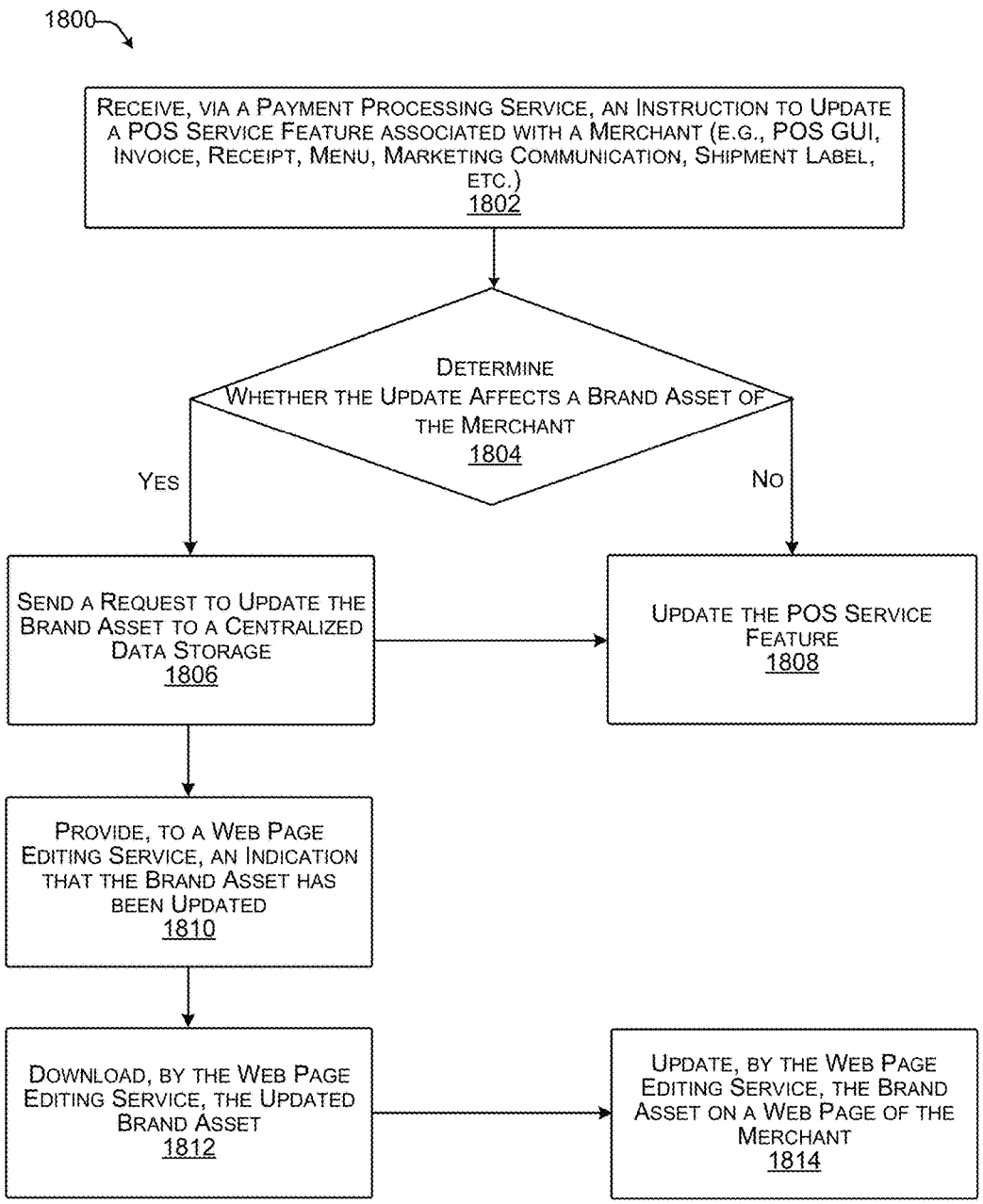
FIG. 18 illustrates an example process for managing a brand asset database for synchronizing brand assets based on an update to a POS service feature via a payment processing platform.

FIG. 18 illustrates an example process 1800 for managing a brand asset database for synchronizing brand assets based on an update to a POS service feature via a payment processing platform. As described above, operations performed by the payment processing service can be performed by the payment processing server(s) 218 and operations performed by the web page editing service can be performed by the web server(s) 214.

Block 1802 illustrates receiving, via a payment processing service, an instruction to update a POS service feature associated with a merchant (e.g., POS dashboard, POS graphical user interface, invoice, receipt, menu, marketing communication, shipping label, etc.). In at least one example, a merchant can interact with the POS user interface 212, etc. to edit a POS service feature such as POS dashboard, POS graphical user interface, invoice, receipt, menu, marketing communication, shipping label, etc.

Block 1804 illustrates determining whether the update affects a brand asset of the merchant. In at least one example, a module (e.g., the merchant module 234, the POS service module(s) 236, and/or the brand asset management module 230) can determine whether the update affects a brand asset of the merchant. In some examples, the module can compare the existing brand assets to all brand assets associated with the POS service feature after the update has been implemented and, if an existing brand asset differs from a brand asset resulting from the update to the POS service feature, the module can determine that the update affects the brand asset. Furthermore, in some examples, various aspects of POS service features can be mapped to, or otherwise associated with, particular brand assets, such that when a particular aspect is updated, the module can determine that the corresponding brand asset has been updated.

In some examples, a change to a brand asset can be inferred. For instance, based at least in part on adding a new logo, the module can analyze the logo to determine fonts, colors, etc. associated with the new logo. As a result, the module can determine that, in addition to the logo being updated, at least one of fonts, colors, etc. are also to be updated.

In at least one example, a functional component (e.g., the merchant module 234 and/or the POS service module(s) 236) associated with the POS service can determine the update to the brand asset and can send an indication to the brand asset management module 230. In other examples, all modifications can be sent through the brand management server(s) 216 and the brand asset management module 230 can analyze data periodically to determine whether brand assets have been updated.

Block 1806 illustrates updating the brand asset in a centralized data store. Based at least in part on determining that an update affects a brand asset (and/or receiving an indication of such), the brand asset management module 230 can update the brand asset (e.g., instructions associated therewith) in the brand asset database 232. That is, the brand asset management module 230 can replace instructions associated with the existing brand asset with instructions associated with the new brand asset. In at least one example, prior to updating a brand asset in the centralized database 232, the module can surface a recommendation to the merchant to confirm the update.

Block 1808 illustrates updating the POS service feature. If the update does not affect the brand asset, the merchant module 234 and/or the POS service module(s) 236 (e.g., via the payment processing server(s) 218) can cause the POS service feature to be updated, without updating the brand asset management module 230.

Block 1810 illustrates providing, to a web page editing service, an indication that the brand asset has been updated. In at least one example, the brand asset management module 230 can provide an indication to at least the web page editing service (e.g., the web server(s) 214) to notify the web page editing service that the brand asset has been updated. In some examples, the brand asset management module 230 can push the indication to the web page editing service. Such indications can be pushed at a particular frequency, responsive to the brand asset being updated, in association with a software and/or firmware update, etc.

In additional or alternative examples, such an indication can be provided responsive to a request from the web page editing service. For instance, the web page editing service can query the brand asset management module 230 to determine whether there have been any updates to the brand assets of the merchant and, if a brand asset is associated with an updated state, the brand asset management module 230 can send the indication. That is, the web page editing service can send a query to the brand asset management module 230 querying statuses of brand assets. If a brand asset is associated with an updated status, the brand asset management module 230 can provide an indication of such to the web page editing service. In at least one example, the web page editing service can query the brand asset management module 230 prior to generating instructions for outputting a web page. For instance, the request fulfillment module 222 can query the brand asset management module 230 to determine whether any brand assets have been updated prior to generating instructions for rendering a web page.

Block 1812 illustrates downloading, by the web page editing service, the updated brand asset. In at least one example, responsive to receiving the indication that the brand asset has been updated, the web page editing service can download the updated brand asset (e.g., instructions associated therewith). In an alternative example, the web page editing service can download the updated brand asset (e.g., instructions associated therewith) without having first received the indication. That is, in some examples, prior to generating and/or otherwise outputting a POS service feature, the web page editing service can query the brand asset management module 230 to determine whether any brand assets have been updated and, if a brand asset has been updated, the web page editing service can download instructions associated with the updated brand asset.

Block 1814 illustrates updating, by the web page editing service, the brand asset associated with a respective POS service feature. After the web page editing service has downloaded the updated brand asset (e.g., instructions associated therewith), the web page editing service can update the brand asset associated with a respective POS service feature. For example, if the web page editing service is a web service, the web server(s) 214 can cause a web page of the merchant to be updated based on the updated brand asset.

Responsive to downloading, or otherwise retrieving the updated brand asset, the a corresponding (outdated) brand asset associated with a stored web page (e.g., in the web page database 224) can be updated based on the updated brand asset. In at least one example, the request fulfillment module 222 can be associated with a front-end rendering component to determine how to render, or otherwise present, the updated brand asset, as described above.

Figure 19:
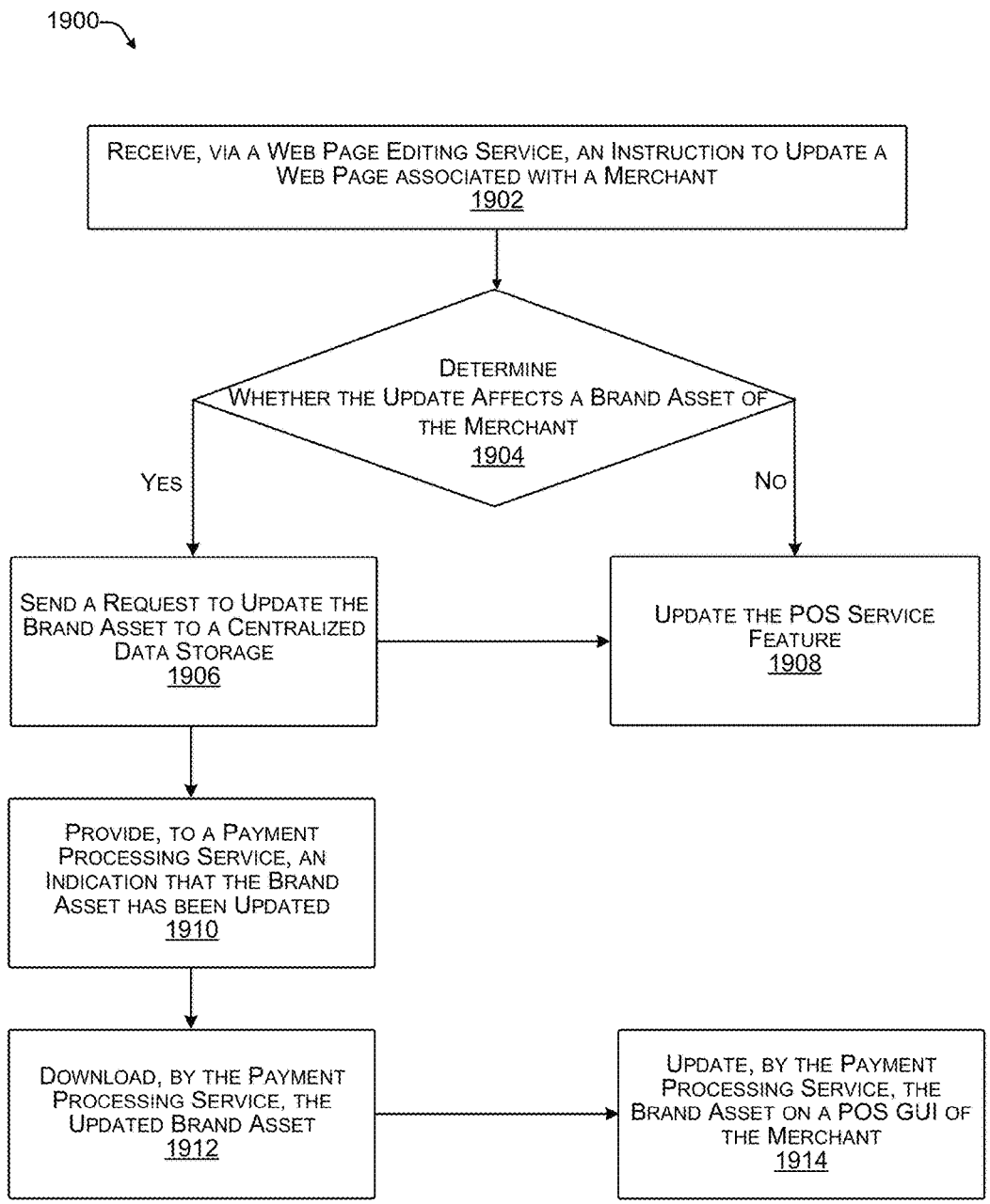
FIG. 19 illustrates an example process or managing a brand asset database for synchronizing brand assets based on an update to a POS service feature via a payment processing platform.

FIG. 19 illustrates an example process 1900 for managing a brand asset database for synchronizing brand assets based on an update to a POS service feature via a payment processing platform. As described above, operations performed by the web page editing service can be performed by the web server(s) 214 and operations performed by the payment processing service can be performed by the payment processing server(s) 218.

Block 1902 illustrates receiving, via a web page editing service, an instruction to update a web page associated with a merchant. In at least one example, a merchant can interact with the web page editing user interface 208 to edit a web page associated with the merchant.

Block 1904 illustrates determining whether the update affects a brand asset of the merchant. In at least one example, a module (e.g., the request fulfillment module 222 and/or the brand asset management module 230) can determine whether the update affects a brand asset of the merchant. In some examples, the module can compare the existing brand assets to all brand assets associated with the POS service feature after the update has been implemented and, if an existing brand asset differs from a brand asset resulting from the update to the POS service feature, the module can determine that the update affects the brand asset. Furthermore, in some examples, various aspects of POS service features can be mapped to, or otherwise associated with, particular brand assets, such that when a particular aspect is updated, the module can determine that the corresponding brand asset has been updated.

In some examples, a change to a brand asset can be inferred. For instance, based at least in part on adding a new logo, the module can analyze the logo to determine fonts, colors, etc. associated with the new logo. As a result, the module can determine that, in addition to the logo being updated, at least one of fonts, colors, etc. are also to be updated.

In at least one example, a functional component associated with the POS service can determine the update to the brand asset and can send an indication to the brand asset management module 230. In other examples, all modifications can be sent through the brand management server(s) 216 and the brand asset management module 230 can analyze data periodically to determine whether brand assets have been updated.

Block 1906 illustrates updating the brand asset in a centralized data store. Based at least in part on determining that an update affects a brand asset (and/or receiving an indication of such), the brand asset management module 230 can update the brand asset (e.g., instructions associated therewith) in the brand asset database 232. That is, the brand asset management module 230 can replace instructions associated with the existing brand asset with instructions associated with the new brand asset. In at least one example, prior to updating a brand asset in the centralized database 232, the module can surface a recommendation to the merchant to confirm the update.

Block 1908 illustrates updating the POS service feature. If the update does not affect the brand asset, the web page editing user interface 208 (e.g., via the web server(s) 214) can cause the POS service feature to be updated, without updating the brand asset management module 230.

Block 1910 illustrates providing, to a payment processing service, an indication that the brand asset has been updated. In at least one example, the brand asset management module 230 can provide an indication to at least a payment processing service to notify the payment processing service that the brand asset has been updated. In some examples, the brand asset management module 230 can push the indication to the payment processing service. Such indications can be pushed at a particular frequency, responsive to the brand asset being updated, in association with a software and/or firmware update, etc.

In additional or alternative examples, such an indication can be provided responsive to a request from the payment processing service. For instance, the payment processing service (e.g., the merchant module 234, the POS service module(s) 236) can query the brand asset management module 230 to determine whether there have been any updates to the brand assets of the merchant and, if a brand asset is associated with an updated state, the brand asset management module 230 can send the indication. That is, the payment processing service can send a query to the brand asset management module 230 querying statuses of brand assets. If a brand asset is associated with an updated status, the brand asset management module 230 can provide an indication of such to the payment processing service. In at least one example, the merchant module 234 and/or the POS service module(s) 236 can query the brand asset management module 230 prior to generating instructions for outputting a POS service feature. For instance, the merchant module 234 can query the brand asset management module 230 to determine whether any brand assets have been updated prior to generating instructions for rendering a POS dashboard and/or POS graphical user interface, which can be rendered by the POS user interface 212. Or, the POS service module(s) 236 can query the brand asset management module 234 prior to generating instructions for generating invoices, orders, menus, shipping labels, marketing, etc.

Block 1912 illustrates downloading, by the payment processing service, the updated brand asset. In at least one example, responsive to receiving the indication that the brand asset has been updated, the payment processing service can download the updated brand asset (e.g., instructions associated therewith). In an alternative example, the payment processing service can download the updated brand asset (e.g., instructions associated therewith) without having first received the indication. That is, in some examples, prior to generating and/or otherwise outputting a POS service feature, the payment processing service can query the brand asset management module 230 to determine whether any brand assets have been updated and, if a brand asset has been updated, the payment processing service can download instructions associated with the updated brand asset.

Block 1914 illustrates updating, by the payment processing service, the brand asset associated with a respective POS service feature. After the payment processing service has downloaded the updated brand asset (e.g., instructions associated therewith), the payment processing service can update the brand asset associated with a respective POS service feature. For example, if the payment processing service is a payment processing service, the payment processing server(s) 218 can update a POS dashboard, POS graphical user interface used to facilitate transactions between merchants and customers, an invoice template, a receipt template, a menu, a shipping label template, a marketing template, etc. based on the updated brand asset. As such, the POS service features can be updated based on the updated brand asset. In at least one example, the merchant module 234 and/or the POS service module(s) 236 can determine how to render, or otherwise present, the updated brand asset.

While FIGS. 18 and 19 are directed to synchronizing updates to a payment processing platform and a web page editing platform via a centralized brand asset management platform, similar operations can be applicable to synchronizing updates between and/or among any number of services and/or service providers.

Figure 20:
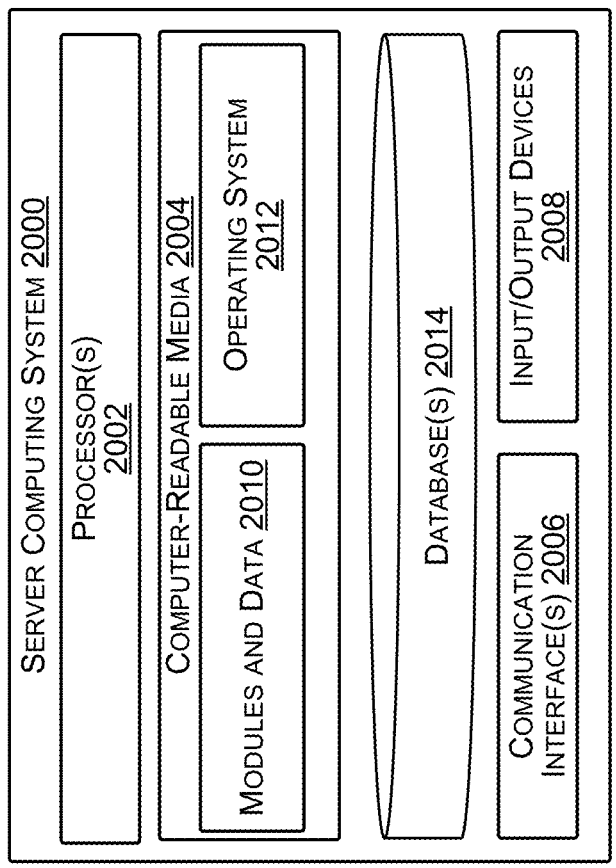
FIG. 20 illustrates an example server computing system for performing techniques as described herein.

FIG. 20 illustrates an example server computing system 2000 for performing techniques as described herein. As described above, one or more user computing devices can communicate with one or more server computing devices. In at least one example, the server computing system 2000 can correspond to the one or more server computing devices 118 described above with reference to FIG. 1.

The server computing device(s) 2000 ("server(s)" hereinafter) can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 2000 as being present in a single location, these components and data can alternatively be distributed across different computing devices and different locations in any manner. In some examples, such components and data can be distributed across user computing devices, as described herein. The functions can be implemented by one or more server computing devices, with the various functionality described above distributed in various ways across the different computing devices. Multiple server(s) 2000 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 2000 can include one or more processors 2002, one or more computer-readable media 2004, one or more communication interfaces 2006, and one or more input/output devices 2008. Each processor 2002 can be a single processing unit or a number of processing units, and can include single or multiple computing units or multiple processing cores. The processor(s) 2002 can be implemented as one or more microprocessors, microcomputers, microcontrollers, digital signal processors, central processing units, state machines, logic circuitries, and/or any devices that manipulate signals based on operational instructions. For example, the processor(s) 2002 can be one or more hardware processors and/or logic circuits of any suitable type specifically programmed or configured to execute the algorithms and processes described herein. The processor(s) 2002 can be configured to fetch and execute computer-readable instructions stored in the computer-readable media 2004, which can program the processor(s) 2002 to perform the functions described herein.

The computer-readable media 2004 can include volatile and nonvolatile memory and/or removable and non-removable media implemented in any type of technology for storage of information, such as computer-readable instructions, data structures, program modules, or other data. Such computer-readable media 2004 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 2000, the computer-readable media 2004 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 2004 can be used to store any number of functional components that are executable by the processors 2002. In many implementations, these functional components comprise instructions or programs that are executable by the processors 2002 and that, when executed, specifically configure the one or more processors 2002 to perform the actions attributed above to the web service, brand management service, and/or payment processing service. Functional components stored in the computer-readable media 2004 can include modules and data 2010. Such modules and data 2010 can include the recommendation module 220, the request fulfillment module 222, the brand asset management module 230, the merchant module 234, the POS service module(s) 236, etc. The modules and data 2010, which can further include programs, drivers, etc., and the data used or generated by the functional components. Additional functional components stored in the computer-readable media 2004 can include an operating system 2012 for controlling and managing various functions of the server(s) 2000. Further, the server(s) 2000 can include many other logical, programmatic and physical components, of which those described above are merely examples that are related to the discussion herein.

In at least one example, the computer-readable media 2004 can store one or more databases 2014. In additional or alternative examples, one or more databases can be remotely located and accessible to the computer-readable media 2004. The one or more databases 2014 can include the web page database 224, the layout and design database 226, the account database 228, the brand asset database 232, the inventory database 238, and the profile(s) database 240 as described above with reference to FIG. 2. While depicted and described as databases, in additional or alternative examples, the databases can be any type of data storage or data repository.

The communication interface(s) 2006 can include one or more interfaces and hardware components for enabling communication with various other devices, such as over the network(s) 1408. For example, communication interface(s) 2006 can enable communication through one or more of the Internet, cable networks, cellular networks, wireless networks (e.g., Wi-Fi) and wired networks, as well as close-range communications such as Bluetooth®, BLE, and the like, as additionally enumerated elsewhere herein.

The server(s) 2000 can further be equipped with various input/output (I/O) devices 2008. Such I/O devices 2008 can include a display, various user interface controls (e.g., buttons, joystick, keyboard, mouse, touch screen, etc.), audio speakers, connection ports and so forth.

Figure 21:
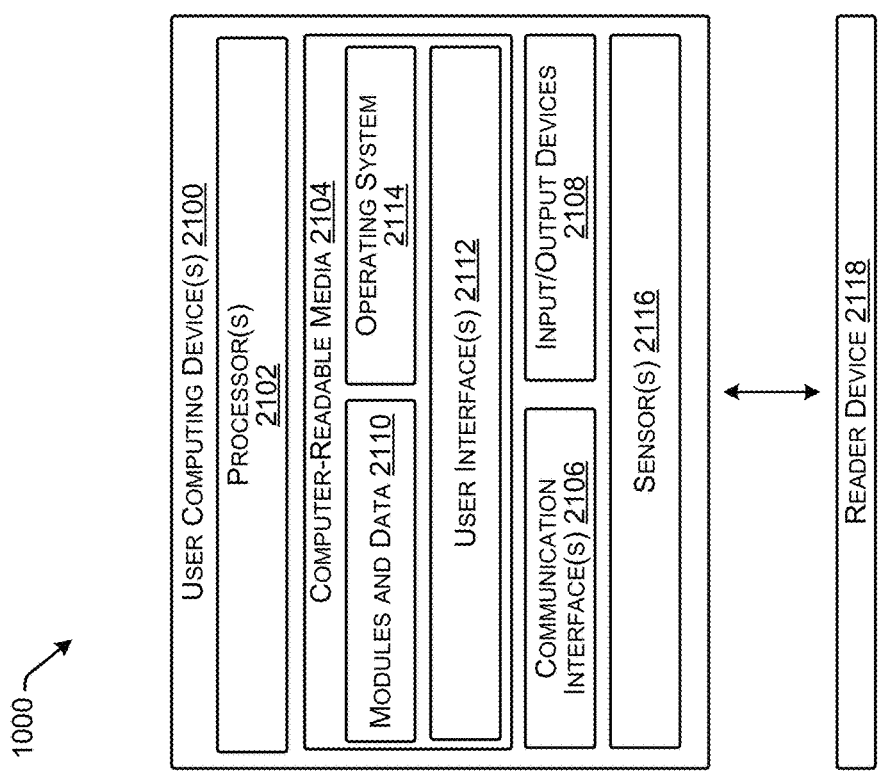
FIG. 21 illustrates example user computing device(s) for performing techniques as described herein.

FIG. 21 illustrates example user computing device(s) 2100 for performing techniques as described herein. As described above, one or more user computing devices can communicate with one or more server computing devices. In at least one example, the user computing device(s) 2100 can correspond to the web page editing computing device(s) 202, the eCommerce computing device(s) 204, and/or the POS computing described above with reference to FIG. 1.

The user computing device(s) 2100 can be any suitable type of computing device, e.g., portable, semi-portable, semi-stationary, or stationary. Some examples of the user computing device(s) 2100 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein. The user computing device(s) 2100 are shown as a single device; however, in some examples, the user computing device(s) 2100 can comprise multiple computing devices that are in communication with one another to perform functions attributed to the user computing device(s) 2100.

In the illustrated example, the user computing device(s) 2100 can include one or more processors 2102, one or more computer-readable media 2104, one or more communication interfaces 2106, and one or more input/output devices 2108. Each processor 2102 can be a single processing unit or a number of processing units, and can include single or multiple computing units or multiple processing cores. The processor(s) 2102 can be implemented as one or more microprocessors, microcomputers, microcontrollers, digital signal processors, central processing units, state machines, logic circuitries, and/or any devices that manipulate signals based on operational instructions. For example, the processor(s) 2102 can be one or more hardware processors and/or logic circuits of any suitable type specifically programmed or configured to execute the algorithms and processes described herein. The processor(s) 2102 can be configured to fetch and execute computer-readable instructions stored in the computer-readable media 2104, which can program the processor(s) 2102 to perform the functions described herein.

The computer-readable media 2104 can include volatile and nonvolatile memory and/or removable and non-removable media implemented in any type of technology for storage of information, such as computer-readable instructions, data structures, program modules, or other data. Such computer-readable media 2104 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the user computing device(s) 2100, the computer-readable media 2104 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 2104 can be used to store any number of functional components that are executable by the processors 2102. In many implementations, these functional components comprise instructions or programs that are executable by the processors 2102 and that, when executed, specifically configure the one or more processors 2102 to perform the actions attributed above to the service provider and/or payment processing service. Functional components stored in the computer-readable media 2104 can include modules and data 2110. In some examples, the modules and data 2110 can be associated with one or more user interfaces 2112. The one or more user interfaces 2112 can include the web page editing user interface 208, the eCommerce user interface 210, and/or the POS user interface 212. The modules and data 2110, which can further include programs, drivers, etc., and the data used or generated by the functional components. Additional functional components stored in the computer-readable media 2104 can include an operating system 2114 for controlling and managing various functions of the user computing device(s) 2100. Further, the user computing device(s) 2100 can include many other logical, programmatic and physical components, of which those described above are merely examples that are related to the discussion herein.

The communication interface(s) 2106 can include one or more interfaces and hardware components for enabling communication with various other devices, such as over the network(s) 1408. For example, communication interface(s) 2106 can enable communication through one or more of the Internet, cable networks, cellular networks, wireless networks (e.g., Wi-Fi) and wired networks, as well as close-range communications such as Bluetooth®, BLE, and the like, as additionally enumerated elsewhere herein.

The user computing device(s) 2100 can further be equipped with various input/output (I/O) devices 2108. Such I/O devices 2108 can include a display, various user interface controls (e.g., buttons, joystick, keyboard, mouse, touch screen, etc.), audio speakers, connection ports and so forth.

In some examples, the user computing device(s) 2100 can include one or more sensors 2116 including a global positioning system (GPS) sensor for generating location data associated with the user computing device(s) 2100, a light detection sensor, rotation/accelerometer sensor, fingerprint sensors, camera(s), etc.

In at least one example, the user computing device(s) 2100 can further a reader device 2118 for reading payment instruments. In some examples, the reader device 2118 can plug in to a port in the user computing device(s) 2100, such as a microphone/headphone port, a data port, or other suitable port. The reader device 2118 can include a read head for reading a magnetic strip of a payment card, and further can include encryption technology for encrypting the information read from the magnetic strip. Additionally or alternatively, the reader device 2118 can be an EMV payment reader, which in some examples, can be embedded in the user computing device(s) 2100. Moreover, numerous other types of readers can be employed with the user computing device(s) 2100 herein, depending on the type and configuration of the user computing device(s) 2100. In some examples, the reader device 2118 can comprise a second device that can be coupled to the merchant computing device 2118. In at least one example, such a second device can be associated with its own input/output devices for presenting GUIs to facilitate payment processing.

The aforementioned description is directed to devices and applications that are related, in part, to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments. Techniques described herein can be configured to operate in both real-time/online and offline modes. Further, techniques described herein are directed to transactions between customers and merchants, but such techniques can be applicable for any type of entity and should not be limited to use by customers and merchants.

Various figures included herein are flowcharts showing example methods involving techniques as described herein. The methods illustrated are described with reference to FIGS. 1, 2, and 3A-3E for convenience and ease of understanding. However, the methods illustrated are not limited to being performed using components described in FIGS. 1, 2, and 3A-3E, and such components are not limited to performing the methods illustrated herein.

The methods are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

"Machine-trained models" are described above. For the purpose of this discussion, machine-trained model(s) can be trained via a machine-learning mechanism (e.g., supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.) based on training data. The training data can vary depending on the intended purpose of the machine-trained model. Nevertheless, training data can comprise one or more of web pages of merchants (e.g., data associated therewith), data associated with the merchants (e.g., transaction data, merchant data, etc.), editing history of web pages, etc.

While the aforementioned disclosure makes reference to graphical user interfaces presented via a display of a device, content output via the graphical user interfaces can be presented via any input/output device. As an example, content associated with the graphical user interfaces can be output via a speaker, and augmented reality (AR) display, a virtual reality (VR) display, etc. That is, in some examples, the content associated with the graphical user interfaces can be presented via a speaker or an augmented reality and/or virtual reality environment. VR is an immersive experience, which simulates physical presence in a real or imagined environment. For example, a VR environment can immerse a physical, real-world person with computer-generated graphics (e.g., a dog, a castle, etc.) in a computer-generated, virtual scene via a VR display device. AR is a hybrid reality experience, which merges real worlds and virtual worlds. AR is a technology that produces AR environments where a physical, real-world person and/or objects in physical, real-world scenes co-exist with virtual, computer-generated people and/or objects in real time. For example, a AR environment can augment a physical, real-world scene and/or a physical, real-world person with computer-generated graphics (e.g., a dog, a castle, etc.) in the physical, real-world scene viewed via a AR display device.

Further, while the aforementioned disclosure makes reference to the merchant and/or customer interacting with the graphical user interfaces via a selectable control or touch input, in additional or alternative examples, the merchant can indicate a selection via a spoken input or other type of input.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A computer-implemented method for informing web page editing by a merchant based on data observed from eCommerce and brick-and-mortar point-of-sale (POS) transactions of other merchants associated with a same payment processing service, the computer-implemented method comprising:
    accessing merchant data including (i) transaction data associated with the eCommerce and brick-and-mortar POS transactions processed on behalf of the particular merchant and (ii) web page data associated with an eCommerce web page of the particular merchant, wherein the eCommerce web page includes web page content arranged by a web page layout and having a web page design;
    determining conversion success rates associated with eCommerce web pages based on aggregated transaction data associated with the eCommerce POS transactions processed on behalf of the other merchants;
    determining, based on the brick-and-mortar POS transactions, a group of the merchants that are similar to the merchant;
    determining that a subset of merchant profiles associated with the group of the merchants are associated with eCommerce web pages having conversion success rates above a threshold;
    identifying, based on the eCommerce web pages associated with the subset of merchant profiles, web page content, a web page layout, and a web page design to recommend to the merchant;
    generating a recommendation based on the identified web page content, web page layout, and web page design; and
    sending the recommendation to a computing device operable by the merchant for use in creating or editing a web page of the merchant.

2. The computer-implemented method as claim 1 recites, wherein the recommendation comprises a change to an existing web page of the merchant to be implemented via an edit to the web page.

3. The computer-implemented method as claim 1 recites, wherein the recommendation comprises recommended web page content, a recommended web page layout, or a recommended web page design to be associated with a blank web page for creating the web page of the merchant.

4. The computer-implemented method as claim 3 recites, wherein the recommended web page layout comprises a configuration of a framework, one or more sections associated with the framework, and one or more elements associated with the one or more sections.

5. The computer-implemented method as claim 3 recites, wherein the recommended web page design comprises at least a color scheme or a font selection.

6. A system comprising:
    one or more processors;
    computer-readable media storing instructions that, when executed by the one or more processors, cause the one or more processors to perform operations comprising:
        comparing first merchant data associated with a first merchant with second merchant data associated with one or more second merchants, wherein the first merchant and the one or more second merchants utilize a same payment processing service for processing at least brick-and-mortar point-of-sale (POS) transactions;
        determining, based at least in part on comparing the first merchant data and the second merchant data, a subset of the one or more second merchants that are similar to the first merchant;
        determining performance metrics associated with eCommerce graphical user interfaces (GUIs) presented on behalf of the subset of the one or more second merchants based on aggregated transaction data associated with eCommerce point-of-sale (POS) transactions associated with the subset of the one or more second merchants;
        determining, based at least in part on the performance metrics, that at least a portion of the eCommerce GUIs are associated with a performance metric that satisfies a threshold;
        identifying, from among the portion of the eCommerce GUIs that are associated with the performance metric that satisfies the threshold, at least one of content, a layout, or a design to recommend to the first merchant;
        generating a recommendation based on at least one of the content, the layout, or the design; and
        sending the recommendation to a computing device operable by the first merchant for use in creating or editing an eCommerce GUI to be presented on behalf of the first merchant.

7. The system as claim 6 recites, wherein the first merchant data and the second merchant data include transaction data associated with at least the brick-and-mortar POS transactions processed on behalf of the first merchant and the one or more second merchants.

8. The system as claim 6 recites, wherein the first merchant data and the second merchant data include at least one of geolocations associated with brick-and-mortar stores of the first merchant and the one or more second merchants or merchant category codes associated with the first merchant and the one or more second merchants.

9. The system as claim 6 recites, wherein the performance metric comprises sales, a conversion rate, a total revenue, a growth rate, page views, a mouseover rate, a click rate, a bounce rate, or a share rate.

10. The system as claim 6 recites, wherein the recommendation comprises a change to an existing eCommerce GUI that is presented on behalf of the merchant to be implemented via an edit to the eCommerce GUI, wherein the existing eCommerce GUI is associated with a web page or an application.

11. The system as claim 6 recites, wherein the recommendation comprises recommended content, a recommended layout, or a recommended design to be associated with a blank eCommerce GUI for creating the eCommerce GUI that is to be presented on behalf of the merchant.

12. The system as claim 11 recites, wherein the recommended layout comprises a configuration of a framework, one or more sections associated with the framework, and one or more elements associated with the one or more sections.

13. The system as claim 11 recites, wherein the design comprises at least a color scheme and a font selection.

14. The system as claim 7 recites, the operations further comprising:
analyzing data associated with the eCommerce GUIs and the transaction data associated with the eCommerce POS transactions using a machine-trained model; and
generating the recommendation based at least in part on an output of the machine-trained model.

15. A computer-implemented method comprising:
comparing first merchant data associated with a first merchant with second merchant data associated with one or more second merchants, wherein the first merchant and the one or more second merchants utilize a same payment processing service for processing at least brick-and-mortar point-of-sale (POS) transactions;
determining, based at least in part on comparing the first merchant data and the second merchant data, a subset of the one or more second merchants that are similar to the first merchant;
determining performance metrics associated with eCommerce graphical user interfaces (GUIs) of the subset of the one or more second merchants based on aggregated transaction data associated with eCommerce point-of-sale (POS) transactions associated with the subset of the one or more second merchants;
determining that at least a portion of the eCommerce GUIs are associated with a performance metric that satisfies a threshold;
identifying, from among the portion of the eCommerce GUIs that are associated with the performance metric that satisfies the threshold, at least one of content, a layout, or a design to recommend to the first merchant;
generating a recommendation based on at least one of the content, the layout, or the design; and
sending the recommendation to a computing device operable by the first merchant for use in creating or editing an eCommerce GUI to be presented on behalf of the first merchant.

16. The computer-implemented method as claim 15 recites, wherein the first merchant data and the second merchant data include at least one of:
brick-and-mortar transaction data associated with transactions processed on behalf of the first merchant and the one or more second merchants;
geolocations associated with brick-and-mortar stores of the first merchant and the one or more second merchants; or
merchant category codes associated with the first merchant and the one or more second merchants.

17. The computer-implemented method as claim 15 recites, wherein the performance metric comprises sales, a conversion rate, a total revenue, a growth rate, page views, a mouseover rate, a click rate, a bounce rate, or a share rate.

18. The computer-implemented method as claim 15 recites, wherein the recommendation comprises a change to an existing eCommerce GUI that is presented on behalf of the merchant to be implemented via an edit to the eCommerce GUI.

19. The computer-implemented method as claim 15 recites, wherein the recommendation comprises recommended content, a recommended layout, or a recommended design to be associated with a blank eCommerce GUI for creating the eCommerce GUT that is presented on behalf of the merchant.

20. The computer-implemented method as claim 15 recites, wherein:
the recommended layout comprises a configuration of a framework, one or more sections, and one or more elements; and
the design comprises at least a color scheme or a font selection to be applied to the framework, one or more sections, and one or more elements.

* * * * *